United States Patent
Lang

(10) Patent No.: US 12,198,822 B2
(45) Date of Patent: Jan. 14, 2025

(54) METHOD FOR THERMAL PERFORMANCE MONITORING OF A NUCLEAR POWER PLANT USING THE NCV METHOD

(71) Applicant: Fred Donald Lang, Salt Spring Island (CA)

(72) Inventor: Fred Donald Lang, Salt Spring Island (CA)

(73) Assignee: LANG FAMILY TRUST, Leawood, KS (US)

( * ) Notice: Subject to any disclaimer, the term of this patent is extended or adjusted under 35 U.S.C. 154(b) by 0 days.

(21) Appl. No.: 18/444,473

(22) Filed: Feb. 16, 2024

(65) Prior Publication Data
US 2024/0296966 A1    Sep. 5, 2024

Related U.S. Application Data

(63) Continuation-in-part of application No. 17/887,860, filed on Aug. 15, 2022, now abandoned, which is a
(Continued)

(51) Int. Cl.
| | |
|---|---|
| *G21C 17/032* | (2006.01) |
| *G21C 7/32* | (2006.01) |
| *G21C 17/022* | (2006.01) |

(52) U.S. Cl.
CPC ............. *G21C 17/032* (2013.01); *G21C 7/32* (2013.01); *G21C 17/022* (2013.01)

(58) Field of Classification Search
CPC ....... G21C 17/032; G21C 7/32; G21C 17/022
See application file for complete search history.

(56) References Cited

U.S. PATENT DOCUMENTS

| | | |
|---|---|---|
| 2,708,656 A | 5/1955 | Fermi et al. |
| 6,714,877 B1 | 3/2004 | Lang |
| | (Continued) | |

FOREIGN PATENT DOCUMENTS

| | | |
|---|---|---|
| AU | 2006-201203 A1 | 10/2007 |
| CA | 2541197 C | 11/2011 |
| | (Continued) | |

OTHER PUBLICATIONS

R. Sher, Fission-Energy Release for 16 Fissioning Nuclides, NP-1771 Research Project 1074-1, Stanford University, prepared for Electric Power Research Institute, Palo Alto.

R.C. Ball, et al., Prompt Neutrino Results from Fermi Lab, American Institute of Physics Conf. Proceedings 98, 262 (1983), via https://doi.org/10.1063/1.2947548.

T.K. Lane, Delayed Fission Gamma Characteristics of 235U, 238U and 239Pu, Applied Nuclear Technologies, Sandia National Lab., 2014.
(Continued)

*Primary Examiner* — Michael C Zarroli

(57) ABSTRACT

This invention relates to the monitoring and diagnosing of nuclear power plants for its thermal performance using the NCV Method. Its applicability comprises any nuclear reactor such as used for research producing a useful output. Its greatest applicability lies with conventional Pressurized Water Reactor and Boiling Water Reactor nuclear plants generating an electric power. Its teachings of treating fission as an inertial process, a phenomena which is self-contained following incident neutron capture, allows the determination of an absolute neutron flux. This process is best treated by Second Law principles producing a total fission exergy. This invention also applies to the design of fusion thermal systems regards the determination of its Second Law viability and absolute plasma flux.

34 Claims, 6 Drawing Sheets

Related U.S. Application Data continuation-in-part of application No. 17/586,033, filed on Jan. 27, 2022, now abandoned, which is a continuation-in-part of application No. 17/575,343, filed on Jan. 13, 2022, now abandoned, which is a continuation-in-part of application No. 17/300,856, filed on Nov. 30, 2021, now abandoned.

(60) Provisional application No. 63/292,489, filed on Dec. 22, 2021, provisional application No. 63/360,510, filed on Oct. 8, 2021, provisional application No. 63/360,390, filed on Sep. 24, 2021.

(56) References Cited

U.S. PATENT DOCUMENTS

| | | |
|---|---|---|
| 6,799,146 B1 | 9/2004 | Lang |
| 6,810,358 B1 | 10/2004 | Lang et al. |
| 7,328,132 B2 | 2/2008 | Lang |
| 7,809,526 B1 | 10/2010 | Lang |

FOREIGN PATENT DOCUMENTS

| | | |
|---|---|---|
| CA | 2754638 C | 7/2014 |
| EP | 1835228 B1 | 7/2010 |

OTHER PUBLICATIONS

W.L. Goffe, G.D. Ferrier & J. Rogers, Global Optimization of Statistical Functions with Simulated Annealing, J. of Econometrics, vol. 60, No. 1/2, pp. 65-100, Jan./Feb. 1994.

M.F. James, "Energy Released in Fission", Journal of Nuclear Energy, vol. 23, pp. 517-536, 1969.

S. Li, "Beta Decay Heat Following 235U, 238U and 239Pu Neutron Fission", PhD Dissertation, U. of Massachusetts, 1997.

A. Sills, "When Stars Collide", Astronomy Magazine, May 2020, p. 68.

Enrico Fermi, Thermodynamics, Dover Publications, Garden City, NY, 1956, first published in 1937; see Chapter V.

J.H. Keenan, Thermodynamics, John Wiley & Sons, London, 1941; see Chapter XXIV.

US NRC wed-sites: https://lersearch.inl.gov/ENSearchCriteria.aspx and https://lersearch.inl.gov/LERSearchCriteria.aspx.

J.R. Lamarsh, Introduction to Nuclear Reactor Theory, Addison-Wesley Publishing Company, Reading, MA, 1966; pp. 105, 291+.

M. Fallot, "Getting to the Bottom of an Antineutrino Anomaly", Physics, 10, 66, Jun. 19, 2017, American Physical Society.

Fred D. Lang, Fuel Consumption Index for Proper Monitoring of Power Plants—Revised, ASME Conference, IJPGC 2002-26097, Jun. 24-26, 2002.

Bases for Second Law Equations

Bases for First Law Equations

METHOD FOR THERMAL PERFORMANCE MONITORING OF A NUCLEAR POWER PLANT USING THE NCV METHOD

CROSS-REFERENCE TO RELATED APPLICATIONS

This application is being filed as a Continuation-In-Part of U.S. Utility application Ser. No. 17/887,860 ('860) filed Aug. 15, 2022. '860 was filed as a Continuation-In-Part of U.S. Utility application Ser. No. 17/586,033 ('033) filed Jan. 27, 2022. 033 was filed as a Continuation-In-Part of U.S. Utility application Ser. No. 17/575,343 ('343) filed Jan. 13, 2022. '343 was filed as a Continuation-In-Part of U.S. Utility application Ser. No. 17/300,856 ('856) filed Nov. 30, 2021. '860, '033, '343 and '856 are hereby incorporated by reference in their entireties and for all purposes. '343 was also filed claiming priority benefits under Title 35 U.S.C. 119 (e) of U.S. Provisional Application 63/292,489 ('489) filed Dec. 22, 2021. '856 was also filed claiming priority benefits under Title 35 U.S.C. 119 (e) of U.S. Provisional Applications 63/360,510 ('510) filed Oct. 8, 2021 and 63/360,390 ('390) filed Sep. 24, 2021. These Provisional Applications '489, '510 and '390 are incorporated herein by reference in their entireties and for all purposes.

COPYRIGHT NOTICE

A portion of the disclosure of this patent document contains material which is subject to Copyright protection. The Copyright owner has no objection to the facsimile reproduction by anyone of the patent document or the patent disclosure, as it appears in the Patent and Trademark Office patent file or records, but otherwise reserves all Copyright rights whatsoever.

BACKGROUND OF THE INVENTION

Field of the Invention

The objective of patent law is to protect both inventor benefits and public benefits as invention is fostered. Commensurate with public benefit, the inventor openly teaches his art thereby providing technical progress to society. This disclosure, although complex, well teaches to the common nuclear engineer; as such it must be thoroughly understood before searches and claims are initiated.

This invention relates to a method for adjusting operating parameters in a nuclear power plant based on unique formulations of the laws of thermodynamics. Said adjustments derive from processing monitoring plant data, analyzing that date using the formulations and taking action based on the analyzed results. The method uses a Neutronics/calorimetrics/Verification (NCV) Method. It applies to any nuclear fission reactor such as used for modular systems, micro-reactors, gas-cooled and liquid metal cooled systems, fast neutron systems, and the like; all producing a useful power output. Its greatest applicability lies with conventional "Pressurized Water Reactor" (PWR) and "Boiling Water Reactor" (BWR) nuclear plants which generate electric power; i.e., the "Light Water Reactor" (LWR). NCV Methods employ a plurality of thermodynamic laws based on First Law conservation of energy flows and Second Law exergy analyses, said plurality solving simultaneously for neutron flux and system thermodynamics (major boundary terms and system mass flows).

Description of Related Art

Nuclear engineering methods have evolved since the 1940s. Beside obvious mass to "energy" conversion, $\Delta E = c^2 \Delta m$, certain nuclear parameters are now computed with a greater accuracy than may be directly measured. Examples comprise: MeV/Fission values by nuclide; anti-neutrino creation given B" radiation after neutron decay; Doppler broadening affects as a function of temperature; axial effects on neutron flux of control rod movement; nuclear generated decay heat after shutdown; etc. These parameters, having high accuracy, are computed by the nuclear engineer using established art. However, an area in which nuclear engineering remains weak is the on-line determination of an absolute neutron flux present in large power reactors. There are three reasons for this weakness. The first reason is that, traditionally, the nuclear engineer only cares about a change in flux; e.g., an exponential increase is an important safety concern regarding prompt criticality. To obtain a desired thermal load, the light water reactor operator simply changes the systems' Thermal Utilization Factor, thereby changing neutron flux and thus the rate of fission. A second reason for not emphasizing an absolute, average flux is the difficulty in its direct measurement. Typical reactor operations will see many orders of magnitude change in neutron flux from zero at startup to full power, exceeding $10^{12}$ $^1n_0$ cm$^{-2}$ sec$^{-1}$. The long-time practice is to employ fission chambers placed at the nuclear core's boundary. However, the signal from fission chambers is subject: a) to inherent diffusion and leakage of flux at the boundary; b) to consumption of its $^{235}$U material; and c) the fact that fission chambers cannot track nuclear burn-up. Fission chamber output is not representative of the nuclear core's changing MeV/Fission values given Pu buildup. The trend of its fission density per second [$\Phi_{FC}\Sigma_{F-35}$] is simply not representative of the nuclear core; thus adding to system uncertainty. Yes, periodically fission chambers are replaced; but, at best, produce a relative measurement requiring normalization to the current average flux. Fission density per second must be computed in real-time for system understanding. A third reason lies with neutron diffusion theory, which describes the flux's shape but not its magnitude.

Another area leading to a lack of system understanding, indeed a classic lack, is the measurement of fluid flow in large pipes. The typical LWR employs coolant pipes, which, for a 800 MWe unit and above, are greater than 30 inches in diameter for each coolant loop. Flows in a LWR's "Reactor Vessel" (RV) typically exceed 120 million lbm/hr. The most commonly used flow instruments are non-invasive such as ultrasonic. Ultrasonic measured flows, and indeed any measurement from a non-direct instrument, must be normalized as they are relative indications. For those pipes less than ≈18 inches, direct measurements based on flow meters are common. Historically large "Nuclear Steam Supply System" (NSSS or NSS System) mass flows have been deduced from First Law conservation of Turbine Cycle (TC) energy flows. System errors using such techniques typically range between ±3 to ±5%. NRC engineers have stated to this inventor that ±2% uncertainty in thermal power, computed using NRC procedures, is adequate. At least one vendor of ultrasonic flow measurements quoted ±0.35% error regard to RV mass flow. However, without an established nexus between neutron flux and coolant flow—generically between neutronics and system-wide thermodynamics—with legitimate verification, no cited variance has meaning.

There is no monitoring system, including any analytical diagnostic method, associated with a nuclear power plant which addresses the whole system in a comprehensive manner. There is no system which relates absolute neutron flux to reactor coolant flow, to working fluid flow through the Turbine Cycle, to gross electrical generation . . . and which provides verification of results that has demonstrable accuracy. A more accurate monitoring technology with diagnoses is needed for the NSSS.

The idea of results verification associated with the thermal performance monitoring of power plants, although new when applied to the NSSS, is not new when applied to fossil-fired power plants. This inventor has been granted a number of patents related to understanding fossil-fired systems and associated verification teachings. Although none of these patents relate to nuclear power, one of these prior art has been modified for this invention. Such teachings are found in: U.S. Pat. No. 7,328,132 issued Feb. 5, 2008; U.S. Pat. No. 7,809,526 issued Oct. 5, 2010; and U.S. Pat. No. 6,714,877 issued Mar. 30, 2004 (hereinafter '132, '526 and '877). '132 and '526 contain the same relevant section entitled "Correction of Choice Operating Parameters and System Benchmarking" starting on Col. 44 in '132, and starting on Col. 42 in '526. '877 teaches the determination of correction factors associated with fossil-fired power plants applied to measured gaseous effluents and other parameters associated with fossil fuel combustion. This same prior art appears in several related non-US patents: Canadian 2,541,197 & 2,754,638; European 1,835,228 (GB, DE, IE, CH); and Australian 2006-201,203. In addition to these patents, another prior art, important to this invention, describes how to synchronize data originating from different sources, each source having a different time reference. This synchronizing invention is described in U.S. Pat. No. 6,810,358 issued Oct. 26, 2004 (hereinafter '358). One application of technology taught in '132, '526, '877 and '358 resulted in winning ASME's prestigious Prime Mover's Award.

It must be emphasized that the inventor's prior technologies of '132, '526 & '877, and the teachings herein, do not employ "statistic" or "scholastic" methods, as applied thermodynamically. Statistic & scholastic methods are herein defined as comprising: neural networks; artificial intelligence; fuzzy logic; pattern recognition; data interrogation; application of corrective relationships applied to as-tested data which correct plant data to vendor-design standards (herein termed "vendor curves"); and similar techniques. Opposing these methods, the Second Law as applied herein is concerned with the thermodynamic direction of a thermal engine; that is, its destruction of a delivered potential for power, said destruction resulting in the creation of useful power output and irreversible losses. Simply stated, statistic & scholastic methods would claim to benefit the thermodynamic understanding of any system through signal manipulation. This misguided claim is based on: assuming linearity among system variables; ignoring variance-covariance matrix; ignoring computational closure involving First and Second Law system thermodynamics; and ignoring independent verification (i.e., numerically demonstrating that the system is thermodynamically understood).

Regard assumptions of linearity, note that an 800 MWe power plant monitors >40,000 signals. Given massive data streams—coupled with thermal systems those thermodynamic states comprise subcooled, saturated, superheated and (possibly) supercritical regions, which all are non-linear requiring imperfect intensive measurements—the idea of accurately forming variance-covariance matrixes required for scholastic methods is simply not feasible.

The use of a variance-covariance matrix required for tolerance analyses, is never provided. For example, turbine vendors do not specify the tolerance range acceptable for piece-wise corrections when using vendor curves. Critical to statistically-based methods is that measurement distributions are multivariate normal. Yet corrections based on vendor curves are not statistically normal.

Many organizations employ statistic and scholastic techniques claiming to improve the accuracy of a computed system-wide understanding (e.g., system thermal efficiency, computed core thermal power, etc.). Said techniques include those offered by: NeuCo of Boston, MA a subsidiary of General Electric Company; ScienTech LLC of Idaho Falls, ID a subsidiary of Curtiss-Wright Corporation; STEAG Energy Services GmbH of Essen, Germany a subsidiary STEAG GmbH; the VISTA program associated with Electric Power Research Institute (EPRI) of Palo Alto, CA, and Black & Vetch of Kansas City; Data Validation and Reconciliation (DVR) procedures sponsored by EPRI; General Physics Corporation of Columbia, MD a subsidiary of GP Strategies Corp; and others.

However, none of these techniques can adjust multiple, system-wide parameters consistent with the laws of thermodynamics and then verify! If such adjustments could be applied to a single parameter, it would be inconceivable that such a parameter would be so chosen and adjusted in just the correct manner to then satisfy said laws for a complex system; and, further, to then serve for positive verification. On the other hand, if a number of parameters are addressed simultaneously there is no method—other than thermodynamically based—which would then achieve system-wide closure.

No known statistic or scholastic method employs any means by which analytical results of a thermal system can be verified. Verification means choosing a computed parameter, derived directly from the laws of thermodynamics applied to the system, which is then verified (compared) to a accurately and directly measured standard. For the PWR or BWR, this means comparing a computed electrical generation—derived directly from conservation of energy flows based on the First Law and exergy analyses based on the Second Law—to the Turbine Cycle's measured electrical generation.

There are two key aspects to the prior art of '132, '526 and '855 verification technology which relate to improved NSSS safety. First, a set of operating variables is chosen, which can be altered to known standards; that is a difference in an operating variable, less its standard, is driven to zero, $\Delta\lambda_{mm} \rightarrow 0.0$. This is achieved by adjusting another set of chosen variables (a secondary set, $\Lambda_{nn}$) whose absolute accuracy is questionable, but given adjustments within a knowable range, drives the set of operating variables to resolution. Given resolution of $\Delta\lambda_{mm}$, verification of system-wide, thermodynamic understanding is thus established without direct involvement of statistics or scholastics; e.g., compare the computed and measured electrical generation.

When considering a "set of Thermal Performance Parameters" (defined below) for the NSS System, two historic and distinct categories of prior art require discussion as their computational approaches need improvement when applied to the NSSS. The First Category consists of both classic First Law efficiencies and Second Law effectivenesses. Parameters used in this First Category includes: RV coolant mass flow, feedwater mass flow, Condenser heat rejection, and other such routine parameters. This Category includes methods which identify the location within the NSSS where a degradation occurs. For fossil-fired power plants, Fuel Consumption Indices, based on Second Law exergy analysis, were used for 20 years for such identification; they require modification for the NSSS. As overview of prior art affecting the NSSS, there is no known methodology which computes First Category terms on a consistent and system-wide bases; and can then verify results. Such an approach requires understanding of the complete system, a nexus between neutronics and system thermodynamics.

Practical application of exergy analysis based on the Second Law for the closed thermal system is quite real. For example, Fuel Consumption Indices have been used for 20 years to improve understanding of fossil-fired power plants (thereinafter FFCI). References for FFCI prior art can be found in US Patent 6, 799, 146 issued Sep. 28, 2004, starting with Col. 5 (hereinafter '146). No reference, or any patent issued to this inventor, teaches FFCI technology applied to the nuclear power plant. New art is required to understand the fission phenomenon in a thermodynamic context, coupled with associated irreversible losses.

Prior fossil-fired technology taught that the total exergy flow supplied to a thermal system ($G_{IN}$) comprised input exergy flows of the fossil fuel, combustion air, in-leakages and shaft powers supplied to the system ($P_P$). The fossil fuel's exergy flow required considerable computational complexity. Thus, for a fossil-fired system (terms defined below):

$$G_{IN} = P_{GEN} + \sum I_k \quad (1BG)$$

where irreversible losses, $EI_k$, was computed by the following:

$$\sum I_k = \sum \left(1.0 - T_{Ref}/T_{hh}\right) \partial Q_{hh} - \sum [P_p - m\Delta h]_{ii} - \int d(mg)_{jj} \quad (2BG)$$

After resolving terms, FFCIs were then formed by simply dividing Eq. (1BG) through by $G_{IN}$, and then multiplying by 1000 for numerical convenience:

$$1.0 = P_{GEN}/G_{IN} + \sum I_k/G_{IN} \quad (3BG)$$

$$1000 = FFCI_{Power} + \sum FFCI_{Loss-k} \quad (4BG)$$

where FFCIs become self-defined. For the fossil system, $P_{GEN}$ was the directly measured electrical generation, $P_{UT}$, plus losses. Verification was based on conservation of combustion gas flows.

$$FFCI_{Power} \equiv 1000 \ [3412.1416(P_{UT} + L_{Mech} + L_{Elect})]/G_{IN} \quad (5BG)$$

$$FFCI_{Loss-k} \equiv 1000 \ I_k/G_{IN} \quad (6BG)$$

Eqs. (1BG) & (4BG) state: a) $G_{IN}$, as the total exergy flow supplied, is "destroyed" by generating only useful power output and irreversible losses; and b) if any FFCI decreases, the operator is assured that commensurate increases are inherently identified, Eq. (4BG) will always sum to 1000. If $FFCI_{Power}$ decreases, one or more $FFCI_{Loss-k}$ terms must increase, and thus are identified (located) within the system. This concept needs to be developed for the NSSS.

The first term of Eq. (2BG) derives from the classic teachings of Nicolas Sadi Carnot (circ 1820s). It requires re-interpretation when applied to the nuclear system. A non-classical interpretation his Carnot Engine is required. Conventionally, the Engine operates an ideal Carnot cycle between infinite bodies having constant source and sink (reference) temperatures. Unconventionally, the Engine produces a theoretical potential which is loss power, an irreversible loss. This potential is destroyed from a portion of $G_{IN}$ and has nothing to do, per se, with a $Q_{hh}$ heat transfer from hot→cold.

The Second Category of Thermal Performance Parameters is that NSSS thermal power generated from nuclear fission is limited by nuclear regulatory authorities in many countries. For an operating NSSS in the U.S., regulation 10CFR50.36 Technical Specification, lists the thermal power limit which cannot be exceeded given listed operational scenarios [e.g., exceeding rated power (termed an "overpower" event), excessive axial flux shifts, loss of a Feedwater heater, etc.]. Said scenarios define a set of licensed operational limits; a given licensed operational limit is herein defined as the "applicable Regulatory Limit" associated with a given operational scenario.

Thermal power generated from a fissioning system (from the NSS System's core) is herein termed "Core Thermal Power" (CTP); an established term used by the nuclear industry throughout the western world. It is generically defined as the total reactor core heat transfer rate to the RV coolant mass flow (a MWt). These words do not appear in 10CRF; however, "Allowable Thermal Power", "Rated Thermal Power" and like terms do appear, they all mean CTP. CTP is herein defined as follows in full agreement with, and in compliance with, the intent of 10CFR50 (terms defined below):

Core Thermal Power is that power exclusively generated by nuclear fission taken as the difference between the energy flow leaving the Reactor Vessel [$m_{RV}h_{RVU}$], less the energy flow input to the Reactor Vessel [$m_{RV}h_{RVI}$], plus Reactor Vessel energy flow losses [$Q_{Loss-RV}$] if originating from nuclear fission, and less non-nuclear Reactor Vessel energy flows which might impact the energy flow input [$\Sigma(m\Delta h)_{Misc}$].

Note that some power reactor licensees may chose to ignore the [$Q_{Loss-RV}$] and/or [$\Sigma(m\Delta h)_{Misc}$] terms as having minor effects on the base core heat transfer rate to the coolant; i.e., $m_{RV}\Delta h_{RVQ}$.

In summary, measures must be taken such that CTP produced by a nuclear power plant never exceeds its established applicable Regulatory Limit. Given the very high Reactor Vessel coolant mass flow in large pipes, current practice is to determine CTP based on a First Law conservation of Turbine Cycle energy flows, only then making transference to the Reactor Vessel and its nuclear power. Currently the industry has no method of directly determining and verifying RV coolant or TC working fluid mass flows. TC-based computations typically assume that an acceptable CTP operational tolerance is +2.0%; thus CTP may drift over a 4% range, but must not exceed the applicable Regulatory Limit. This operational tolerance is herein defined as the "Operating Tolerance Envelope". Thus, the industry allows a misunderstanding of NSSS operations with a 4% range. This is institutionally unsafe as nuclear safety analyses are typically preformed at 102% of CTP. Further, a −2% unclaimed electric power for a 1000 MWe NSSS runs to hundreds of million dollars in lost revenue over the life of the plant. A more accurate method of computing CTP, and a reduction in the current acceptable Operating Tolerance Envelope, are clearly required for improved safety and economic benefits.

The U.S. NRC requires power reactor licensees to report when CTP is exceeded via an Event Notification Report and/or a Licensee Event Report. From 1986 through 2020, almost four dozen such reports were submitted by U.S. licensees involving individual units. Common CTP violations involved: calibration errors involving system flows; assumed flux/flow imbalances; erroneous flow correction factors; excessive Feedwater temperature; mis-calibrated or inaccurate Feedwater flow; inaccuracies in ultrasonic measurements; etc. As suggested by the types of violations, prior art only examines isolated signals. For example: if flux/flow ratios are used to analyze CTP then $\Phi_{TH}$ & $m_{RV}$ require a functional relationship; $P_{GEN}$ & $m_{RV}$ require obvious functionality; correcting Feedwater flow, a $f(m_{RV})$, requires more than guessing as to fouling effects on a flow nozzle, integrity of its pressure taps, and signal reduction & scaling. System solution with system verification is required. References include: /lersearch.inl.gov/LERSearchCriteria.aspx; i.e., when searching on "overpower"; and /lersearch.inl.gov/LERSearchCriteria.aspx.

If the applicable Regulatory Limit on CTP is never to be exceeded, and to reduce the Operating Tolerance Envelope, thus to operate in a safe manner but closer to the applicable Regulatory Limit, improved fine control of the rate of fission is required. In late 1942 the Chicago Pile No. 1 (CP1) experiment established the first framework for controlling sustained nuclear fission. Although 80 year-old prior art, its philosophy and mechanisms for such control survive to this day. CP1 resulted in the first nuclear reactor patent, U.S. Pat. No. 2,708,656 (hereinafter '656), as issued to Enrico Fermi and Leo Szilard on May 17, 1955; it was filed on Dec. 19, 1944 and corrected on Jul. 26, 1955 for spelling errors. '656 Col. 18, Lines 74-75, states: "Construction [of CP1] is continued with the shim rod, control rod and safety rods fully inserted into the reactor". '656 details these mechanisms, generically herein defined as:

"Safety Mechanisms" cause a complete termination of the fissioning process, herein defined as a "TRIP" resulting in essentially no neutron induced fission, ≈zero nuclear power production, such mechanisms are either automated or instigated by the operator;

"Shim Control" mechanisms are semi-permanent design features which cause coarse axial and/or radial changes in the rate of fission over an extended period of time, typically they are not operator instigated; and "Mechanisms for Controlling the Rate of Fission" (hereinafter MCRF) is a singular mechanism or a plurality of mechanisms, instigated by the plant operator, which alter the rate of fission, commonly instigated to achieve fine reactor control.

MCRF also includes Safety Mechanisms if instigated by the operator. Fermi's Safety Mechanisms included control rods and a glass vessel of cadmium solution placed above CP1 to be manually broken. His Shim Control and MCRF were specialized control rods (fixed and movable). "Rate of Fission" in the context of MCRF, is herein defined as any or all of: the fissioning neutron population at any given time; the actual neutron fission rate $[\Phi_{TH}\Sigma_F V_{Fuel}]$; and/or the fission density per second $[\Phi_{TH}\Sigma_F]$. Said fission density per second is herein defined as the "Temporal Fission Density".

For the traditional PWR, boric acid ($H_3BO_3$) fluid is added to the RV coolant as a Safety Mechanism. It is also used in PWRs for Shim Control by varying its concentrations slowly, or step-wise, over time (e.g., every 1 to 3 months). For the traditional BWR sodium pentaborate ($Na_2O \cdot 5B_2O_3$) fluid is used as a Safety Mechanism. For the PWR & BWR, to extend fuel life, Shim Control includes permanently installing rods containing Burnable Absorbers positioned axially with differing concentrations (e.g., $Gd_2O_3$, $U_3Si_2$, elemental B, Hf, Cd, Ag, In, etc.). For the BWR, Shim Control can also involve periodically repositioning control rods. In summary, for the modern LWR, when exercising MCRF for fine adjustments, the operator will typically engage physical mechanisms which alter the "Thermal Utilization Factor" (TUF). TUF is herein defined as the ratio of the number of neutrons absorbed in the fuel which induce fission, versus the total number of neutron absorptions in the nuclear core; i.e., in the fuel, moderator, structural materials, long term poisons and designated Mechanisms for Controlling the Rate of Fission. For the LWR, changing TUF means moving control rods (i.e., their axial position, thus adding or removing neutron absorptions in the nuclear core), and/or altering reactor flow to change the volume of voids present in coolant channels. Neutronically, for the LWR, when the operator has instigated MCRF he/she is making changes in the TUF, and thus the Temporal Fission Rate, and thus nuclear power. MCRF must consider temporal $^{135}$Xe and $^{149}$Sm poisons as affecting TUF.

The U.S. NRC requires power reactors to be designed with a negative "Void Coefficient of Reactivity" (VCR). VCR is herein defined as the change in reactivity per percent change in the nuclear core's void volume. A negative VCR means that as the void volume increases, the rate of fission decreases, by neutronic design. For the traditional PWR, VCR has no influence on routine control. A PWR's MCRF is instigated by withdrawing control rods increasing Temporal Fission Density, and thus a higher CTP; when inserted, the reverse. Consideration of the VCR for BWR control is obviously important as it is directly affected by MCRF. For the typical BWR, MCRF is instigated by the operator by changing recirculation flow in the reactor, in conjunction—for some designs—with moving control rods. When controlling through recirculation, mass flow delivered to the Reactor Vessel does not necessarily change. An increased reactor flow suppresses boiling given that additional energy flow is required for fluid saturation. The axial position where Departure from Nucleate Boiling (DNB) occurs moves upward, the nuclear core void volume decreases. The resulting increase in reactivity, increases nuclear power; this continues until the DNB boundary and the void volume are restored and the reactor's reactivity returns to ≈unity, given an overall negative VCR. The reverse mechanism occurs when decreasing recirculation, resulting in a lower CTP. In both cases, void volume changes are transient in nature, eventually returning to near design levels with an altered recirculation flow and CTP. For the BWR, when instigating MCRF there are a number of mechanisms available to the operator. For example, BWRs have been designed with recirculation flow controlled using variable speed pumps, flow control values, and/or jet pumps whose motive flow is delivered via RV pumps. For other BWRs, MCRF is achieved via direct control rod movement without changes to reactor flow. BWR control rods comprise $B_4C$ and/or hafnium (Hf), whereas PWR rods are typically 80% Ag, 15% In and 5% Cd.

Although the above prior art description of reactor control-generically defined as Safety Mechanisms, Shim Control and a Mechanisms for Controlling the Rate of Fission—have been assumed applicable to the typical LWR, the concept involving MCRF is to be taken generically. Although negative VCR is a feature of U.S. designed power reactors and the Canadian Advanced CANDU, positive VCR are featured in the CANDU a Heavy Water Reactor (HWR), the Soviet RBMK and most LMFB designs. Graphite moderated, gas cooled and pebble bed reactors have zero VCR. Control of any nuclear reactor is fundamentally dependent on an operator instigating MCRF. These definitions are important when defining this invention. They are based on prior art, well known to any nuclear engineer, and are fundamentally old as '656.

In summary, to increase Core Thermal Power the operator will instigate MCRF which increases TUF (e.g., thus for the LWR, control rods will be withdrawn and/or coolant recirculation will be increased); to decrease Core Thermal Power the operator will instigate MCRF which decreases TUF (e.g., thus control rods will be inserted, and/or coolant recirculation will be decreased).

Historically the nuclear industry has had reluctance towards exergy analysis, and especially when considering nexus between the exergy concept and $\Phi_{TH}$. Interestingly, this originated with the invention of CP1. In describing CP1's power, Fermi well understood that it was directly related to Temporal Fission Density based on in-core irradiated foils, thus $\propto(^{235}U$ fission rate). In '656, Col. 21, Lines 55-74, he correctly computed CP1's nuclear power as $f[\Phi_{TH}\Sigma_{F\text{-}35}v_{REC\text{-}35}]$:

$$\text{Fermi's Nuclear Power} = f[\text{Indium foil radioactivity,} \quad 200\text{ MeV/Fission}] \tag{7BG}$$

However, although CP1 was convectively cooled, its graphite moderated design was upscaled to the first plutonium production X-10 Pile at Oak Ridge, and then later to the large N Reactor at Hanford, WA. Rating of the N Reactor was assessed only in terms of its thermal power ($\dot{m}\Delta h$), at 4000 MWt being cooled by the Columbia River. But in Fermi's 1937 text on thermodynamics, he enhanced Gibbs' free energy principle by developing a thermodynamic "potential" (a form of thermodynamic availability), based on Second Law principles. This same potential and the generic exergy concept ($\dot{m}\Delta g$, at the time termed "thermodynamic availability") were fully developed by Keenan in 1941. Exergy analysis gained acceptance over the following 20 years, fully employed in Europe and the Soviet Union by the 1960s and now used world-wide. Throughout these 80 years, no nexus was made between $\Phi_{TH}$ and $\dot{m}\Delta g$. In Fermi's defense for not recognizing analytics between PH and his own "potential" concept (or Keenan's teachings), he had limited understanding of N Reactor's flux; indium foils used at N Reactor produced no obvious insight into a $\dot{m}\Delta g$ description of the cooling fluid. Neutron Transport Theory (NTT) proposed during the Manhattan Project, fully capable of computing an absolute $\Phi_{TH}$, required a supercomputer not available until 1964. References include: E. Fermi, *Thermodynamics*, Dover Publications, Garden City, NY, 1956, first published in 1937, Chapter V; and J. H. Keenan, *Thermodynamics*, John Wiley & Sons, London, 1941, Chapter XXIV.

Such reluctance has history. As important prior art, the well-used nuclear engineering text book by Lamarsh taught that thermal power (MWt generated) produced from fission is computed as:

$$\text{Lamarsh's Thermal Power} = C_E \Phi_{TH} \Sigma_F V_{Fuel} \overline{v}_{REC} \tag{8BG}$$

Lamarsh did not compute thermal power (a simple $\dot{m}\Delta h$), but rather nuclear power ($\dot{m}\Delta g$); his "power" is one-half the real thermal power. Such history led to minimizing what was not understood. Without nexus between $\Phi_{TH}$ and system fluid properties, the industry turned to elaborate heat transfer correlations. Without nexus between $\Phi_{TH}$ and coolant mass flow, Three Mile Island melted, freezing the U.S. industry for decades. Reference is J. R. Lamarsh, *Introduction to Nuclear Reactor Theory*, Addison-Wesley Publishing Company, Reading, MA, 1966; pp. 105, 291+.

A long-standing issue in the commercial nuclear power industry is so-called "NVT Damage". It has been observed that a neutron flux will disrupt molecular structures, including building materials, caused by neutron scattering. Such damage is dependent on: the magnitude of the flux, the number of neutrons [N]; the velocity distribution of the flux [V]; and irradiation time [T]. To monitor NVT Damage, material samples (steel and the like) are placed in capsules called "coupons" and placed throughout the Reactor Vessel for later retrieval and analyses. Although the distribution of neutron flux may be understood; such distribution tells nothing about its magnitude. What is needed is an method of determining the absolute magnitude of flux, useful for maintenance and end-of-RV-life.

In summary, the above discussions of prior art suggest improved understanding of the nuclear power plant is greatly needed . . . a nexus between neutronics and thermodynamics. Specifically, a method for computing absolute neutron flux and Temporal Fission Density, simultaneously with major system parameters; with embedded verification. Needed are improved First and Second Categories. Development of a NSS System monitoring technique is required, amenable for rapid identification of degraded components; thus a "Fission Consumption Index" (FCI). As is true for First Category parameters, is true for the Second . . . Core Thermal Power requires a consistent, direct and verifiable computational method-base on a computed RV coolant mass flow rate derived from system solution.

BRIEF SUMMARY OF THE INVENTION

This invention relates to any nuclear system producing a "useful power output", herein defined as any combination of a conventional energy flow (e.g., a steam flow used for space heating) and/or an energy flow developing shaft power delivered to a turbine-generator resulting in electric power. This invention especially relates to large, commercial PWRs and BWRs producing electric power. The method of this invention, the NCV Method, uniquely determines parameters descriptive of the complete NSS System: from the absolute average neutron flux—the driving force behind nuclear power—to the Turbine Cycle's heat rejection. The NCV Method comprises a plurality of laws of thermodynamics: conservation of energy flows based on the First Law, and exergy analyses based on the Second Law. Application of said laws does not involve statistic or scholastic methods. The base NCV assumption is that the fission phenomenon is an inertial process, detailed below. Said assumption, fundamentally, allows determination of the average neutron flux in nexus with system thermodynamics. The NCV Method has no mechanism for determining neutron flux in isolation! In its Preferred Embodiment, the NCV Method computes average neutron flux simultaneously with Reactor Vessel coolant mass flow, useful power output and the Turbine Cycle's Condenser heat rejection; such quantities derived from four "governing equations" (defined below) solved by routine matrix algebra.

The method's details are based on: a Neutronics Model which comprises off-line neutronics, equipment design and regulatory data [N]; a calorimetrics Model comprising thermo-dynamic equations having declared unknowns and on-line inputs [C]; and, upon resolution of the calorimetrics Model, results may be independently confirmed using a Verification Procedure [V]. This is the "NCV Method". When on-line, and all features implemented, the NCV Method produces a set of verified Thermal Performance Parameters which are used by the operator for improved control.

The NCV Method is flexible, in the Preferred Embodiment, its four governing equations are solved simultaneously for four unknowns; Verifications Procedures may then be applied via user option. However, there are a number of Alternative Embodiments which involve manipulations of the four governing equations; e.g., reduction in the number of declared unknowns, combining two equations or sets of equations for special purpose, lone equations used for single variant trending, the substitution of neutron flux with Temporal Fission Density, etc. Although generally applicable to steady state analysis, most importantly Alternative Embodiments may be applied to transient analysis.

It is generally agreed that commercial nuclear power plants operate within a 4% uncertainty window. That means NSSS operators, truly, do not understand their systems within at least ±2%. In this context "not understanding" means an inability to demonstrate First Law NSS System conservation of energy flows. It means that without a system solution-involving neutron flux, RV coolant mass flow, useful power output and TC heat rejection-true understanding of the of system, with possible verification, is not possible. The NCV Method reduces such operational uncertainty. When fully applied the following operational actions are afforded the operator:

Computing an accurate Core Thermal Power (with possible verification) based on computed coolant mass flow ($m_{RV}$), allows closer operation to the applicable Regulatory Limit.

Predicting NVT damage knowing a highly accurate, verified, computed average neutron flux ($\Phi_{TH}$), thus improving predictions of NSSS operational life.

Fission chamber flux data can now be normalized to the computed average flux ($\Phi_{TH}$).

Nuclear burn-up is predictable knowing a computed and verified Temporal Fission Density.

Enhanced safety is created by knowing the ratio of computed flux ($\Phi_{TH}$) to electrical generator frequency; flux to current; flux to generator's reactive load; and the like.

Applied NSSS thermodynamics allows a total exergy flow supplied ($G_{IN}$), useful power output and component irreversibilities ($I_k$) to be computed; thus leading to Fission Consumption Indices and improved component monitoring.

A highly accurate Turbine Cycle thermal efficiency is now known based on the computed Condenser heat rejection ($Q_{REJ}$), eliminating uncertainties in Low Pressure (LP) turbine exhaust extensive properties and flows.

Consistent Turbine Cycle component thermal performances are known based on a computed and verifiable feedwater mass flow (based on neutron flux, useful power output and heat rejection), including LP turbine performance.

The ability to verify NSSS global understanding by comparing the computed shaft power ($P_{GEN}$) to a reference value based on measured electrical generation, reducing differences using a Verification Procedure.

The key to all of the above is NCV resolution of system coolant and working fluid flows. Thermal systems are complex. True understanding of individual NSSS components must be based on consistent system-wide solution of its mass flows, useful power output, neutron flux and heat rejection.

DETAILED DESCRIPTION OF THE INVENTION

Figure 1:
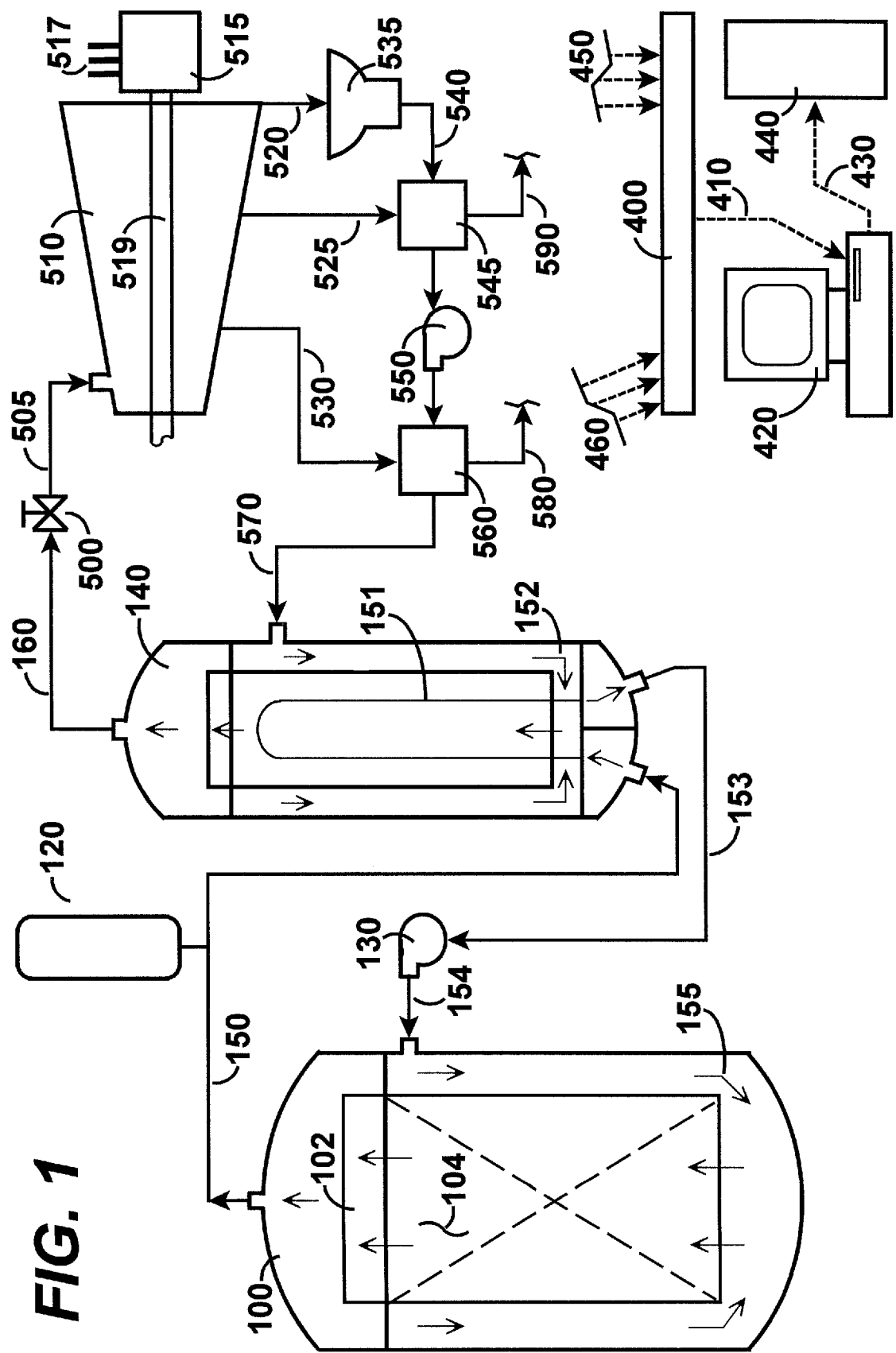
FIG. 1 is a representation of a PWR. Included in FIG. 1 is a representation of the data acquisition system required to implement the NCV Method.

To assure an appropriate teaching, descriptions of the NCV Method and its apparatus are divided into the following sub-sections. The first two present Definitions of Terms and Typical Units of Measure, and the important Meaning of Terms. The remaining eight subsections, representing the bulk of the teachings, are divided into: Second Law Foundational Equation; First Law Equations; Second Law Pseudo Fuel Pin Model etc. This DETAILED DESCRIPTION section is then followed by the important INDUSTRIAL APPLICABILITY section.

Definitions of Terms and Typical Units of Measure

Nuclear Terms:

$B_F^2$=Nuclear pseudo-buckling used in the PFP Model; cm$^{-2}$.

$C_{\varphi \upsilon}$, $C_{d\upsilon}$ & $C_{FLX}$=>Defined constants associated with SEP & COP via Eqs. (5), (55) & (63); unitless.

$C_{MAX}$=Defined by TABLE 2 regarding conversion of $\Phi_{MAX}$ to an average $\Phi_{TH}$; unitless.

$k_{EFF}$=Effective neutron multiplication coefficient; unitless.

$M_{FPin}$=Number of fuel pins heating the nuclear core's coolant; unitless.

$M_{TPin}$=Number of total fuel pin cells available for coolant flow within the nuclear core; unitless.

$M_T^2$=Thermal neutron migration area ($M_T$ is the diffusion length plus √Fermi Age); cm$^2$.

$Q_{REC}$=Recoverable exergy flow from fissile materials; Btu/hr.

$Q_{TNU}$=Total antineutrino (and possibly neutrino) exergy flow from fission, same as $Q_{NEU-Loss}$; Btu/hr.

$V_{Fuel}$=Volume of nuclear fuel consistent with the total macroscopic cross section; cm$^3$.

$\bar{\upsilon}_{XX}$=Average exergy per fission release [this symbol is not $^1n_0$/Fission]; MeV/Fission.

$\Xi$=Inertial Conversion Factor, user input, etc., or defined by Eq. (9B); unitless.

$\Sigma$=Summation of terms.

$\Sigma_{F\text{-}j}$=Macroscopic fission cross section for isotope j; cm$^{-1}$.

$\Phi_{FC}$=Indicated thermal neutron flux derived from fission chamber data; $^1n_0$ cm$^{-2}$ sec$^{-1}$.

$\Phi_{MAX}$=Maximum theoretical flux associated with a cosine or Clausen profile; $^1n_0$ cm$^{-2}$ sec$^{-1}$.

$\Phi_{TH}$=Average neutron flux numerically satisfying the calorimetrics Model; $^1n_0$ cm$^{-2}$ sec$^{-1}$.

$[\Phi_{TH}\Sigma_F]$=Temporal Fission Density, flux x avg. macroscopic fission cross section; $^1n_0$ cm$^{-3}$ sec$^{-1}$.

$\psi_{LRV}$=$\Phi_{TH\ LRV}$(t), flux times irreversible antineutrino & neutrino loss; cm$^{-2}$ sec$^{-1}$ MeV/Fission$^{-1}$.

$\Omega$=Clausen Function's argument, $Cl_2$ ($\Omega$); unitless.

System Terms:

$C_{FWF}$ & $C_{RVF}$=>Defined constants associated with SEPs via Eqs. (66) & (67); unitless.

$C_{CDP\text{-}k3}$=Ratio of the k3$^{th}$ pump mass flow in the Condensate System to a reference $m_{FW}$; mass ratio.

$C_{TUR\text{-}Aux}$=Ratio of the Auxiliary Turbine mass flow at throttle to a reference $m_{FW}$; mass ratio.

$FCI_{Loss\text{-}k}$=FCI for the kth process descriptive of an irreversible loss; unitless.

$FCI_{Power}$=FCI for the NSSS's process of creating a useful power output; unitless.

g=(h−$h_{Ref}$)−$T_{Ref}$(S−$S_{Ref}$), fluid specific exergy (also termed "available energy"); Btu/lbm.

$G_{IN}$=Total exergy flow supplied to a thermal system (e.g., nuclear & shaft power inputs); Btu/hr.

$h_{Ref}$=Reference fluid specific enthalpy used for exergy's definition: $f(P_{Ref}, x=0.0)$; Btu/lbm.

$I_k$=Irreversibility of the kth process; Btu/hr $L_{Elect}$=Generator electrical losses, variable as $f(P_{GEN})$; KWe.

$L_{Mech}$=Generator mechanical losses, fixed as $f(P_{GEN})$; KWe.

m or $\dot{m}$=Mass flow of fluid; lbm/hr.

m$\Delta$g or $\dot{m}\Delta$g=Exergy flow, also termed available power; Btu/hr.

m$\Delta$h or $\dot{m}\Delta$h=Energy flow, also termed thermal power; Btu/hr.

$MC_{\Lambda nn}$=Dilution Factor for COP $\Lambda_{nn}$, used in Eq. (68); unitless.

$P_{FWP\text{-}Aux}$=Energy flow credit for a TC Auxiliary Turbine driving a FW pump, see Eq. (15); Btu/hr.

$P_{GEN\text{-}REF}$=Reference useful power output delivered to the turbine-generator, via Eq. (14A); Btu/hr.

$P_{GEN}$=Useful power output delivered to the turbine-generator, via Eq. (14B); Btu/hr.

$P_{X\text{-}ii}$=Motive power delivered to the ii$^{th}$ individual X subsystem pump; Btu/hr.

$P_{Ref}$=Reference pressure for exergy analysis: $P_{Ref}$=$f(T_{Ref}, x=0.0)$; psiA.

$P_{UT}$=Gross electric power output measured at the generator terminals; KWe.

$Q_{CTP}$=Core Thermal Power, an energy flow, defined herein; Btu/hr.

$Q_{Loss\text{-}RV}$=Vessel insulation losses from the RV, given $T_{RVI}$ is the vessel's shell temperature; Btu/hr.

$Q_{Loss\text{-}SG}$=Vessel insulation losses from the SG, given $T_{FW}$ is the vessel's shell temperature; Btu/hr.

$Q_{Loss\text{-}TC}$=Miscellaneous TC equipment insulation losses (turbine casing, FW heaters, etc.); Btu/hr.

$Q_{REJ}$=Condenser heat rejection from the TC, an energy flow; Btu/hr.

$Q_{SG}$=Net energy flow delivered to PWR's SG from the RV or directly to the BWR's TC; Btu/hr.

$Q_{TCQ}$=Net energy flow delivered to the Turbine Cycle including pump power; Btu/hr.

r=Core radius, fission chambers are assumed at the core's boundary, $r_{FC}$=R; cm.

$r_0$=Outside radius of the fuel pellet, for the PFP Model; cm.

$s_{Ref}$=Reference fluid specific entropy used for exergy analysis: $f(P_{Ref}, h_{Ref})$; Btu R$^{-1}$ lbm$^{-1}$.

$T_{Ref}$=Reference temperature for exergy analysis, defined by user, etc., or via Eq. (10); ° F. or ° R.

$T_{Sat}$=Saturation temperature associated with the shell-side of a heat exchanger; ° F. or ° R.

u=Fluid specific internal energy; Btu/lbm.

v=Fluid specific volume; ft$^3$/lbm.

x=Steam quality; mass fraction.

y=Axial distance of active nuclear core from entrance, at temperature; cm.

z=Axial distance of active nuclear core from centerline, at temperature; cm.

Z=Half-height of the active nuclear core, at temperature; cm.

ε=Second Law effectiveness (termed in some text books as Second Law efficiency); unitless.

η=First Law efficiency; unitless.

$\Delta\lambda_{mm}$=Difference between the mm$^{th}$ System Effects Parameter and its reference value; local units.

$\Lambda_{nn}$=The nn$^{th}$ Choice Operating Parameter; local units.

Subscripts and Abbreviations:

b, hh, i, ii, iii, j, jj, jjj, k, kk, k1, k2, k3, k4, k5, k6, mm, ml, n, nn=>Denote indices: 1, 2, 3, . . . .

BOP=Balance-of-Plant refers to all equipment & subsystems outside the Secondary Containment.

CDP-k3=The k3$^{th}$ pump found in the Turbine Cycle's Condensate System.

CDS=Condenser's saturation temperature, a function of its shell's operating pressure.

COP=Choice Operating Parameter.

CTP=Core Thermal Power.

FCI=Fission Consumption Index.

FWP-k2=The k2$^{th}$ Feedwater pump found in the Turbine Cycle (i.e., non-Condensate pumps).

FWH-k6=The k6$^{th}$ Feedwater heater.

HP or LP=High or Low Pressure

HWR=Heavy Water Reactor.

LMFB=Liquid Metal Fast Breeder reactor.

LWR-Light Water Reactor.

MCRF=Mechanisms for Controlling the Rate of Fission.

MSR=Moisture Separator Reheater.

MWD/MTU=Megawatt-Days per Metric Tonne of Uranium metal.

NFM=Nuclear Fuel Management.

NRC=United States Nuclear Regulatory Commission.

NSSS or NSS System=Nuclear Steam Supply System [comprising a RV, SG (if used) and BOP].

PFP=Pseudo Fuel Pin Model.

RV=Reactor Vessel.

RVP-k1=The k1th Reactor Vessel pump.

SEP=System Effect Parameter.

SG=PWR Steam Generator.

TC=Turbine Cycle.

TUR=Main steam turbine [the k4$^{th}$ HP or k5$^{th}$ LP stage group], or the Auxiliary Turbine [Aux].

X=Indication of a NSSS pump [RVP, FWP or CDP], or a steam turbine [TUR].
XX=Indication of a fission release defined in TABLE 3 and discussion; [e.g., XX=REC].

Subscripts Referencing a Fluid's Intensive or Extensive Property [e.g., $h_{RVI}$=RV Inlet Enthalpy]:
 FW=Final feedwater from the TC, FIGS. 1 & 2 start of Item 570.
 RCI=Reactor coolant inlet to the nuclear core, FIG. 1 Item 155, or FIG. 2 Item 255.
 RCU=Reactor coolant outlet from the core, FIG. 1 top of Item 104, or FIG. 2 top of Item 204.
 RVX [=] RCU−RCI
 RVI=Reactor Vessel coolant inlet nozzle, FIG. 1 end of Item 154, or FIG. 2 end of Item 254.
 RVU=Reactor Vessel coolant outlet nozzle, FIG. 1 start of Item 150, or FIG. 2 start of Item 250.
 SCI=Steam Generator TC-side coolant inlet to tube bank, FIG. 1 Item 152.
 SGI=Steam Generator reactor-side coolant inlet nozzle, FIG. 1 end of Item 150.
 SGU=Steam Generator reactor-side coolant outlet nozzle, FIG. 1 start of Item 153.
 STI=Steam Generator TC-side coolant inlet, FIG. 1 end of item 570.
 STU=Steam Generator TC-side coolant outlet, FIG. 1 start of item 160.
 TH=Inlet to TC Throttle Valve, FIGS. 1 & 2 Item 500.

Subscripts Referencing Differences Between Quantities [e.g., $\Delta h_{RVQ} = h_{RVU} - h_{RVI}$]:
 RVQ [=] RVU−RVI
 RVX [=] RCU−RCI
 SGQ [=] SGI−SGU, for a PWR; or [=] TH−FW, for a BWR
 STQ [=] STU−STI, for a PWR; or [=] TH−FW, for a BWR
 STX [=] STU−SCI, for a PWR; or [=] TH−FW, for a BWR
 TCQ [=] TH−FW Meaning of Terms The words "Operating Parameters" used within the general scope and spirit of the present invention, are broadly defined as common off- and on-line data obtained from a nuclear power plant as used by the NCV Method. Operating the NCV Method in real-time results in a "complete thermodynamic understanding of the nuclear power plant". Operating Parameters comprise "Off-Line Operating Parameters" and "On-Line Operating Parameters". Further, two subsets of Operating Parameters consist of "System Effect Parameters" (SEP $\Delta \lambda_{mm}$) and "Choice Operating Parameters" (COP $\Lambda_{nn}$) which are exclusively used by the Verification Procedure. Although taught throughout this disclosure, formal definitions of the Neutronics Model, calorimetrics Model and Verification Procedure are contained in Clarity of Terms, intended to be read in context after a thoroughly understanding the DETAILED DESCRIPTION (which also contains definition of terms). Note well, the NCV Method requires no special instrumentation to operate, routine power plant instrumentation found in a typical NSSS will afford NCV all required intensive properties.

"Nuclear Fuel Management" (NFM) is an important aspect of the NCV Method since its resultant data are considered a portion of either Off-Line or On-Line Operating Parameters. NFM is herein defined as meaning the nuclear fuel computations which describe burn-up behavior of the fissioning fuel. Such production comprises nuclear fuel isotope behavior as a function of initial enrichment, fissile loading, and irradiation time (i.e., so called "burn-up" data). Burn-up data routinely includes the following as a function of irradiation time: Megawatt-Days per Metric Tonne of Uranium metal (MWD/MTU); the rate of $^{235}$U & $^{238}$U depletion; the rate of $^{239}$Pu & $^{241}$Pu build-up; and the computation of typical neutronic parameters as a function of irradiation time (initial nuclear core material number densities and data leading to macroscopic cross sections); such data is further discussed in Neutronics Data. Static and preparatory NFM computations are considered a portion of Off-Line Operating Parameters and comprise: geometric buckling (B); thermal neutron migration area (M); equivalent data contained in TABLE 3 as appropriate; and like data. NFM on-line computations, or if predictive temporal trends are established by NSSS staff or by fuel vendors before NCV installation, are all considered a portion of On-Line Operating Parameters. NFM computer programs capable of on-line computations are termed "fuel pin cell codes" and available from Argonne National Lab's Code Center [refer to <www.ANL.gov/nse/software> for listings of programs dependent on the reactor's type (LWR, HWR, LMFB, etc.)].

A "set of Off-Line Operating Parameters" is herein defined as comprising: static NFM data; generic system design parameters; specific equipment design data (e.g., throttle valve design pressure drop, $L_{Mech}$, $L_{Elect}$, data from the turbine vendor's Turbine Kit, and similar data); the limitations imposed by Eqs. (5), (55), (63), (66), & (67) when using the Verification Procedure; data required for the fourth independent equation based on thermodynamic laws [e.g., for the PFP Model comprising axial neutron flux profile, NFM data; the DTL location and TABLES 1 & 2 data, or their equivalence]; regulatory limitations [e.g., found in the NRC's 10CFR50.36 Technical Specifications] including the applicable Regulatory Limit associated with a Core Thermal Power; acceptable Operating Tolerance Envelope; establishing highly accurate or highly reliable and consistent Reference SEPs, if used; the SEP Power Trip Limit, if used; and other common power plant data. The "SEP Power Trip Limit" is herein defined as a limiting value of either $\Delta \lambda_{GEN}$ or $\Delta \lambda_{EQ82}$; given $\Delta \lambda_{GEN}$ or $\Delta \lambda_{EQ82}$ exceed this Limit a TRIP must be instigated (invoking Safety Mechanisms). In addition, an important portion of Off-Line Operating Parameters is the identification of appropriate NSSS plant instrumentation which will lead to thermodynamic extensive properties required by the calorimetrics Model. Said instrumentation includes intensive measurements of pressures (P) and temperatures (T), and/or measured or assumed fluid qualities (x). Examples of said identification comprise the following instrumentation: P & T for all described fluid pumps regarding their suctions & discharges; working fluid properties of turbine extractions, MSR and Feedwater heaters; SG data; PWR RV coolant inlet & outlet nozzle P & T; BWR RV coolant inlet P & T, and outlet P & x; etc.

A "set of On-Line Operating Parameters" is herein defined as data collected while operating on-line, said data comprising: dynamic NFM, thermodynamic fluid properties consistent with requirements of the calorimetrics Model, and data required for the sets of selected $\Delta \lambda_{mm}$ and $\Lambda_{nn}$ including required extensive properties. Thermodynamic fluid properties comprise extensive properties of the nuclear power plant fluids, comprising specific enthalpy, specific exergy and specific entropy of: the RV coolant, the SG fluids (if used) and the TC working fluid. The words "working fluid" is commonly meant that fluid which is used in a TC, thus responsible for producing the useful power output. Said extensive properties are based on intensive properties comprising measured pressure, measured temperatures and/or measured or assumed fluid qualities. Note that measuring fluid quality requires special instrumentation, or the vendor-designed quality is typically assumed, or quality may be an elected COP $\Lambda_3$. On-Line Operating Parameters also comprise: dynamic NFM data; measured pump motive powers ($P_{RVP-k1}$, $P_{FWP-k2}$ and $P_{CDP-k3}$); acquiring the indicated fission chamber signal ($\Phi_{FC}$, used for trending); acquiring indicated mass flows including $m_{RV}$, $m_{FW}$ and those in the Condensate System (used for trending); acquiring drain flows from the MSR (used for trending); measured inlet pressure to the LP Turbine (used for performance monitoring); temperature profiles about TC Feedwater heaters; turbine extraction pressures; TC boundary states; and similar data. On-Line Operating Parameters further includes data which may be used to replace an unknown parameter with a declared known parameter. Said data comprises: a measured gross electric power leading to useful power output, a directly measured useful power output and/or an independently computed "Neutronic Flux Term". For example, an independently computed Neutronic Flux Term, say [$\Phi_{TH}\Sigma_F$], could be computed based on Neutron Transport Theory for $\Phi_{TH}$, and established NFM data. However, the Neutronic Flux Term is broadly defined as selected from a group of terms which are flux dependent comprising: the Temporal Fission Density [$\Phi_{TH}\Sigma_F$]; the temporal fission rate [$\Phi_{TH}\Sigma_F V_{Fuel}$]; the nuclear power [$\Phi_{TH}\Sigma_F V_{Fuel} \bar{v}_{REC}$]; and a similar such term provided it is a $f(\Phi_{TH})$. As used by the NCV Method, the Neutronic Flux Term as taken as either an unknown parameter (replacing neutron flux in the governing equations), or as an independently computed term thus becoming a declared known parameter as applicable for an Alternative Embodiment.

"Choice Operating Parameters" (COP $\Lambda_{nn}$) are herein defined as any subset of the Operating Parameters (on- or off-line) which only indirectly impact the calorimetrics Model. They are used exclusively by the Verification Procedure. It is assumed COPs have errors, although their absolute accuracies (at least superficially) are unknowable, their ranges are knowable. COPs are selected by the user of the NCV Method from an available set. $\lambda_{nn}$ values are varied such that $\Delta\lambda_{mm} \rightarrow 0.0$.

"System Effect Parameters" (SEP) are herein defined as selected Operating Parameters (on- or off-line) which directly impact the calorimetrics Model. They are used exclusively by the Verification Procedure in conjunction with their Reference SEP. Reference SEP are also Operating Parameters but knowable with high accuracy or are established by operational experience as being highly consistent and reliable. The difference between a SEP and its Reference SEP, is denoted as $\Delta\lambda_{mm}$, defined as a "SEP difference". For example, if the computed electric power is declared a SEP, its Reference SEP is the directly measured electric power ($P_{UT}$) resulting in $P_{GEN-REF}$. Computed power is thus verified, processed via a Verification Procedure given: $\Delta\lambda_{GEN}=|P_{GEN}-P_{GEN-REF}|/P_{GEN-REF} \rightarrow 0.0$.

Second Law Foundational Equation

It is an important assumption that the fission phenomenon is an inertial process. Such a process is herein defined by the following: a) a process which is self-contained following incident fission neutron capture; b) its total MeV release, after deducting for incident neutron kinetic energy, is constant and independent of its environment; c) said total release is ideal and entirely "available" for power, that is a pure potential to produce power; and, d) processing of antineutrino & neutrino exergies thru a Carnot Engine has no meaning. Further, the release's recoverable portion—an entropy increase at constant temperature, initiated spontaneously-results in an exergy dispersal (typically in the fluid, or melting $UO_2$). However, in a generic sense, the total release from inertial fission is more correctly defined as a pure "Free Exergy", $G_{Pure}$. Such a Free Exergy is only proportional to Temporal Fission Density, $f[\Phi_{TH}\Sigma_F]$; it cannot be described prima facie by any enthalpic process (it is without terrestrial standard). The same MeV release from $^{235}U$ fission, excluding incident neutron kinetic energy, would be observed in deep space and in the ocean's depths. Note, the electron volt (eV) is a relative electronic potential ($\Delta$exergy), an incremental concept. In summary, these assumptions inherently change the interpretation of Einstein's equation, it is not a $\Delta$Energy which is proportional to a mass defect, but: $\Delta Exergy=c^2\Delta m$. Not accepting such assumptions, explain, in part, why nuclear engineers will arbitrarily double $\Phi_{TH}$ to satisfy an observed thermal power. For example, the lack of nexus between $\Phi_{TH}$ and RV coolant mass flow was a clear contributory cause of the Chernobyl and Three Mile Island (TMI) accidents. Their operators had no computational nexus between $\Phi_{TH}$ and $m_{RV}$; no history of consistency between neutronics and thermal parameters; no temporal trends; no system-wide understanding. With such indications, operators would have had actionable information. In the case of Chernobyl, action meant not withdrawing control rods (which operators did, causing prompt criticality), but simply allowing Xenon to burn-off. In the case of TMI, operators would have had every indication of an upset condition (computed $\Phi_{TH}/m_{RV}$, routine NCV trends, transient trends, FCIs, $\Delta\lambda_{GEN}$ & $\Delta\lambda_{EQ82}$ limits—all would have been awry); action to be taken: immediately TRIP the system (versus a delay of hours). See Sher and James references for evidentiary support for such treatment.

This invention teaches a foundational description of the entire NSSS based on destruction of a total exergy flow supplied ($G_{IN}$). This includes thermodynamic processes within the Secondary Containment and the Balance-of-Plant (BOP). The Secondary Containment comprises the Reactor Vessel (RV) for a PWR & BWR, and a Steam Generator (SG) and pressurizer for a PWR; the BOP includes processes producing a useful power output and a Condenser heat rejection. For the typical PWR & BWR the BOP comprises a Turbine Cycle producing electric power. Computation of consistent irreversible losses ($I_k$) is critical for the foundational equation and development of Fission Consumption Indices (FCI), described by Eq. (53) more fully discussed under the FCI section.

$$\sum I_k = \sum (1.0 - T_{Ref}/T_{hh}) Q_{Loss-hh} + \sum_X \sum_{ii} (P_{X-ii} - m_{X-ii}\Delta g_{X-ii}) + Q_{NEU-Loss} - \int d(mg)_{jj} \quad (53)$$

For the Condenser it is assumed the Condenser's effectiveness, $\varepsilon_{Cond}=\Sigma_{Tube}m\Delta g/|\Sigma_{Shell}m\Delta g|$, is known as either based on design, test or monitored data. Note that $Q_{REJ}$ is >50% of First Law NSSS input energy flow, but <12% of $G_{IN}$; thus an error in $\varepsilon_{Cond}$ is mitigated; further, $\varepsilon_{Cond}$ can serve as COP $\Lambda_8$. Therefore:

$$I_k = -\left[\sum_{Shell} m\Delta g + \sum_{Tube} m\Delta g\right] = (1.0 - \varepsilon_{Cond})\left|\sum_{Shell} m\Delta g\right|$$

where: $-\Sigma_{Shell} m\Delta g = [(1.0 - T_{Ref}/T_{CDS})Q_{REJ}]$, given $T_{CDS} = f(P_{Cond})$, leads to $$I_k = (1.0 - T_{Ref}/T_{CDS})(1.0 - \varepsilon_{Cond})Q_{REJ} \quad (1A)$$

For a tube-in-shell heat exchanger with heat loss to the environment (at $T_{Case}$):

$$I_k = -\left[\sum\nolimits_{Shell} m\Delta g + \sum\nolimits_{Tube} m\Delta g\right] + (1.0 - T_{Ref}/T_{Case})Q_{Loss} \quad (1B)$$

For a length of pipe with insulation heat loss (at $T_{surf}$) to the environment:

$$I_k = -m\Delta g + (1.0 - T_{Ref}/T_{Surf})(m\Delta h) = mT_{Ref}\Delta s - (T_{Ref}/T_{Surf})m\Delta h \quad (1C)$$

Note, for external heating, given $\Delta s > 0.0$, then $T_{surf} = T_{Ref}$, and thus $I_k = -m\Delta g$.

For a pump or auxiliary turbine, involving shaft power ($P_{Shaft}$) with casing loss (at $T_{Case}$):

$$I_k = P_{Shaft} - m\Delta g + (1.0 - T_{Ref}/T_{Case})Q_{Loss} = \quad (1D)$$
$$mT_{Ref}\Delta s + (1.0 - T_{Ref}/T_{Case})Q_{Loss}$$

Given electrical generation, main turbine losses summed over turbine wheels k4 & k5 are:

$$I_k = \left[\sum m_{TUR-k4} T_{Ref}\Delta s_{TUR-k4}\right]_{HP} + \left[\sum m_{TUR-k5} T_{Ref}\Delta s_{TUR-k5}\right]_{LP}$$

evaluated by: a) using a Turbine Cycle computer simulator; or b) based on degradation ratios of ($\eta_{Test}/\eta_{Design}$), $\eta_{Design}$ based on the vendor's Thermal Kit. For best mode, $I_k$ is computed as:

$$I_k = \Lambda_{12} \sum [m_{TUR-k4} T_{Ref}\Delta s_{TUR-K4}]_{HP-Design} + \quad (1E)$$
$$\Lambda_{13} \sum [m_{TUR-k5} T_{Ref}\Delta s_{TUR-k5}]_{LP-Design}$$

where: $\Lambda^{12} = (\eta_{Test}/\eta_{Design})_{HP}$ and $\Lambda^{13} = (\eta_{Test}/\eta_{Design})$ LP which are evaluated based on testing, operator's judgement, or using Verification Procedure using COP $\Lambda^{12}$ and/or $\Lambda_{13}$.

Eq. (2ND), developed from Eq. (2), is NCV Method's foundational equation. The total exergy flow supplied by fission is presented on the left-hand side of Eq. (2), plus shaft power added to the system. Its right-side contains useful power output plus a set of system irreversible losses. Antineutrino (and possibly neutrino) losses are defined by $Q_{LRV}$. Convection losses ($Q_{Loss}$) from the RV, SG and TC to the environment are processed through Carnot Engines. Loss associated with a k1[th] RV pump is given by $[P_{RVP-k1} - m_{RVP-k1}\Delta g_{RVP-k1}]$, assuming the aggregate of all RV pump flows is $m_{RV}$. Exergy flows added by TC pumps is given as: $[\Sigma P_{FWP-k2} - m_{FW}\bar{\Delta}g_{FWP} + \Sigma P_{CDP-k3} - \Sigma m_{CDP-k3}\Delta g_{CDP-k3}]$, reduced to $[+m_{FW}T_{Ref}\Delta s_{FWP} - \Sigma m_{CDP-k3}\Delta g_{CDP-k3}]$. Eq. (2) assumes a LWR whose Feedwater pump is driven by an Auxiliary Turbine; thus $\Sigma P_{FWP-k2}$ is not a contribution to $G_{IN}$. Note that the subscripts "TUR-k4" & "TUR-k5" refer to the HP & LP main turbine wheels. Condensate flows, $m_{CDP-k3}$, are resolved using methods best suited to the specific system and associated flow measurements; for example, Auxiliary Turbine, Deaerator and condensate flows are taken as $m_{FW}$ fractions: $m_{FW}C_{TUR-Aux}$ and $m_{FW}C_{CDP-k3}$.

In Eq. (2): $\Sigma_{j=1,4}$ indicates summation of temporal fissile isotopes ($^{235}$U, $^{238}$U, $^{239}$Pu & $^{241}$Pu); and $\Sigma_{F-j}$ is the conventional macroscopic fission cross section consistent with the fuel's volume The term $[\Sigma_{j=1,4}\lambda_{F-j}(\bar{v}_{REC-j} + \bar{v}_{TNU-j})]$ is replaced with resultant averaged values $[\Sigma_F(\bar{v}_{REC} + \bar{v}_{TNU})]$ to improve readability; this is taught via Eqs. (43)-(45). The $G_{Pure}$ term, $[C_E\Sigma_F V_{Fuel}(\bar{v}_{REC} + \bar{v}_{TNU})\Phi_{TH}]$, is computed as: $[C_E\bar{E}_F V_{Fuel}\bar{v}_{TOT}\Phi_{TH}]$ via Eq. (46), or individual terms are used. Irreversible loss terms comprise: $\bar{v}_{LRV}(t)$; pump & turbine losses; RV Carnot Engine losses; the loss $\int d(mg)_{SG}$ is $[-m_{RV}\Delta g_{SGQ} + m_{FW}\Delta g_{STX}]$ given $\Delta g_{SGQ}$ is defined as [inlet less outlet]; $\int d(mg)_{TC}$ includes all TC heat exchangers [except the Condenser which is treated separately via Eq. (1A)].

$$C_E V_{Fuel} \sum\nolimits_F (\bar{v}_{REC-j} + \bar{v}_{TNU-j})\Phi_{TH} + \sum P_{RVP-k1} + \quad (2)$$
$$\sum P_{CDP-k3} = P_{GEN} + C_E V_{Fuel}\sum\nolimits_F \bar{v}_{LRV}\Phi_{TH} +$$
$$(1.0 - T_{Ref}/T_{CDS})(1.0 - \varepsilon_{Cond})Q_{REJ} - \int d(mg)_{SG} - \int d(mg)_{TC} +$$
$$\sum P_{RVP-k1} - m_{RV}\Delta\bar{g}_{RVP} + \sum P_{FWP-k2} - m_{FW}\Delta\bar{g}_{FWP} +$$
$$\sum P_{CDP-k3} - m_{FW}\sum C_{CDP-k3}\Delta g_{CDP-k3} + (P_{TUR-Aux} -$$
$$m_{TUR-Aux}\Delta g_{TUR-Aux}) + \left[\sum m_{TUR-k4}T_{Ref}\Delta s_{TUR-k4}\right]_{HP} +$$
$$\left[\sum m_{TUR-k5}T_{Ref}\Delta s_{TUR-k5}\right]_{LP} + (1.0 - T_{Ref}/T_{RVI})Q_{Loss-RV} +$$
$$(1.0 - T_{Ref}/T_{STI})Q_{Loss-SG} + (1.0 - T_{Ref}/T_{TC})Q_{Loss-TC}$$

$$C_E V_{Fuel}\sum\nolimits_F (\bar{v}_{REC-j} + \bar{v}_{TNU-j})\Phi_{TH} - P_{GEN} - \quad (2ND)$$
$$(1.0 - T_{Ref}/T_{CDS})(1.0 - \varepsilon_{Cond})Q_{REJ} - m_{RV}\{\Delta g_{SGQ} - \Delta\bar{g}_{RVP} + (\Delta h_{SGQ}$$
$$/\Delta h_{STX})[T_{Ref}\Delta\bar{s}_{FWP} - \Delta g_{STX} -$$
$$\sum C_{CDP-k3}\Delta g_{CDP-k3} + C_{TUR-Aux}T_{Ref}\Delta s_{TUR-Aux}]\} =$$
$$-(Q_{Loss-SG}/\Delta h_{STX})[T_{Ref}\Delta\bar{s}_{FWP} - \Delta g_{STX} -$$
$$\sum C_{CDP-k3}\Delta s_{CDP-k3} + C_{TUR-Aux}T_{Ref}\Delta s_{TUR-Aux}] +$$
$$C_E V_{Fuel}\sum\nolimits_F \bar{v}_{LRV}\Phi_{TH} + \left[\sum [m_{TUR-k4}T_{Ref}\Delta s_{TUR-k4}]_{HP} +\right.$$
$$\sum [m_{TUR-k5}T_{Ref}\Delta s_{TUR-k5}]_{LP} -$$
$$\int d(mg)_{TC} + (1.0 - T_{Ref}/T_{RVI})Q_{Loss-RV} +$$
$$(1.0 - T_{Ref}/T_{STI})Q_{Loss-SG} + (1.0 - T_{Ref}/T_{TC})Q_{Loss-TC}$$

In Eq. (2ND) and elsewhere, the following definitions apply:

$$G_{IN} \equiv \quad (3A)$$
$$C_V \Phi_{TH} \sum\nolimits_{j=1,4}\sum\nolimits_{F-j}(v_{REC-j} + v_{TNU-j}) + \sum P_{RVP-k1} + \sum P_{CDP-k3}$$

$$Q_{REC} \equiv C_V\Phi_{TH}\sum\nolimits_{j=1,4}\Sigma_{F-j}v_{REC-j} \quad (3B1)$$

$$\equiv Q_{RVX} = m_{RV}\Delta g_{RVX} \quad (3B2)$$

$$Q_{LRV} \equiv C_V\Phi_{TH}\sum\nolimits_{j=1,4}\Sigma_{F-j}v_{LRV-j} \quad (3C)$$

-continued $$Q_{CTP} \equiv m_{RV}\Delta h_{RVQ} + Q_{Loss-RV} - \sum(m\Delta h)_{Misc} \quad (3D)$$

$$C_E \equiv 5.4668556 \times 10^{-13}; \text{Btu sec MeV}^{-1} \text{ hr}^{-1}$$

$$C_V \equiv C_E V_{Fuel}; \text{Btu sec MeV}^{-1} \text{ hr}^{-1} \text{ cm}^3$$

$$C_F(t) \equiv C_V \Sigma_F(t); \text{Btu sec MeV}^{-1} \text{ hr}^{-1} \text{ cm}^2$$

Traditional treatment would assume the unrecoverable term, $\bar{\upsilon}_{LRV}(t)$, cancels $\bar{\upsilon}_{TNU}(t)$; they carry the same meaning. Such cancellation would appear simple mathematics; however, by option, the recoverable and unrecoverable exergies may be carried as a single term, $\bar{\upsilon}_{TOT}(t)$, within the matrix, and thus no direct cancellation. The NCV Method runs through a matrix solution dependent on its augmented matrix. An augmented matrix contains a defining column of constants associated with each independent equation. Right-hand terms are all either a set of system irreversible losses or constants. Consider the following points. First, if taken as a constant, $\bar{\upsilon}_{LRV}$ can be assigned any value-taken from TABLE 3, or another source, or zero—thus biasing a computed $\Phi_{TH}$. Second, any set of declared unknowns, say $\Phi_{TH}$, $P_{GEN}$ & $m_{RV}$, upon resolution will be consistently apportioned by matrix solution dependent on thermodynamic losses. Their results will be biased if losses are biased. Third, ignoring $\bar{\upsilon}_{LRV}$ (and $\bar{\upsilon}_{TNU}$) reduces Eq. (9B) to 2.0, the theoretical, and thus biasing $\Phi_{TH}$. And fourth, loss terms ($Q_{Loss}$) appearing in both First & Second Laws would lose consistency. For these reasons the $[\Phi_{TH}\bar{\upsilon}_{LRV}]$ product may be carried as a COP or constant. Thus Eqs. (2ND) & (PFP) may be modified as:

$$C_V\Phi_{TH}\sum_{j=1,4}\Sigma_{F-j}\upsilon_{LRV-j} = C_F(t)\psi_{LRV}(t) \quad (4)$$

where: $\psi_{LRV}(t) = \Phi_{TH}\bar{\upsilon}_{LRV}(t)$; and if $\psi_{LRV}(t)$ is used as COP $\Lambda_6$, its limitations include the following where $\bar{\upsilon}_{TNU-A}$ is solely the assumed, traditional, maximum antineutrino production:

$$(1.0 - C_{\varphi\upsilon})\bar{\upsilon}_{TNU-A}(t) < [\psi_{LRV}(t)/\Phi_{TH}] < \bar{\upsilon}_{TNU-A}(t) \quad (5)$$

Verification means that a resolved $\psi_{LRV}(t)$, either as COP $\Lambda_6$ or an assumed constant, produces a consistent $\bar{\upsilon}_{LRV}$. Eq. (47A) suggests $C_{\varphi\upsilon} \approx 0.078$; for best mode $C_{\varphi\upsilon} = 0.10$.

To illustrate the practicality of nexus between flux and RV coolant mass flow, consider the following example. Assume typical data associated with a 1270 MWe PWR, given a vendor-quoted flux of $1.0 \times 10^{13}$ $^1n_0$ cm$^{-2}$ sec$^{-1}$ and a computed RV flow of $136.37127 \times 10^6$ lbm/hr. The vendor-quoted flux is assumed to be based on Neutron Transport Theory (an application of First Law continuity of the $^1n_0$ population). Compute the recoverable nuclear power using Eq. (3B2), and then compute the average neutron flux via Eq. (3B1) assuming a virgin core. Next, use Eq. (3D) to compute an accurate CTP; then (incorrectly) back-calculate a flux. If $\Phi_{TH}$ is computed based on CTP's $\dot{m}\Delta h$, one quickly sees a factor of two error. Although CTP has no prima facie dependence on $\Phi_{TH}$, the NCV solution of $\Phi_{TH}$ and system thermodynamics is critical to CTP given its resolved and system verification of $m_{RV}$. An accurate CTP is simply a by-product of NCV's solution nexus of neutron flux and $P_{GEN}$, $m_{RV}$ & $Q_{REJ}$.

$P_{RCU}$ = 2109.6000 psiA
$h_{RVU} = h_{RCU}$ = 657.16993 Btu/lbm
$g_{RCU}$ = 229.17338 Btu/lbm
$s_{RCU}$ = 0.8483145 Btu/lbm-R
$V_{Fuel}$ = 8.8884385 × 10$^6$ cm$^3$
$T_{Ref}$ = 45.059109° F. (see below)
$h_{Ref}$ = 13.100347 Btu/lbm
$S_{Ref}$ = 0.0262969 Btu/lbm-R
$P_{RCI}$ = 2158.000 psiA
$h_{RVI} = h_{RCI}$ = 566.05350 Btu/lbm
$g_{RCI}$ = 181.64622 Btu/lbm
$s_{RCI}$ = 0.761958 Btu/lbm-R
$\upsilon_{TOT-35}$, $\upsilon_{REC-35}$, $\upsilon_{TNU-35}$ [=] Table 3
$\Sigma_{F-35}$ = 0.6564365 cm$^{-1}$ (at 4% $^{235}$U)
mRV = 136.37127 × 10$^6$ lbm/hr
$[C_E V_{Fuel} \Sigma_{F-35}\upsilon_{REC-35}]$ = 6.4579552 × 10$^{-4}$
$Q_{LOSS-RV} = \Sigma(m\Delta h)_{Misc}$ = 0.0

Use Eq. (3B) to compute the coolant's available power, then calculate correct and consistent $\Phi_{TH}$:

$$Q_{REC} = m_{RV}(g_{RCU} - g_{RCI}) =$$

$$0.64813392 \times 10^{10} \text{ Btu/hr } [01899 \text{ MW-available}]$$

$$\Phi_{TH} = m_{RV}(g_{RCU} - g_{RCI})/[C_E V_{Fuel}\Sigma_{F-35}\upsilon_{REC-35}] =$$

$$1.003621 \times 10^{13} \; ^1n_0 \text{cm}^{-2}\text{sec}^{-1}$$

Use Eq. (3D) to compute a correct CTP, then back-calculate an incorrect $\Phi_{TH}$:

$$Q_{CTP} = m_{RV}(h_{RVU} - h_{RVI}) = 1.2425663 \times 10^{10} \text{ Btu/hr } [3642 \text{ MW-thermal}]$$

$$\Phi_{TH} \stackrel{?}{=} m_{RV}(h_{RVU} - h_{RVI})/[C_E V_{Fuel}\Sigma_{F-35}\upsilon_{REC-35}] \stackrel{?}{=}$$

$$1.924086 \times 10^{13} \; ^1n_0 \text{cm}^{-2}\text{sec}^{-1}$$

The practically and safety advantages of nexus between flux and coolant flow—and nexus between neutronics and useful power output, etc.—has eluded the industry. For example, given Enrico Fermi's background in both thermodynamics and nuclear engineering, it is remarkable that he did not translate his computed nuclear power, correctly described in '656, to a change in the coolant's potential ($\dot{m}\Delta g$). Indeed, Fermi's nuclear power was the recoverable exergy flow supplied to CP1 (its $G_{IN}$ less antineutrino losses). Fermi's CP1 design led directly to the large N Reactor. A recognition of nexus between a fission reactor's neutron flux and a viable coolant $\dot{m}\Delta g$, thus leading to an accurate Core Thermal Power ($\dot{m}\Delta h$) and a consistently computed $\Phi_{TH}$, simply went missing.

The above is not academic, it is not abstract. When Eq. (2ND) is coupled with three additional equations, in the Preferred Embodiment, four unknowns are then solved simultaneously by matrix solution yielding a defined "complete thermodynamic understanding of the nuclear power plant". This is broad; but understanding any thermal system means, fundamentally, to consistently determine boundary conditions and its principal coolant and working fluid mass flows. The above Second Law Foundational Equation teaches formulating a Second Law exergy analysis of the nuclear power plant.

First Law Equations

An important consideration for PWR analyses is a First Law conservation about the Steam Generator (SG). Note that $\Delta h_{SGQ}$ & $Q_{Loss-SG}$ are taken as positive energy flows out of the SG. For a BWR: $\Delta h_{STX} = \Delta h_{SGQ} = \Delta h_{TCQ}$; $Q_{Loss-SG} = 0.0$; and $m_{FW} = m_{RV}$ before bleed-off. Eq. (6B) is used throughout given $m_{RV}$ is a declared unknown (the reverse would apply if $m_{FW}$ were declared unknown).

$$m_{RV} \Delta h_{SGQ} = m_{FW} \Delta h_{STX} + Q_{Loss-SG} \quad (6A)$$

$$m_{FW} = (m_{RV} \Delta h_{SGQ} - Q_{Loss-SG})/\Delta h_{STX} \quad (6B)$$

If applied conventionally, application of the First Law of thermodynamics to any inertial nuclear process is wrong at the prima facie level; the concept of "potentials" is absent. However, consideration of routine Second Law irreversible losses versus First Law energy flow losses, suggests the opportunity of an additional and unique equation. A paradox exists: the entire inertial fission release is a pure exergy flow, $G_{Pure}$, $f[\Phi_{TH} \Sigma_F \bar{v}_{TOT}]$, a non-fluid Free Exergy and quite independent of its environment; however, a $T_{Ref}$ dependency is necessitated for Second Law fluid losses. Needed is a First Law $m_{RV} \partial h_{REC}/G_{Pure}$ correction to nuclear power, termed an "Inertial Conversion Factor" ($\Xi$). $\Xi$ may be: a) estimated; b) based on $T_{Ref}$ determined from Boltzmann's constant and an assumed neutron exergy; c) computed using Alternative Embodiment E; and/or d) computed using Gibbs' entropy formula. However, note well, if not using the Preferred Embodiment, any such approach typically results in an iterative solution; as it involves translation from a nuclear $\dot{m} \Delta g$, to and from a fluid $\dot{m} \Delta h$, subject to changing extensive properties. If employed, such iterations are aided by NCV software which provides for: $h = f(P, g, h_{EST}, T_{Ref})$; $g = f(P, h, T_{Ref})$; etc.

$$\Xi = f[G_{Pure}, \partial h_{REC}] \quad (7)$$

The Preferred Embodiment leads to a computed, non-iterative $\Xi$ as follows. Based on the above assumptions, a pure exergy release means both its recoverable portion, heating a fluid, and its irreversible loss, must be treated ideally. Its irreversible release can only be described as $f[\Phi_{TH} \Sigma_F \bar{v}_{TNU}]$. Spontaneous processes are always accompanied by a dispersal of exergy. The recoverable dispersal being a positive $[m_{RV} T_{Ref} Y_{S_{REC}}]$ but truly described simply as $f[\Phi_{TH} \Sigma_F \bar{v}_{REC}]$. Thus, $\partial h_{REC}$ cannot be treated as a simple enthalpic term, but in the ideal as a manipulation of the core's recoverable exergy (dh = dg + $T_{Ref}$ ds, as based on $G_{Pure}$): correcting $G_{Pure}$ for irreversibility and substituting for $T_{Ref} \partial s_{REC}$:

$$\Xi(t) = \quad (8)$$

$$m_{RV} \partial h_{REC}/G_{Pure} = \left[ G_{Pure} - f\left[\Phi_{TH} \sum_F \bar{v}_{TNU}\right] + f\left[\Phi_{TH} \sum_F \bar{v}_{REC}\right]\right]/G_{Pure}$$

where $\Xi(t)$ is averaged across the nuclear core and becomes, given: $\bar{v}_{REC} = \bar{v}_{TOT} - \bar{v}_{TNU}$, via Eq. (46):

$$\Xi(t) = m_{RV} \partial h_{REC}/G_{Pure} = \Delta h_{RCX}/\Delta g_{RCX} = \quad (9A)$$

$$1.0 - \bar{v}_{TNU}/\bar{v}_{TOT} + \bar{v}_{REC}/\bar{v}_{TOT}$$

$$\Xi(t) \equiv 2.0 - 2\bar{v}_{TNU}/\bar{v}_{TOT} \quad (9B)$$

and where $T_{Ref}$ as used to define fluid exergy, a $f(\Delta g_{RCX})$, is then reduced from Eq. (9):

$$T_{Ref}(t) = \{[1.0 - 2\bar{v}_{TNU}/\bar{v}_{TOT}]/[2.0 - 2\bar{v}_{TNU}/\bar{v}_{TOT}]\} \Delta h_{RCX}/\Delta s_{RCX} \quad (10A)$$

when used in the fourth independent equation when involving axial integration, e.g., Eq. (PFP):

$$T_{Ref}(t) = \{[1.0 - 2\bar{v}_{TNU}/\bar{v}_{TOT}]/[2.0 - 2\bar{v}_{TNU}/\bar{v}_{TOT}]\} dh(y)/ds(y) \quad (10B)$$

Inclusion of antineutrino & neutrino production is critically important as their use in Eqs. (2ND) & (PFP), affecting $\Phi_{TH}$, is consistent with correcting for a "First Law recoverable release". Eq. (10) provides an explicit, non-iterative determination of the absolute reference temperature ($T_{Ref}$). Although independent of $\Phi_{TH}$, $T_{Ref}$ is temporally dependent on U depletion & Pu buildup via $\bar{v}_{TOT}(t)$. Obviously, Eq. (10)'s computed $\Xi$ is independent of its environment, and thus Eq. (9B) suggests the prospect of direct determination of $\bar{v}_{PNU}$ and $\bar{v}_{PGM}$. Recording time that fission fragments are first detected (at $\approx 1$ ps), and prompt gamma productions (from fragments vs. $^1H_1$ decay), would yield [d $\bar{v}_{PGM}$/dt]. This requires $\approx 0.01$ ps resolution, an unlikely experiment, but would yield [$\bar{v}_{TNU}/\bar{v}_{TOT}$] ratios. Also, note that $\bar{v}_{TNU}$ is applicable for treatment as a steady state COP $\Lambda_5$.

Eq. (10A) predicts a maximum theoretical reference temperature ($\bar{v}_{TNT} = 0.0$) at dh/(2ds); thus, typically, $32.018°$ F. $< T_{Ref} < 67.8580°$ F. Conventionally, $T_{Ref}$ used in common exergy analyses is based on the lowest temperature seen by the thermal system (its sink). Countering convention, the lowest effective temperature seen by a nuclear system is associated with its average subatomic particle; i.e., the exergy of an average capture fissioning $^1n_0$. The above PWR data produced, via Eqs. (9B) & (10A): $\Xi = 1.917144$; $T_{Ref} = 45.059109°$ F.; and thus an average $\Phi_{TH}$ exergy of 0.024163 eV (defining a steady state thermal neutron). As a sanity check, this data used in abridged Eqs. (2ND) and (1ST) produces: $[C_E \Sigma_F V_{Fuel} \bar{v}_{REC} \Phi_{TH}] \Xi = \dot{m} \Delta h_{RVX} = 1.2425663 \times 10^{10}$ Btu/hr (3642 MWt). Further, Eqs. (9B) & (10B) were confirmed using quadrature of a First Law application of Eq. (PFP); integrated from y = 0.0 to the DTL location, and to y = 2Z, yielding $T_{Ref}(y)$ and perfectly consistent h and g properties. These teachings demonstrate that the antineutrino (and possibility the neutrino), is fundamentally important to classic thermodynamics when properly applied to the NSSS; it is God's imprimatur on the Second Law.

First Law conservation of energy flows for a complete NSSS comprises the following, of course incorporating $\Xi$. $m_{FW}$ is replaced with $m_{RV}$ per Eq. (6B) for the Steam Generator.

$$C_E \sum_{F} V_{Fuel} \bar{v}_{REC} \Phi_{TH} \Xi + \sum P_{RVP-k1} + \sum P_{CDP-k3} = P_{GEN} + \quad (11)$$

$$Q_{REJ} + (P_{TUR-Aux} - m_{FW} \Delta \bar{h}_{FWP}) + Q_{Loss-RV} + Q_{Loss-SG} + Q_{Loss-TC}$$

$$C_E \sum_{F} V_{Fuel} \bar{v}_{REC} \Phi_{TH} \Xi = P_{GEN} - Q_{REJ} + m_{RV} \{\Delta \bar{h}_{RVP} + \Delta h_{SGQ}/\Delta \quad (1ST)$$

$$h_{STX} (\Delta \bar{h}_{FWP} - C_{TUR-Aux} \Delta h_{TUR-Aux} + \sum C_{CDP-k3} \Delta h_{CDP-k3})\} =$$

$$Q_{Loss-RV} + Q_{Loss-SG} + Q_{Loss-TC} + Q_{Loss-SG}/\Delta$$

$$h_{STX} (\Delta \bar{h}_{FWP} - C_{TUR-Aux} \Delta h_{TUR-Aux} + \sum C_{CDP-k3} \Delta h_{CDP-k3})$$

First Law conservation of energy flows is also formed about an isolated Turbine Cycle, devoid of neutronics, forming a third equation. Other than the declared unknowns, $P_{GEN}$, $Q_{REJ}$ & $m_{RV}$, all quantities in Eq. (3RD) are known with high accuracy; they are based on direct measurements and/or based on common treatment of TC equipment. As examples, common treatment assumes the $Q_{Loss-TC}$ is principally composed of 0.2% loss from turbine casings; a 1% FW heater shell loss/heater; and that the driving temperature of vessel losses is the outer annulus or shell temperature.

$$Q_{TCQ} \equiv m_{FW} \Delta h_{TCQ} \quad (12)$$
$$= P_{GEN} + Q_{REJ} + Q_{Loss-TC} +$$
$$(P_{TUR-Aux} - m_{FW} \Delta \bar{h}_{FWP}) - \sum m_{CDP-k3} \Delta h_{CDP-k3}$$

when rearranging terms and substituting for $m_{FW}$:

$$-P_{GEN} - Q_{REJ} + \quad (3RD)$$
$$m_{RV} \{\Delta h_{SGQ}/\Delta h_{STX}(\Delta h_{TCQ} + \Delta \bar{h}_{FWP} - C_{TUR-Aux} \Delta h_{TUR-Aux} +$$
$$\sum C_{CDP-k3} \Delta h_{CDP-k3})\} = Q_{Loss-TC} + Q_{Loss-SG}/\Delta$$
$$h_{STX}(\Delta h_{TCQ} + \Delta \bar{h}_{FWP} - C_{TUR-Aux} \Delta h_{TUR-Aux} + \sum C_{CDP-k3} \Delta h_{CDP-k3})$$

In Eqs. (2ND), (1ST) & (3RD), the convective loss terms $Q_{Loss-RV}$ & $Q_{Loss-SG}$ are determined based on the thermal load of the air filtration & conditioning system of the Secondary Containment. The NSSS thermodynamic boundary is considered the confinement of the working fluid in the Condenser's shell, thus a $Q_{REJ}$ (at $T_{CDS}$) is lost to the environment. $T_{RVI}$ & $T_{FW}$ are surface temperatures of the RV & SG (if used), consistent with total Secondary Containment losses and noting that the entering colder fluid is routed to the outer annulus of the RV & SG vessels. For the typical PWR and BWR a fission neutron is absorbed, on average, as a thermal neutron ($\approx$0.025 eV). The thermal region of flux is typically considered from 0.010 to 100 eV. Throughout these teachings it is understood that integrations comprising flux, microscopic cross sections, etc. are functions of incremental exergy.

Evaluations of $Q_{Loss-TC}$ and pump energy terms requires a detailed knowledge of the Turbine Cycle as suggested in the following listing of terms; these quantities are considered summations and/or weighted averages of either environmental energy flows, or equivalent net shaft powers.

$$Q_{Loss-TC} = \text{Piping insulation losses} \quad (15)$$
$$+ \text{ Heat exchanger losses to environment (e.g., } FW \text{ heaters, } MSR \text{ vessel, misc. casings)}$$
$$+ \text{ Letdown energy flow from the } TC$$
$$- \text{ Makeup energy flow to the } TC$$
$$- RV \text{ (and } SG\text{) changes in the potential energy relative to the } TC\text{'s throttle value}$$
$$+ \text{ Generator casing heat loss to the environment}$$
$$- \text{ Generator coolant heat loss to the working fluid}$$
$$- \text{ Linkage losses associated with steam-driven pumps, in addition to } P_{FWP-Aux}$$
$$- \text{ Working fluid energy flow consumed by a main turbine, direct-driven pumps.}$$

If the useful power output is shaft power delivered to a turbine-generator set, and $P_{GEN}$ is declared an unknown, and a Verification Procedure is invoked per Eq. (61) or (62); then its referenced SEP, $P_{GEN-REF}$, is based on the directly measured generation ($P_{UT}$) plus generator losses. $P_{UT}$ is always assumed to be measured with high accuracy at generator terminals (gross output in KWe). Generator losses, $f(P_{GEN})$ in KWe, are determined using established art.

$$P_{GEN-REF} = 3412.1416(P_{UT} + L_{Mech} + L_{Elect}) \quad (14A)$$

However, if the useful power output ($P_{GEN}$) is assumed to be a known quantity, thus a supplied input to Eqs. (2ND), (1ST) & (3RD), its value is then based on measured generation ($P_{UT}$) plus generator losses:

$$P_{GEN} = 3412.1416 (P_{UT} + L_{Mech} + L_{Elect}) \quad (14B)$$

It is important that $T_{TC}$ of Eq. (2ND) in association with $Q_{Loss-TC}$ be evaluated consistently. The Preferred Embodiment is to "mix" the energy flows of Eq. (15) to thereby determine an equilibrium state and thus an average $T_{TC}$ consistent with $Q_{Loss-TC}$. In addition to these losses, there are, of course, a number of minor energy flows associated with ancillary systems found in any power plant. For an NSSS such ancillary systems comprise: energy flows associated with Shim Control fluid injections; SG blow-down losses; control rod drive cooling; RV coolant pump miscellaneous seal flows; and the like. Given the definition of Core Thermal Power, correcting Eq. (3D)'s $Q_{CTP}$ for minor RV non-nuclear energy flows must be considered if substantially affecting $h_{RVI}$ (in general, such effects are a small, <1×10$^{-4}$ of CTP). The above First Law Equations teaches both formulating a First Law conservation of the nuclear power plant ending with Eq. (1ST), and teaches formulating a First Law conservation of the Turbine Cycle ending with Eq. (3RD), both supported by teachings throughout.

The cornerstone of the NCV Method is verification. Eqs. (2ND), (1ST) & (3RD) could well be solved for the unknowns $\Phi_{TH}$, $Q_{REJ}$ & $m_{RV}$. These equations with three unknowns, are presented as viable Alternative Embodiments. Consider however, that the nuclear power plant offers no parameter, with one exception, having a priori high reliability, high accuracy and is knowable at any time which may serve verification. Measured electrical power, $P_{UT}$, is this parameter. If using Verification Eq. (61) or (62), $P_{GEN-REF}$ of Eq. (14A) follows directly from the measured $P_{UT}$. However, if $P_{GEN}$ is declared an unknown in Eqs. (2ND), (1ST) & (3RD) a fourth independent equation based on thermodynamic laws is required. Once solved simultaneously, $P_{GEN}$ is then driven to $P_{GEN-REF}$ as provided via the Verification Procedures.

If the NSS System is producing electric power, then consistency between the computed useful power output, $P_{GEN}$, and the directly measured generation, $P_{UT}$, leading to $P_{GEN-REF}$, has obvious import. If $L_{Mech}$ and $L_{Elect}$ are known with high accuracy, then $P_{GEN-REF}$ will well serve a Verification Procedure. However, questionable generator losses must be resolved such that a computed $P_{GEN-REF}$ via Eq. (14A), or $P_{GEN}$ via Eq. (14B), has high reliability and high accuracy. Mechanical losses, $L_{Mech}$, are constant and well established in the industry. $L_{Elect}$, although typically linear with a $P_{GEN}$, can be suspect given questionable vendor records, generator upgrades, and the like. After an operating history is established, differences between a computed $P_{GEN}/3412.1416$, versus a measured $P_{UT}$, knowing $L_{Mech}$, will allow computation of $L_{Elect}$ given its $P_{GEN}$ dependency.

Eqs. (2ND) & (1ST) have declared unknowns $\Phi_{TH}$, $P_{GEN}$, $Q_{REJ}$ and $m_{RV}$; Eq. (3RD) with unknowns $P_{GEN}$, $Q_{REJ}$ and $m_{RV}$. Thus four unknowns given three equations. Thus a "fourth independent equation based on thermodynamic laws" is required. Said equation is herein defined as any derivative of the above First and/or Second Law formulations as descriptive of a nuclear power plant or its components, which does not compromise the solution's Rank (e.g., four equations with a Rank of 4, three equations with a Rank of three, etc.). For example, a fourth independent equation could be formed: from a Second Law exergy analysis of an isolated RV based on Eq. (2ND); from a First Law conservation of an isolated RV following Eq. (1ST); from a combination of Second and First Law formulations of the RV; from traditional heat transfer analyses; and others developed by the skilled provided the Rank is not compromised. The Preferred Embodiment's fourth independent equation is a "Pseudo Fuel Pin" (PFP), a PFP Model, based on Eq. (2ND), which employs an average fuel pin whose average axial neutron flux, $\Phi_{TH}$, is the same flux satisfying Eqs. (2ND) & (1ST); however its axial profile is not symmetric (it is skewed). In solving simultaneously for these four unknowns, the governing equations must establish nexus between flux and system thermodynamics and upon resolution produce a set of Thermal Performance Parameters.

Second Law Pseudo Fuel Pin Model

As the fourth independent equation, the PFP Model describes an average fuel pin having the same fuel pellet radius ($r_0$), clad OD, cell pitch, height of the core (2Z), enrichment and burn-up, as the core's average. Although the PFP Model is theoretical, its computed average neutron flux, $\Phi_{TH}$, is the real, actual flux satisfying Eqs. (2ND) & (1ST). The pin's axial buckling is the core's theoretical, geometric buckling at criticality. The PFP Model assumes:

the PFP is "positioned" within the core such that $\partial\Phi(r)/\partial r = 0.0$;

the pin's radial flux profile is constant, $\partial\Phi(r)/\partial r = 0.0$;

the PFP's axial flux profile assumed is the skewed Clausen Function of Order Two, $Cl_2(\Omega)$;

the average convection loss from RV to the NSSS boundary per fuel pin, is given as:

$(1.0-T_{Ref}/T_{RVI})Q_{Loss-RV}/M_{FPin}$, assuming a $(h_{RVI}-h_{RCI})$ loss before core entrance; and the average flux $\Phi_{TH}$ satisfying Eqs. (2ND) & (1ST), defines PFP's average flux.

It is obvious that enhanced sophistication could be applied to any of these assumptions. However, such enhanced sophistication cannot affect the base concept: employing a skewed flux profile with partial axial solution of the exergy rise, thus adding a unique fourth equation. This is clearly preferred over using traditional heat transfer analysis (a First Law method) involving fuel radiation and fluid convection & conduction correlations. Such correlations are: empirical fits of static experimental data; based on temperature profiles; and are de-coupled from neutronics and Second Law analyses.

Neutron diffusion theory traditionally assumes a cosine flux profile for its axial solution. For the PFP Model, Eq. (21) assumes a pseudo geometric buckling, $B_P^2$.

$$0.0 = \nabla^2 \Phi(r, z) + B_P^2 \Phi(r, z) \qquad (21)$$

Figure 3:
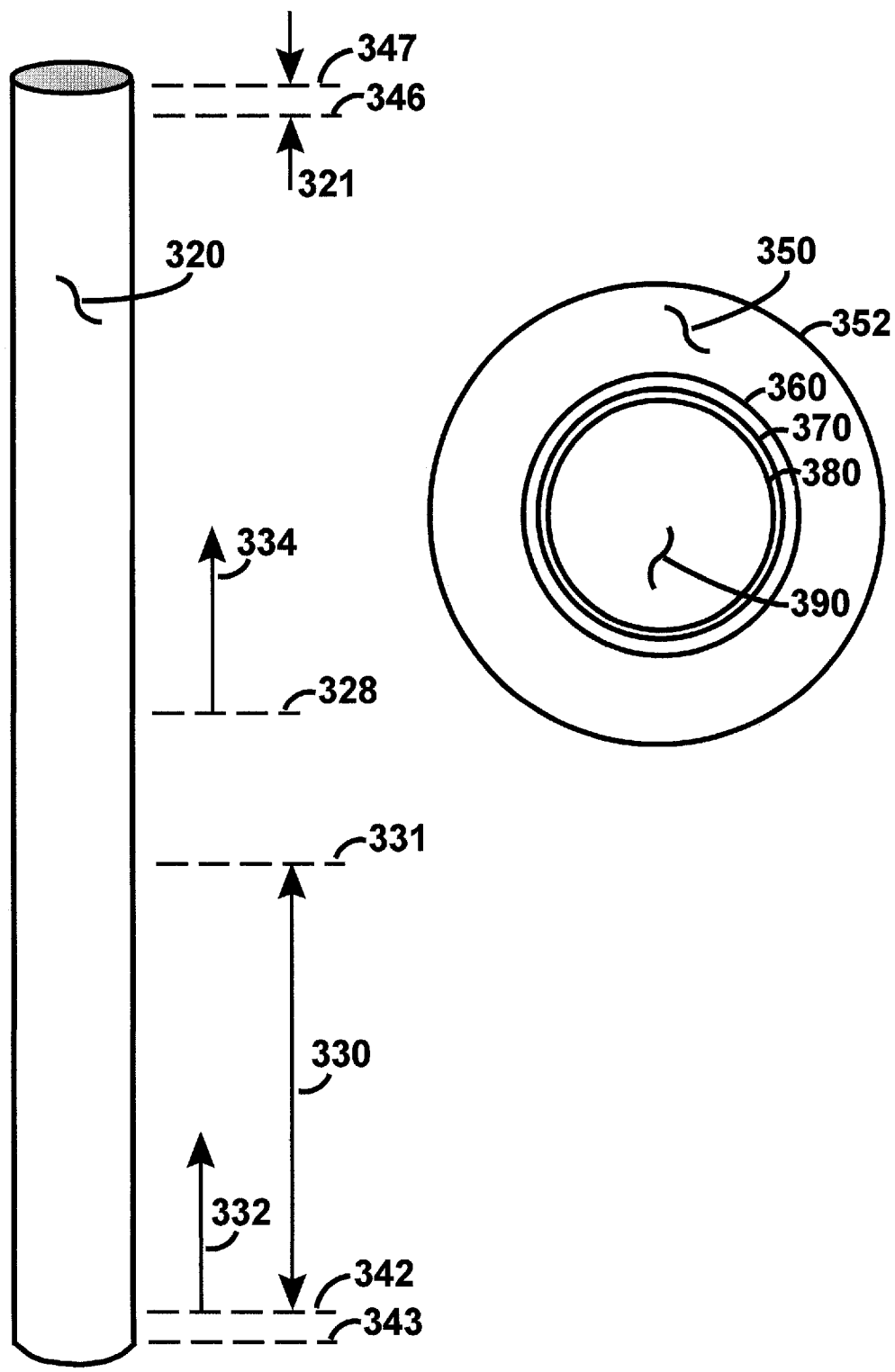
FIG. 3 is a representation of the Pseudo Fuel Pin Model used to couple the axial neutron flux to the exergy flow delivered to the coolant using an average fuel pin and associated coolant flow.
Figure 4:
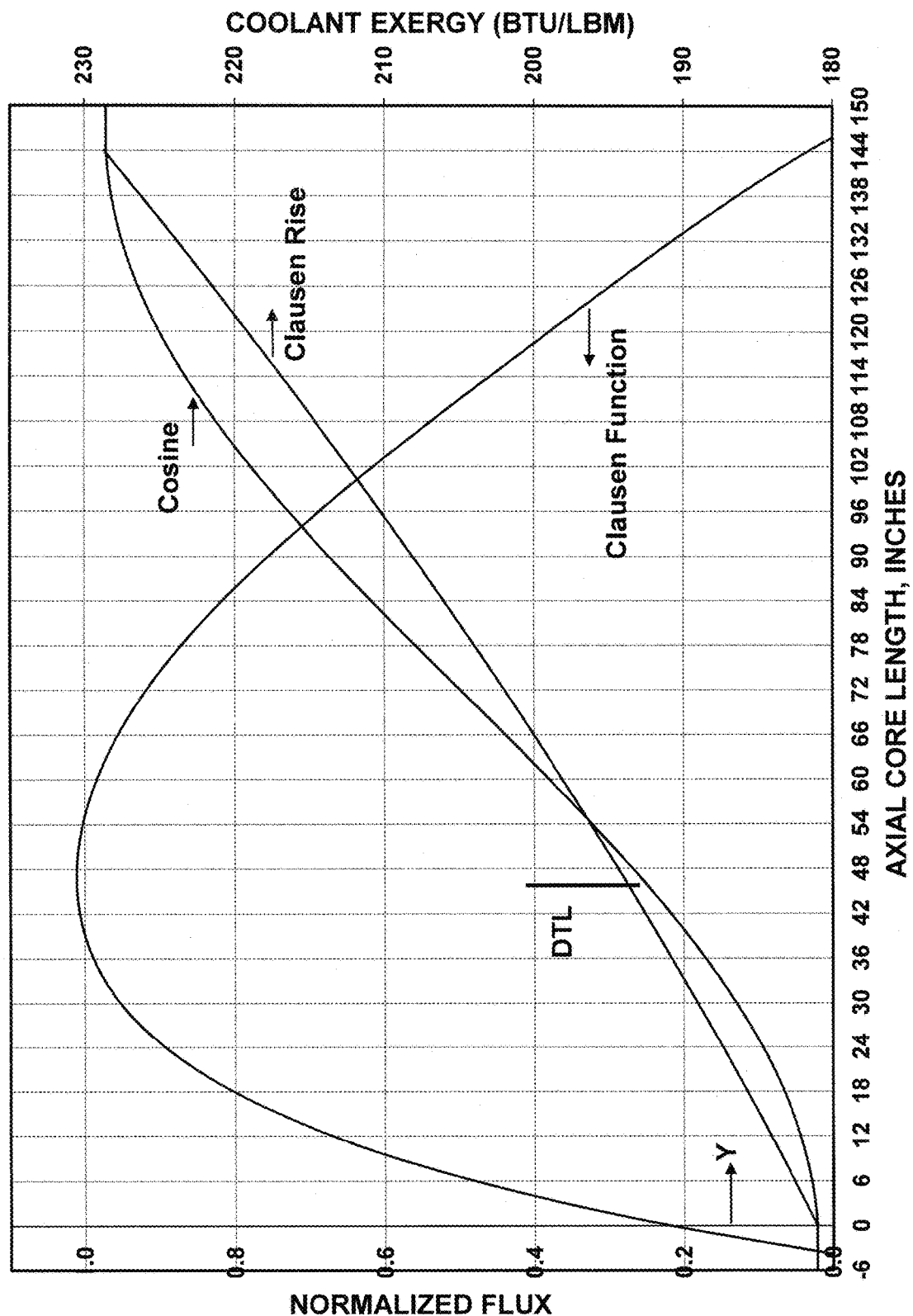
FIG. 4 is based directly on Pseudo Fuel Pin Model computations, including: the Clausen Function axial neutron flux profile; and results of axial coolant exergy rise through the nuclear core based on both cosine and Clausen profiles.

When Eq. (21) is classically solved for a finite cylinder, a $[\Phi_{MAX-CO} J_0(2.4048r/R')\cos(\pi z/2Z')]$ relationship results. The Bessel $J_0$ function (or the modified $I_0$ for the solid PFP) is ≈unity given above assumptions. Theoretical axial boundary at $\pm Z'$ is taken as the location for assumed axial zero flux. Refer to FIG. 3 & FIG. 4. Well-known to one skilled, the underlying theoretical basis of Eq. (21) leads to a definition of buckling given a large reactor which is slightly super-critical, $[(k_{EFF}-1.0)/(B_P^2 M_T^2)]$, where $M_T$ is the neutron migration length or its equivalence. $B_P^2$ is defined traditionally:

$$B_P^2 \equiv [\pi/(2Z')]^2 \qquad (22)$$

where:

$$Z' \equiv Z + M_T \qquad (23)$$

The hydraulic annulus surrounding the PFP is the reactor's total area less fuel pin, control rods and structural areas, divided by the number of pin cells available for coolant flow, $M_{TPin}$. The number of pins producing nuclear power is $M_{FPin}$. A given an axial $\Delta z$ (or $\Delta y$) slice, the pin's coolant will see an $\Delta$exergy increase proportional to the local Temporal Fission Density times UREC. In summary, the fuel pins' $\Delta z$ slice from (n-1) to (n) produces an exergy gain in the fluid per slice per pin of $q_{n-2nd}$. Of course, $q_{n-Flux} = q_{n-2nd}$ at any axial position.

$$q_{n-Flux} \equiv C_E \pi r_0^2 \left\{ \sum_{j=1,4} \sum_{F-j} v_{REC-j} \right\} \cdot \Phi_{MAX-CO} [\cos(B_P z_n)] \Delta z \qquad (24A)$$

$$q_{n-2nd} \equiv (m_{RV}/M_{FPin})(g_n - g_{n-1}) \qquad (24B)$$

$$Q_{RVX} = \sum_{n=1,N} [q_{n-Flux}] = \sum_{n=1,N} [q_{n-2nd}] = m_{RV}[g_{Core}(y) - g_{RCI}] \qquad (25)$$

$Q_{RVX}$ represents the totals of Eq. (24) where $g_{RCI}$ is taken at the nuclear core's entrance after vessel loss. Applying the PFP Model means integration of Eq. (24) from the nuclear core's entrance, not to its outlet (RCU) but to some distance less, measured from its entrance (at $-Z$ or $y_1$).

$$\int_{-Z}^{z} C_E \pi r_0^2 \sum_F [\overline{v}_{REC} + \overline{v}_{TNU}] \quad (26)$$

$$\Phi_{MAX-CO}[\cos(B_P z)]dz = \int_{y_1}^{y}(m_{RV}/M_{FPin})[g_{Core}(y) - g_{RCI}]dy +$$

$$\int_{-Z}^{z} C_E \pi r_0^2 \sum_F \overline{v}_{LRV} \Phi_{MAX-CO}[\cos(B_P z)]dz$$

Since solution to Eq. (21) describes the shape of the flux, independent of power, for all symmetric trigonometry functions the $\Phi_{MAX-CO}$ value will always be found at the centerline, at $z=0.0$ or $y=Z$. For non-boiling reactors, any symmetric trigonometry function will always produce an essentially symmetric axial $\Delta$exergy gain. Thus an Eq. (2ND)-like formulation is simply repeated; changes in specific volume, viscosity, fluid velocity, etc. are simply not sufficient to effect significant asymmetry. In developing the PFP Model, although the partial integration of a symmetric Eq. (26) is useful for parametric studies, to maximize computational independence integration of an asymmetric function is the Preferred Embodiment. Such a function, $f(\Omega)$, should satisfy: a) $f(\Omega)=0.0$ at $\Omega = b\pi$, $b=0, 1, 2, \ldots$; b) integrates to unity from zero to $\pi$; c) is periodic and odd over any $2b\pi$; d) $f(\Omega)$ is skewed; and e) ideally, has a non-unity peak. This is the Clausen Function of Order Two, $Cl_2(\Omega)$.

$Cl_2(\Omega)$ is defined by a Fourier series, reduced using a sixth-order polynomial fit with coefficients $E_{m1}$, where $\Omega$ is a function of both axial position (shifted by $M_T$) and $B_P$.

$$Cl_2(\Omega) \equiv \sum_{n=1}^{\infty} \sin[n\,\Omega(y)]/n^2 = \sum_{m1=1}^{7} E_{m1}[\Omega(y)]^{m-1}; \quad (27)$$

$$\text{where: } \Omega(y) \equiv (y + M_T)B_P$$

Thomas Clausen developed his function in 1832; it is well known to mathematicians. There are a number of schemes for computing $Cl_2(\Omega)$; e.g., using Chebyshev coefficients and others. Its direct integration is apparently elusive, however, a polynomial, normalized to exactly unity area, satisfies all functionalities. For use with the NCV Method, $\Omega(y)$ is off-set accounting for the buckling phenomenon assuming zero flux at the profile's boundaries: $\Omega(y_0=-M_T)=0.0$, and at: $\Omega(y_3=2Z+M_T)=2(Z+M_T)B_P=\pi$. Refer to FIG. 4. Note that the Clausen's peak is non-unity, defined by $Cl_2(\pi/3)$.

The Clausen when applied to the PFP results in the following, as based on Eq. (26).

$$\int_{-Z}^{z} C_E \pi r_0^2 \sum_F [\overline{v}_{REC} + \overline{v}_{TNU}] \quad (28)$$

$$\Phi_{MAX-CL} \sum_{m1=1}^{7} E_{m1}[\Omega(y)]^{m-1} d\Omega = \int_{y_1}^{y}(m_{RV}/M_{FPin})[g_{Core}(y) - g_{RCI}]dy +$$

$$\int_{y_1}^{y} C_E \pi r_0^2 \sum_F \overline{v}_{LRV} \Phi_{MAX-CL} \sum_{m1=1}^{7} E_{m1}[\Omega(y)]^{m-1} d\Omega$$

The peak flux, $\Phi_{MAX-CO}$ or $\Phi_{MAX-CL}$, as with any such function must be substituted for the average flux $\Phi_{TH}$, determined by average integration over the entire active length of the PFP. In Eq. (30A), the $(2/B_P)$ factor reflects the integration of a $\int \sin[\Omega(y)]d\Omega$ function, and the unique method of evaluating $\Omega(y)$ that is, when employing $B_P$ of Eq. (22).

$$\Phi_{TH} = \{\Phi_{MAX-CO}/[Z-(-Z)]\} \int_{-Z}^{+Z} \cos(B_p z)dz \quad (29A)$$

$$= \Phi_{MAX-CO} \frac{2}{\pi}\left(1.0 + \frac{M_T}{Z}\right)\sin\left[\frac{2}{\pi}\left(1.0 + \frac{M_T}{Z}\right)\right]^{-1} \quad (29B)$$

$$= \{\Phi_{MAX-CL}/[2Z-0.0]\} \frac{2}{B_P} \sum_{m1=1}^{7} \left[\frac{E_{m1}[\Omega(y)]^{m1}}{m1}\right]_{y1}^{y2} \quad (30A)$$

$$= \Phi_{MAX-CL} \frac{2}{\pi}\left(1.0 + \frac{M_T}{Z}\right) \sum_{m1=1}^{7} \left[\frac{E_{m1}[\Omega(y)]^{m1}}{m1}\right]_{y1}^{y2} \quad (30B)$$

When converting the cosine axial peak $\Phi_{MAX-CO}$ to the average, the literature repetitiously assumes: $\Phi_{MAX-CO}=(\pi/2)\Phi_{TH}$. This is not correct. As taught here, one must evaluate the average flux associated only with the active core; i.e., its production of nuclear power. Thus, $\Phi_{TH}$ must be evaluated as the average of the integration about the z-axis given the chopped cosine from $-Z$ to $+Z$ (not $\pm Z'$). For the common PWR, Eq. (29) becomes significant. Given a 12 foot active core with $M_T$ taken as 6.6 cm, Eq. (29) yields $C_{MAX-CO} \approx 1.518$ (vs. the traditional $\pi/2$); see TABLE 1. Thus if ignoring Eq. (29), the computed flux would be high by 3.5%. Such an error would catastrophically bias computed electrical power, reactor coolant flow, etc. Clausen's $C_{MAX-CL}$, is computed in the same manner. Results of the average integration, Eq. (30), were taken from $y_1=0.0$ to $y_2=2Z$. Note that Eqs. (29) & (30B) produce a "PFP Kernel" herein defined as: $[(2/\pi)(1.0+M_T/Z)]$. This term appears in all trigonometrically-based profiles applicable for any $\Phi_{MAX}$ to $\Phi_{TH}$ translation, and reflects a correct integration.

In summary the method exampled by Eqs. (29) & (30B) applies to any system employing a neutron or plasma flux, given leakage at boundaries, and derived from an integratable function. TABLE 1 presents relationships between $\Phi_{MAX}$ and $\Phi_{TH}$; per PFP Kernel where $M_T=6.6$ cm, and $2Z=144$ in.

TABLE 1

Summary of $C_{MAX}$

| Flux Profile | $C_{MAX} = \Phi_{MAX}/\Phi_{TH}$ |
| --- | --- |
| Cosine, no leakage ($M_T = 0.0$) | $\pi/2 = 1.57079633$ |
| Cosine with leakage | Eq.(29) => 1.51835422 |
| Clausen, no leakage ($M_T = 0.0$) | Eq.(30B) => 1.76589749 |
| Clausen with leakage | Eq.(30B) => 1.70603654 |

As applied to the NCV Method, PFP integration of Eq. (28) is made from the nuclear core's entrance to the point that asymmetry is most pronounced, designated as $y=\bar{y}$. This point is herein defined as the "Differential Transfer Length"

or DTL; i.e., a declared distance descriptive of asymmetry. For the PWR the DTL is typically chosen at the Clausen's peak. For the BWR without re-circulation, asymmetry is considerably simpler, typically defined at the point DNB is reached. However, if the BWR employs recirculation flow, then PWR methods may apply. The location of the DTL is chosen to maximize asymmetry between the exergy profile versus one conventionally produced. The DTL is dependent on the reactor type and operational characteristics, but once chosen should be held constant for NCV integration and subsequent monitoring. Finally, the fourth independent equation stemming from Eq. (28) when integrated to the DTL point and substituting for $C_{MAX-CL}\Phi_{TH}$, results in a unique fourth equation (having distinct coefficients) versus Eqs. (2ND) or (1ST) . . . the matrix Rank is not diminished.

$$(2D_1/B_P)[\bar{\nu}_{REC} + \bar{\nu}_{TNU}]\Phi_{TH} + D_4 m_{RV} = (2D_1/B_P)\psi_{LRV} \quad \text{(PFP)}$$

where:

$$D_4 = -[g_{Core}(y) - g_{RCI}]/M_{FPin} \quad (31)$$

$$D_1 = C_E C_{MAX-CL} \pi \, r_0^2 \Sigma_F(t) \sum_{m1=1}^{7} \left[ \frac{E_{m1}[\Omega(y)]^{m1}}{m1} \right]_{y1}^{\bar{y}} \quad (32)$$

After matrix resolution, the resolved $\Phi_{TH}$ and may $m_{RV}$ then be used in conventional analytics for separate study. In separate study, post-matrix, the DTL may be changed. Thus the PFP Model allows determination of the axial position where: $h(y) \approx h_f$; i.e., liquid saturation is being approached, thus an approach to DNB for the BWR.

For the BWR, it has been found that a Clausen Function if taken in mirror image matches the average BWR flux profile remarkably well given changes in void fraction in the upper half of the nuclear core. The mirror image is achieved through a "π-Shifted Clausen", meaning both its profile and integrations are shifted left by [−2(Z+$M_T$)] as follows:

TABLE 2

Clausen Boundaries for Core Integrations to the DTL

| Standard | π-Shifted |
|---|---|
| $\Omega(y_1 = 0) = (y_1 + M_T)B_P$ | $\Omega(y_1 = 0) = \mid (y_1 - 2Z - M_T) \mid B_P$ |
| $\Omega(y = \bar{y}) = (\bar{y} + M_T)B_P$ | $\Omega(y = \bar{y}) = \mid (\bar{y} - 2Z - M_T) \mid B_P$ |

The above Second Law Pseudo Fuel Pin Model teaches formulating a fourth independent equation based on thermodynamic laws. Once the above First Law conservation of energy flows and Second Law exergy analyses are solved, the following set of First Law thermal efficiencies may then be determined; a portion of Thermal Performance Parameters. As discussed, a First Law efficiency of an inertial process has no meaning; the nuclear core's efficiency is assigned unity. However, RV pump & installation losses, pipe installation and ΔP affects between the SG and RV are assigned to $\eta_{RV}$. PWR Steam Generator efficiency includes pipe installation and ΔP affects between the TC and SG. For the BWR: $\Delta h_{SGQ} = \Delta h_{TCQ}$. The product of these efficiencies produces NSSS efficiency, $\eta_{SYS}$. Efficiencies may be converted to the commonly used heat rate term (Btu/kw-hr) via the ratio [3412.1416/Efficiency].

$$\eta_{SYS} = [3412.1416 \, P_{UT}/(m_{RV}\Delta h_{RVX})] \quad (35A)$$

-continued
$$= [m_{RV}\Delta h_{RCX}/(m_{RV}\Delta h_{RVQ})][m_{FW}\Delta h_{TCQ}/(m_{RV}\Delta h_{RVX})] \quad (35B)$$

$$[3412.1416 \, P_{UT}/(m_{FW}\Delta h_{TCQ})]$$

$$= \eta_{RV} \, \eta_{SG} \, \eta_{TC} \quad (35C)$$

Although the above discussion presents classic efficiencies, the calorimetrics Model affords a more direct determination of $\eta_{TC}$ based on the computed $Q_{REJ}$ and measured $P_{UT}$. Thermal efficiency is fundamentally useful power output divided by energy flow supplied to the system. $Q_{TCQ}$ of Eq. (13) is principally useful power output plus heat rejection-which, indeed, is energy flow supplied to the system. Thus to increase $\eta_{TC}$ accuracy by eliminating the influence of uncertain Condenser energy flows (i.e., LP turbine exhaust extensive properties and its mass flow, Feedwater heater drain and turbine seal energy flows, etc.), Eqs. (13) & (14B) are combined, given a resolved $m_{FW}$, results in Eq. (36). Eq. (36) considerably improves accuracy of $\eta_{TC}$ given it is essentially independent of Condenser $\dot{m}\Delta h$ (minor pump terms aside), but dependent principally on the system computed $Q_{REJ}$ and measured $P_{UT}$.

$$\eta_{TC} = 3412.1416 \, P_{UT}/[3412.1416(P_{UT} + L_{Mech} + L_{Elect}) + \quad (36)$$

$$Q_{REJ} + Q_{Loss-TC} - m_{FW}\Delta \bar{h}_{FWP} + P_{FWP-Aux} - \sum m_{CDP-k3}\Delta h_{CDP-k3}]$$

Neutronics Data

As will be seen, resolved calorimetrics, leading to the computed irreversibilities and $FCI_{Loss-k}$, are dependent on base neutronics and Nuclear Fuel Management (NFM) computations forming the static portion of the Neutronics Model. If NFM computations are placed on-line, their importance becomes obvious within the NCV Method, as it would provide temporal neutronics data.

The most consistent recoverable exergy per fission values available are presented in TABLE 3. Decay quantities are time dependent; listed in TABLE 3B are infinite irradiation times. It is important to recognize the details of assuming an inertial process. This said, the "true" inertial recoverable exergy is: F1+F3+F4+F9+F10+F11. These individual exergies are solely associated with the fission phenomenon following fission neutron capture. For the purposes of Eq. (2ND) and its derivatives, the actual recoverable exergy flow is driven by F13, the summation including F2 & F6. Thus recoverable exergy of the system is enhanced by the incident neutron's kinetic energy, $\upsilon_{INC-j}$, and non-fission capture, $\upsilon_{NFC-j}$. In summary, Column F5 is: F1+F2+F3+F4. Column F7 is F5+F6. Column F12 is the total delayed recoverable: F9+F10+F11. Column F15 is the total release, F13 plus the prompt neutrino F8 and delay antineutrino F14. Note that the literature employs the word "energy" as in "energy per fission", "total energy release", etc. In the context of this disclosure, "energy" invokes First Law quantities which have no meaning per se for nuclear fission, the term "exergy" is correct; i.e., "exergy per fission", "total exergy release", and like terms. However, the word "energy" is applicable for conversion of insulation losses; e.g., $Q_{Loss-RV}$ processed via a Carnot Engine. References, listed in order of importance, include: R. Sher, "Fission-Energy Release for 16 Fissioning Nuclides", NP-1771 Research Project 1074-1, Stanford University, prepared for Electric Power Research Institute, Palo Alto, CA, March 1991; M. F. James, "Energy Released in Fission", *Journal of Nuclear Energy*, vol. 23, pp. 517-36, 1969; R. C. Ball, et al., "Prompt Neutrino Results from Fermi Lab", *American Institute of Physics Conference Proceedings* 98, 262 (1983), placed on the internet at/doi.org/10.1063/1.2947548; S. Li, "Beta Decay Heat Following $^{235}$U, $^{238}$U and $^{239}$Pu Neutron Fission", PhD Dissertation, U. of Massachusetts, 1997; and T. K. Lane, "Delayed Fission Gamma Characteristics of $^{235}$U, $^{238}$U and $^{239}$Pu", Applied Nuclear Technologies, Sandia National Lab.

The temporal sum of recoverable exergies, $\upsilon_{REC-j}(t)$ within Eq. (44), is a function of $^{235}$U depletion, $^{238}$U capture or fast fission, and Pu buildup. The sum $\bar{\upsilon}_{REC}(t)$ plus $\bar{\upsilon}_{TNU}(t)$ is the total weighted average fission exergy released including incident neutron and non-fission capture (as caused by the originating fission event); defined as $\bar{\upsilon}_{TOT}(t)$. NFM data must share consistency with Eqs. (41) to (46). Nomenclature comprises the following fissile isotopes, j=1 to 4: 35=>$^{235}$U; 38=>$^{238}$U; 39=>$^{239}$Pu; and 41=>$^{241}$Pu. In addition to these common fission isotopes, there are others. The integration limits of Eqs. (41) & (42) are chosen commensurate with the fissile isotope or as typically established by NFM: for thermal fission, S=0.01 eV, E=100 eV; for $^{238}$U, S=1.0 MeV, E=5 MeV. Number densities, $N_j(t)$, and micro cross sections, $\sigma_{F-j}(t,e)$, are a function of time & burn-up as determined by NFM.

TABLE 3A

MeV/Fission, Prompt (0 < t < 1 sec)

| Isotope | Product Kinetic Energy F1 | Incident Neutron $\upsilon_{INC-j}$ F2 | Prompt Fission Neutron F3 | Prompt Gamma $\upsilon_{PGM-j}$ F4 | Prompt Total F5 | Non-Fiss. Capture $\upsilon_{NFC-j}$ F6 | Prompt Recoverable $\upsilon_{PRC-j}$ F7 | Prompt Neutrino $\upsilon_{PNU-j}$ F8 |
|---|---|---|---|---|---|---|---|---|
| $^{235}$U | 169.12 | 0.03 | 4.79 | 6.88 | 180.82 | 8.80 | 189.62 | 0.68 |
| $^{238}$U | 169.57 | 3.10 | 5.51 | 6.26 | 184.44 | 11.10 | 195.54 | 0.86 |
| $^{239}$Pu | 175.78 | 0.03 | 5.90 | 7.87 | 189.58 | 11.50 | 201.08 | 0.56 |
| $^{241}$Pu | 175.36 | 0.03 | 5.99 | 7.83 | 189.21 | 12.10 | 201.31 | 0.69 |

TABLE 3B

MeV/Fission, Delayed (1 sec < t < $10^8$ sec) & Totals

| Isotope | Delayed Neutron F9 | Delayed Gamma F10 | Delayed Beta F11 | Delayed Total F12 | Total Recov. $\upsilon_{REC-j}(t)$ F13 | Antineutrino $\upsilon_{DNU-j}(t)$ F14 | Total Exergy $\upsilon_{TOT-j}(t)$ F15 |
|---|---|---|---|---|---|---|---|
| $^{235}$U | 0.01 | 6.33 | 6.50 | 12.84 | 202.46 | 8.07 | 211.21 |
| $^{238}$U | 0.02 | 8.02 | 8.25 | 16.29 | 211.83 | 10.22 | 222.91 |
| $^{239}$Pu | 0.00 | 5.17 | 5.31 | 10.48 | 211.56 | 6.58 | 218.70 |
| $^{241}$Pu | 0.01 | 6.40 | 6.58 | 12.99 | 214.30 | 8.16 | 223.15 |

$$\Phi_{TH} \equiv \Phi(t) = \int_S^E \Phi(t,e)de/(E-S) \quad (41)$$

$$\sum\nolimits_{F-j}(t) = \sum\nolimits_j \int_S^E \Phi(t,e) N_j(t) \sigma_{F-j}(t,e)\, de/\Phi(t) \quad (42)$$

$$\sum\nolimits_F(t) = \sum\nolimits_{F-35}(t) + \sum\nolimits_{F-38}(t) + \sum\nolimits_{F-39}(t) + \sum\nolimits_{F-41}(t) \quad (43)$$

$$\bar{\upsilon}_{REC}(t) = \left[\sum\nolimits_{F-35}(t)\upsilon_{REC-35} + \sum\nolimits_{F-38}(t)\upsilon_{REC-38} + \sum\nolimits_{F-39}(t)\upsilon_{REC-39} + \sum\nolimits_{F-41}(t)\upsilon_{REC-41}\right]/\sum\nolimits_F(t) \quad (44)$$

$$\bar{\upsilon}_{TNU}(t) = \Big\{\Big[\sum\nolimits_{F-35}(t)[\upsilon_{PNU-35} + \upsilon_{DNU-35}(t)] + \quad (45)$$

$$\sum\nolimits_{F-38}(t)[\upsilon_{PNU-38} + \upsilon_{DNU-38}(t)] + \sum\nolimits_{F-39}(t)[\upsilon_{PNU-39} + \upsilon_{DNU-39}(t)] + \sum\nolimits_{F-41}(t)[\upsilon_{PNU-41} + \upsilon_{DNU-41}(t)]\Big\}/\sum\nolimits_F(t)$$

$$\bar{\upsilon}_{TOT}(t) \equiv \bar{\upsilon}_{REC}(t) + \bar{\upsilon}_{TNU}(t) \quad (46)$$

TABLE 3 suggests both neutrino and antineutrino exergies are produced from the fission event, columns F8 & F14. The startup of a virgin core with a well insulated Reactor Vessel (say equivalent to ≈0.00 MeV/Fission)—thus with no delayed antineutrino production, and without shaft input, has no identifiable irreversible loss—and violates the Second Law. If prompt $\bar{\upsilon}_{PNU} \approx 0.0$ then, at time zero Eq. (3C) yields: $\bar{\upsilon}_{LRV}(0) = 0.0$, and thus $_{ICore} = 0.0$ and $\Xi = 2.0$. There is no non-passive process which operates without an irreversible loss. Given this, it is proposed that neutrino production occurs given prompt proton decay (producing a neutron, positron & neutrino) at the instant of fission fragment formation. The positron is annihilated with an atomic beta, producing a portion of the observed prompt gamma radiation. Note that no known experiment has measured a single fission event at a time scale required for proof. The literature generally supports this postulate. Work at CERN in 1977 (Ball) reported "These [experiments] showed that there was an unexpected source of neutrinos which apparently came from the decay of short lived particles". Since the late 2010s, based on theoretical predictions, the measured antineutrino flux from a group of commercial reactors operating over years, observing virgin fuel to high burn-ups, was reported as being low by 7.8% (Fallot). This was identified with $^{235}$U fission products (but not $^{239}$Pu). These experimenters were examining the $^1n_0 \rightarrow {}^1H_1 + \beta^- +$Antineutrino] reaction and not $^1H_1 \rightarrow {}^1n_0 + \beta^+ +$Neutrino]; it is assumed a low neutrino yield would be masked by antineutrinos. Such treatment means the traditional assumption of fission fragments (e.g., $^{141}$Ba and $^{92}$Kr) is in error by an atomic number.

However, given the traditional literature is based on mass defects, supporting Column F15 less $\upsilon_{INC-j}$ & $\upsilon_{NFC-j}$, the totals of TABLE 3 are conserved. For the Preferred Embodiment, prompt neutrinos are assumed to be 7.8% of the traditional antineutrino exergy after infinite irradiation, as $[\upsilon'_{DNU-j}(\infty)]$, thus maintaining traditional totals. It could be argued that the traditional totals are in error, that prompt neutrino exergy is in proportion to observed prompt gamma radiation. Resolution requires applying this disclosure over a number of operational years, noting LRV & $\psi_{LRV}$ are COP $\Lambda_4$ & $A_6$.

$$\upsilon_{PNU-j} \equiv 0.078\, \upsilon'_{DNU-j}(\infty) \quad (47A)$$

$$\upsilon_{DNU-j}(t) = \upsilon'_{DNU-j}(\infty) - \upsilon_{PNU-j} \quad (47B)$$

$$\upsilon_{TNU-j}(t) = \upsilon_{PNU-j} + \upsilon_{DNU-j}(t) \quad (48)$$

As a practical matter, the NCV Method is principally concerned with monitoring a system at steady state. Typical data averaging is based on 15 minute running averages. However, given extension of the PFP Model, and Alternative Embodiments, antineutrino & neutrino considerations become important; seconds become important. Delay times associated with TABLE 3B quantities are typically less than 2 minutes (the half-life of the first of six energy groups of the important delayed neutrons is 55 seconds, the second at 22 seconds, the third, etc. <6 seconds). Expansion of such time dependencies is well known art and amenable for NCV dynamic modeling. References include: Ball, cited above; and M. Fallot, "Getting to the Bottom of an Antineutrino Anomaly", *Physics*, 10, 66, Jun. 19, 2017, American Physical Society.

Fission Consumption Indices

This invention teaches, after solving consistent calorimetrics for the NSSS, to then perform analyses for "locating a set of thermal degradations" within the NSSS. Locating the set of thermal degradations means providing information to the operator as to where in the system such degradations occur. Of course, this means the system must be truly understood . . . the vehicle for this lies with resolution of $\Phi_{TH}$, $P_{GEN}$, $Q_{REJ}$ and $m_{RV}$, a system solution leading directly to $G_{IN}$ of Eq. (3A). $G_{IN}$ is the total exergy flow supplied to the system, including recoverable and unrecoverable exergies, and shaft power additions; this is Fermi's theoretically "potential", a potential totally available to produce power. $G_{IN}$ is destroyed by the system, resulting in only actual useful power output ($P_{GEN}$) and thermodynamic irreversibilities, $\Sigma I_k$. $\Sigma I_k$ herein defined as a set of system losses, given a specific NSSS.

$$G_{IN} \equiv Q_{FIS} + \sum P_{RVP-k1} + \sum P_{CDP-k3} \quad (51A)$$

$$= P_{GEN} + \sum I_k \quad (51B)$$

where: $G_{IN}$ and $\Sigma I_k$ are then used to define nuclear power plant Fission Consumption Indices (FCIs) by dividing Eq. (51B) through by $G_{IN}$, and multiplying by 1000 for numerical convenience:

$$1000 = FCI_{Power} + \sum FCI_{Loss-k} \quad (52)$$

Flowing from $G_{IN}$, FCIs are fundamentally a unitless measure of the Temporal Fission Density, assigned thermodynamically to those individual components or processes responsible for the destruction of fissile material. FCIs quantify the exergy and power consumption of all components and processes relative to $G_{IN}$; by far its predominate term is the fission's recoverable exergy. Given such resolution, it becomes obvious that locating a set of equipment thermal degradations in the nuclear power plant by observing increased $FCI_{Loss-k}$ values, herein defines "a set of identified degraded $FCI_{Loss-k}$".

For the typical NSSS, three to four dozen FCIs are commonly employed: $FCI_{Power}$, $FCI_{TNU}$, $FCI_{Cond}$, $FCI_{Loss-RV}$, $FCI_{Loss-SG}$, $FCI_{Misc-TC}$, $FCI_{RVP-k1}$, $FCI_{FWP-k2}$, $FCI_{CDP-k3}$, $FCI_{TUR-k4}$ (HP turbine), $FCI_{TUR-k5}$ (LP turbine), $FCI_{TUR-Aux}$, $FCI_{MSR}$, $FCI_{FWH-k6}$, etc. as required by the operator. Such a set is herein defined as "a set of system $FCI_{Loss-k}$" which are, of course, unique to any given NSSS; they sum to Eq. (52)'s $\Sigma FCI_{Loss-k}$. For example, if the Turbine Cycle's $FCI_{Cond}$ increases from 200 to 210 (i.e., higher irreversible losses) which is just offset by a decrease of 10 points in $FCI_{Power}$, with no other changes, the operator has absolute assurance that a 5% higher portion of the Temporal Fission Density is being consumed to overcome higher Condenser losses, at the expense of useful power output . . . thus recent changes to the Condenser have had an adverse effect on the system. Thus, $FCI_{Cond}$ is the set of identified degraded $FCI_{Loss-k}$. Such examples are endless given design nuances and operational philosophies. In the most general case, the nuclear power plant operator by monitoring trends in FCIs, will instigate changes such that the $FCI_{Power}$ is maximized and the set of identified degraded $FCI_{Loss-k}$ are to be minimized, thereby improving the nuclear power plant's system effectiveness, $\varepsilon_{SYS}$ of Eq. (57). Specifically, the NSSS operator—for the first time—has a nexus between neutronics, component losses and electrical generation . . . provided $G_{IN}$ and $\Sigma I_k$ are consistently defined.

For the nuclear fission or fusion system, $FCI_{Loss-k}$ losses are based on irreversibilities computed via Eq. (53), details afforded via Eq. (1). The Second Law demands, for all non-power components within a non-passive system, that: $\Sigma I_k > 0.0$. However, for any given component it is possible that $I_k < 0.0$. For example, the Condenser whose sink temperature is $<T_{Ref}$, will produce a negative $I_{Cond}$. This is equivalent to exergy analysis of a refrigeration system in which the lowest sink temperature could be well below $T_{Ref}$, producing $I_k < 0.0$ for its chiller component. Engineering judgement of components must apply.

$$\sum I_k = \sum (1.0 - T_{Ref}/T_{hh})Q_{Loss-hh} + \qquad (53)$$
$$\sum_X \sum_{ii} (P_{X-ii} - m_{X-ii}\Delta g_{X-ii}) + Q_{NEU-Loss} - \int d(mg)_{jj}$$

The first right-hand term of Eq. (53) describes the Carnot Engine loss. The second term are pump losses, reducing to $[m_{X-ii}T_{Ref}\Delta s_{X-ii}]$. $Q_{NEU-Loss}$ is the sum of ideal nuclear losses originating from the inertial process, principally antineutrino & neutrino productions. The last term $\int d(mg)_{jj}$ traditionally represents any non-passive process having exergy exchange. For example, viable feedwater heaters in a TC, must produce a negative exergy flow. A negative $\int d(mg)$, produces an increase in irreversibility; e.g., viable heat transfer from shell to tube for a FW heater. As herein defined, this term includes both the traditional definition (typically describing heat exchangers), and also any non-shaft addition of an exergy equivalence to the inertial process. For an isolated fission RV, $\int d(mg)=0.0$, irreversibilities then reduce to Eq. (54). The upper limit of Eq. (55) is reasonably defined by the user consistent with the inertial process; a best mode practice suggests $C_{dv}=2.0$ given quantum parity.

$$I_{RV} = (1.0 - T_{Ref}/T_{RVI})Q_{Loss-RV} + m_{RV}T_{Ref}\Delta_{RVP} + Q_{NEU-Loss} \quad (54)$$

where: if $\bar{v}_{LRV}$ is used as COP $\Lambda_4$ (thus defining $Q_{NEU-Loss}$), its assigned limitations include:

$$\bar{v}_{PNU}(t) \le \bar{v}_{LRV}(t) \le C_{dv}\bar{v}_{TNU}(t) \quad (55)$$

However, in support of the nuclear importance and teachings of Eq. (53), consider $\int d(mg)_{jj}$ and $Q_{NEU-Loss}$ in combination as applied to an inertial fusion process employing magnetic confinement of its plasma, as used in the popular Tokamak design. If using magnetic confinement, description of the fusion process must include its exergy equivalence as a $\int d(mg)_{MC}$ term. The value of magnetic confinement in terms of an equivalent exergy flow is taken as the difference in the actual, real power delivered to the confinement, less the ideal power associated with zero inductive reactance. Said equivalent exergy flow is always positive, thus reducing $\Sigma I_k$. This may well violate the Second Law and thus the viability of a given fusion design. For example, the exergy yield from a D-T reaction is 17.6 MeV/Fusion, its neutrino exergy is approximately 5 MeV/Fusion. A proportionally large $Q_{NEU-Loss}$ implies a large influence on a computed plasma flux; however, an even larger influence may stem from a positive $\int d(mg)_{MC}$ term and thus will oppose viability. Such a fusion scenario reduces Eq. (53) to:

$$\int d(mg)_{MC} < \sum (1.0 - T_{Ref}/T_{hh})Q_{Loss-hh} + Q_{NEU-Loss} \quad (56)$$

Eq. (56) states that for fusion viability, that is conserving the Second Law, exergy flow supplied from magnetic confinement must be less than the sum of the Carnot Engine conversion and neutrino loss. This principle applies to any inertial process, fission or fusion. Eq. (56) may be achieved by increasing $Q_{Loss-hh}$, but at the obvious expense of system viability. A goal of $\int d(mg)_{MC} < Q_{NEU-Loss}$ would appear both desirable and practicable for the design of fusion systems if producing a useful output greater than burning paperwork. If this is not achieved through use of low magnetic power, using superconductors, or star-like compression, then the fusion system will not function given a computed system $\Sigma I_k < 0.0$. In support of Eq. (53) & (56), note that: a sun's fusion process is only viable in the presence of cold gravity; a fusion bomb is initiated via extreme pressure (not temperature per se); and the collision of two suns could well result in extinction of their fusion fires (a form of adding an exergy equivalence to each star from its colliding star's outer mantel and convective zones). Recently it has been reported that, under certain circumstances, two colliding stars result in nothing . . . one, bigger, brighter star is not formed. From Prof. A. Sills, "When Stars Collide", *Astronomy Magazine*, May 2020, pp. 68:

"In star clusters, the stars are moving relatively slowly, and so [this results] in the two stars merging into one new, more massive star that we call a blue straggler . . . [However, in] the center of the galaxy [involving higher closing speeds a] collision there is much more destructive, and often the aftermath is just 'star bits' (that is, mostly hydrogen gas) spread out all over interstellar space."

The common term of merit for any system exergy analysis is its "effectiveness". $\varepsilon_{RV}$, $\varepsilon_{SG}$ and $\varepsilon_{TC}$ are effectivenesses for the RV, SG & TC following Eq. (35); their product produces the NSS System effectiveness, $\varepsilon_{SYS}$. These are a portion of Thermal Performance Parameters.

$$\varepsilon_{SYS} = [3412.1416 P_{UT}/G_{IN}] \quad (57A)$$
$$= [m_{RV}\Delta g_{SGQ}/G_{IN}][m_{FW}\Delta g_{TCQ}/(m_{RV}\Delta g_{SGQ})] \quad (57B)$$
$$\quad [3412.1416 P_{UT}/(m_{FW}\Delta g_{TCQ})]$$
$$= \varepsilon_{RV} \; \varepsilon_{SG} \; \varepsilon_{TC} \quad (57C)$$

Embodiments and Resolution of Unknowns

The Preferred Embodiment's calorimetrics Model invokes four governing equations, solved simultaneously, for the unknowns: $\Phi_{TH}$, $P_{GEN}$, $Q_{REJ}$ and $m_{RV}$. The governing equations are herein defined as comprising: a Second Law exergy analysis of the nuclear power plant, a First Law conservation of the nuclear power plant, a First Law conservation of the TC and a fourth independent equation based on thermodynamic laws. These equations resolve four unknowns by routine 4×4 matrix solution; routine, given these equations have a computed Rank of 4. In summary, resolution of these unknowns means using the calorimetrics Model to solve simultaneously: the average neutron flux ($\Phi_{TH}$), the useful power output ($P_{GEN}$), the Turbine Cycle heat rejection ($Q_{REJ}$) and the Reactor Vessel coolant mass flow ($m_{RV}$) thus yielding a complete thermodynamic understanding of the nuclear power plant. The Preferred Embodiment includes verifying results using a Verification Procedure, thereby improving nuclear safety and assuring that the applicable Regulatory Limit is ever exceeded.

Further, given teachings leading to the Preferred Embodiment, one skilled will observe that if useful power output ($P_{GEN}$) is input as a known constant, then one equation is eliminated. Thus three embedded unknowns $\Phi_{TH}$, $Q_{REJ}$ & $m_{RV}$ are solved simultaneously using routine 3×3 matrix solution; these establish Alternative Embodiments A through E. Although the skilled will observe additional Alternative Embodiments, useful ones are listed below. Note that attributes of Alternative Embodiments A through E comprise: a) all equation sets are solved for the three embedded unknowns; b) all equation sets assume $P_{GEN}$ is a known input based on Eq. (14B); c) all equation sets, individually, yield a computed Rank of 3; d) all are amiable to Verification Procedure; and e) may be processed assuming either steady state or transient conditions. All are further detailed in INDUSTRIAL APPLICABILITY.

Alternative Embodiment A: consisting of Eqs. (2ND), (1ST) & (PFP);

Alternative Embodiment B: consisting of Eqs. (2ND), (3RD) & (PFP);

Alternative Embodiment C: consisting of Eqs. (1ST), (3RD) & (PFP);

Alternative Embodiment D: consisting of Eqs. (2ND), (1ST) & (3RD);

Alternative Embodiment E: is an iterative computation of two equation sets, resolving E;

Alternative Embodiment F: $\Phi_{TH}$ is replaced with a related Neutronic Flux Term;

Alternative Embodiment G: is a grouping of two equations used for transient monitoring; and Alternative Embodiment H: forms single equation used for transient and safety monitoring.

Alternative Embodiment E independently solves for the Inertial Conversion Factor using two sets of equations. The "B" set of Eqs. (2ND), (3RD) & (PFP)—none dependent on $\Xi$—and solved with either set "A", set "C" or set "D". These two sets are then solved in an iterative manner converging on an independently computed $\Xi$ used in Eq. (1ST). This accomplishes: a) confirmation of an estimated or computed Inertial Conversion Factor; b) confirms, given years of operational experience, the elusive antineutrino and neutrino productions; and c) greatly adds to system-wide verification given $\Xi$ should vary uniformly given Pu buildup (i.e., yielding $d\bar{\upsilon}_{TNU}/dt$ affects).

Alternative Embodiment F involves replacing $\Phi_{TH}$ with the Temporal Fission Density $[\Phi_{TH}\Sigma_F]$ or other another Neutronic Flux Term, it becoming the declared unknown. Such substitution is applicable for the four governing equations, or any Alternative Embodiment. Its use is termed, e.g., the "Preferred Embodiment with Alternative F", or Alternative G with Alternative F, etc. $[\Phi_{TH}\Sigma_F]$ is insensitive to time ($\Sigma_F$ changes slowly) and thus is amenable to transient analysis. Solving for $[\Phi_{TH}\Sigma_F]$ in the usual manner allows for direct and on-line operator feedback, and/or acts as a detector of upset conditions. For example, this fundamental understanding, this feedback, conveys to the operator if his/her actions, having instigated Mechanisms for Controlling the Rate of Fission, result in the anticipated (or do said actions adversely impact nuclear safety?). Further, Temporal Fission Density is a predictor of the nuclear core's burn-up in MWD/MTU.

Alternative Embodiments G and H teach the use of governing equations but assuming flux and useful power output are known constants, thus reduced to two or one equation. These allow for simple functionalities, normalized to steady state solutions, useful for monitoring cycles, processed every second.

Any of these Alternative Embodiments, individually, present the bases for either steady state or transient thermodynamic analysis. $P_{GEN}$, if based on an essentially instantaneously measured $P_{UT}$, provides a transient nexus between $\Phi_{TH}$ (or a Neutronic Flux Term; e.g., $[\Phi_{TH}\Sigma_F]$) and electric generator parameters. In this context the generator serves as a receptor of neutronic anomalies. This means ratios of $\Phi_{TH}$ divided by generator frequency, divided by generator current, divided by the generator's reactive load, and like ratios . . . become quite viable. Such viability provides the operator with warnings of upset conditions in the nuclear core given less than 10 second fluid transport delay. Note that fluid transport times from a PWR's SG Feedwater inlet to its LP turbine are 4 to 8 seconds; for a BWR, half that. Said transient analysis only models the RV, SG (if used) and the TC's steam path to the LP turbine (i.e., shaft power delivered, $P_{GEN}$). The analytical model's initiating fluid state is taken either at RVI or at STI. Thus, long transport times associated fluid storages found in the Condenser hot well, MSR and Feedwater heaters are eliminated; thus favoring warning the operator versus exact transient solution.

Verification Procedure

Equations sets associated with the Preferred and Alternative Embodiments may be embedded with Choice Operating Parameters (COP $\Lambda_{nn}$). COP are: constrained by recognized limits; and, generically, act as a vehicle for fine-tuning the NCV Method. Examples of imposed limitations on COPs and SEPs include: $C_{d\upsilon}$ & $C_{\varphi\upsilon}$ when $\Lambda_4$, $\Lambda_5$ & $\Lambda_6$ are assigned; and $C_{FLX}$, $C_{FWF}$ & $C_{RVF}$ when $\Delta\lambda_{FLX}$, $\Delta\lambda_{FWF}$ & $\Delta\lambda_{RVF}$ are assigned (all defined in Definitions of Terms and Typical Units of Measure). Selection of COPs is chosen by the user comprise:

$\Lambda_1 = B_P$ Square root of the pseudo buckling used in Eq. (PFP); $cm^{-1}$ $\Lambda_2 = x_{RVU}$ Steam quality leaving the RV, used for initial benchmarking; mass fraction.

$\Lambda_3 = x_{TH}$ Steam quality entering the TC's throttle valve; mass fraction.

$\Lambda_4 = \bar{\upsilon}_{LRV}$ Antineutrino & neutrino losses via Eqs. (2ND) & (PFP); MeV/Fission.

$\Lambda_5 = \bar{\upsilon}_{TNU}$ Antineutrino & neutrino losses via Eq. (9B), or Alt. Embod. E; MeV/Fission.

$\Lambda_6 = \bar{\upsilon}_{LRV}$ Defined by Eq. (5), as a COP see Eqs. (2ND) & (PFP); $^1n_0$ $cm^{-2}$ $sec^{-1}$ MeV/Fission.

$\Lambda_7 = \Delta h_{RVX}$ Core $\Delta h$, used for debug, confirming $Q_{Loss-RV}$ and fine-tuning; Btu/lbm.

$\Lambda_8 = \varepsilon_{Cond}$ Condenser Second Law effectiveness, see Eq. (1A); unitless.

$\Lambda_9 = Q_{Loss-RV}$ RV energy loss to environment, used for routine fine-tuning; Btu/hr.

$\Lambda_{10} = Q_{Loss-SG}$ SG vessel energy loss to environment, used for routine fine-tuning; Btu/hr.

$\Lambda_{11} = Q_{Loss-TC}$ Non-Condenser misc. TC energy loss, used for routine fine-tuning; Btu/hr.

$\Lambda_{12} = (\eta_{Test}/\eta_{Design})_{HP}$ Isentropic efficiency degradation of the HP turbine wheel; unitless.

$\Lambda_{13} = (\eta_{Test}/\eta_{Design})_{LP}$ Isentropic efficiency degradation of the LP turbine wheel; unitless.

$\Lambda_{14}[=]$ Any user selected COP, limited by COP's definition and teachings herein.

The above list defines a unique group of COPs consisting of $\Lambda_1$ through $\Lambda_{14}$; wherein said group any one or more $\Lambda_{nn}$ may be selected for use in the Verification Procedure. Obviously any $\Lambda_{nn}$ will affect its specific equation. However, all declared unknowns will also be affected by any $\Lambda_{nn}$, as dutifully apportioned given matrix solution. By design, all equations employ only loss terms and system constants in the augmented matrix. Selecting a set of COPs must depend on common knowledge of a specific nuclear power plant and associated relationships between neutronics, physical equipment and instrumentation viability.

In general a Verification Procedure corrects SEP differences ($\Delta\lambda_{mm}$) by varying assigned COPs. Adjustments are made using one of two methods: a) apply judgement based on a nuclear engineer's experience with a particular signal (e.g., plot signals vs. time, compare multiple signal readings, talk to plant operators, etc.) and then change the COP manually; or b) use the Preferred Embodiment which exercises multidimensional minimization analysis based on Simulated Annealing resulting in computed correction factors applied to individual COPs.

COP correction factors are determined through successive Calculational Iterations comprising multidimensional minimization and matrix analyses. Multidimensional minimization analysis minimizes an Objective Function in which a set of SEP differences are minimized by varying a set of COPs. An SEP difference is defined by $\Delta\lambda_{mm}$. In the Preferred Enablement only $\Delta\lambda_{GEN}$ should be used until the system is well understood. $P_{GEN}$ is employed in Eqs. (2ND), (1ST) & (3RD); $P_{GEN-REF}$ is defined by Eq. (14A). The set of $\Delta\lambda_{mm}$ follows. Use of $\Delta\lambda_{FWF}$ and/or $\Delta\lambda_{RVF}$ comes with caution; their reference signals must have an established consistency over the load range of interest, but is rarely achieved.

$$\Delta\lambda_{GEN} \equiv |P_{GEN} - P_{GEN-REF}|/P_{GEN-REF} \quad \text{For all applications, } P_{GEN-REF} \text{ per Eq. (14A)}. \tag{61}$$

$$\Delta\lambda_{EQ82} \equiv |P_{Avail} - P_{Therm}|/P_{GEN-REF} \quad \text{For all applications, see Eqs.(14A) \& (82)}. \tag{62}$$

$$\Delta\lambda_{FLX} \equiv |\Phi_{TH} - C_{FLX}\Phi_{FC}|/(C_{FLX}\Phi_{FC}) \quad C_{FLX} \text{ being based on startup } FC \text{ testing}. \tag{63}$$

$$\Delta\lambda_{RVU} \equiv |h_{RVU} - h_{RVU-REF}|/h_{RVU-REF} \quad \text{Affects all, use with caution, or for debug}. \tag{64}$$

$$\Delta\lambda_{FCS} \equiv |\Sigma_F - \Sigma_{F-REF}|/\Sigma_{F-REF} \quad \text{On-line } NFM \text{ based, per Eqs.(42) \& (43)}. \tag{65}$$

$$\Delta\lambda_{FWF} \equiv |m_{FW} - C_{FWF}m_{FW-REF}|/(C_{FWF}m_{FW-REF}) \quad \text{For debug, or on-line with great confidence}. \tag{66}$$

$$\Delta\lambda_{RVF} \equiv |m_{RV} - C_{RVF}m_{RV-REF}|/(C_{RVF}m_{RV-REF}) \quad \text{For debug, or on-line with great confidence}. \tag{67}$$

$$\Delta\lambda_{MISC}[\ ] = ]\ \text{Any user selected } SEP \text{ difference, limited by } SEP's \text{ definition \& teachings herein}.$$

The above list defines a unique group of SEP differences consisting of: $\Delta\lambda_{GEN}$, $\Delta\lambda_{EQ82}$, $\Delta\lambda_{FLX}$, $\Delta\lambda_{RVU}$, $\Delta\lambda_{FCS}$, $\Delta\lambda_{FWF}$, $\Delta\lambda_{RVF}$ and $\Delta\lambda_{MISC}$; wherein said group any one or more $\Delta\lambda_{mm}$ may be selected for use in a Verification Procedure. Reference SEP signals must have unquestioned consistency and reliability.

The NCV Method uses multidimensional minimization analysis which drives an Objective Function, $F(\vec{x})$, to a minimum value by driving chosen $\Delta\lambda_{mm} \to 0.0$. Although COP values ($\Lambda_{nn}$) do not appear in the Objective Function— by design—they directly impact SEPs by exercising the calorimetrics Model. After iterations between the matrix solution and minimization analysis, the preferred SEP of useful power output, leaning to electrical generation, is driven towards its Reference SEP and thus the computed parameters, or combinations, of $\Phi_{TH}$, $Q_{REJ}$, $m_{RV}$ and $P_{GEN}$ are: a) internally consistent, b) form nexus between neutronics and calorimetrics, and c) results are verifiable given $\Delta\lambda_{mm} \approx 0.0$.

The preferred multidimensional minimization analysis is based on the Simulated Annealing method by Goffe, et al. Goffe's Simulated Annealing is a global optimization method, driven by Monte Carlo trials, as it distinguishes between different local optima. Starting from an initial point, the algorithm takes a step and the Objective Function is evaluated, including matrix solution of the chosen equation set. When minimizing the Objective Function, any downhill step is accepted and the process repeats from this new point. An uphill step may be accepted. Thus, optimization can escape from local optima. This uphill decision is made by the Metropolis criteria. As the optimization process proceeds, the length of the steps decline and the algorithm closes in on a global optimum. Since the algorithm makes very few assumptions regarding the Objective Function, it is quite robust with respect to possible non-linearity behavior of COP interactions. The reference is: W. L. Goffe, G. D. Ferrier and J. Rogers, "Global Optimization of Statistical Functions with Simulated Annealing", *Journal of Econometrics*, Vol. 60, Issue 1-2, pp. 65-100, January/February 1994.

The following is the Objective Function found to work best with Simulated Annealing:

$$F(\vec{x}) = \sum_{kk \in K} \{K - [J_0(\Delta\lambda_{GEN})]^{MC_{\Lambda nn}} - \tag{68}$$

$$[J_0(\Delta\lambda_{EQ82})]^{MC_{\Lambda nn}} - [J_0(\Delta\lambda_{FLX})]^{MC_{\Lambda nn}} - [J_0(\Delta\lambda_{RVU})]^{MC_{\Lambda nn}} -$$

$$[J_0(\Delta\lambda_{FCS})]^{MC_{\Lambda nn}} - [J_0(\Delta\lambda_{FWF})]^{MC_{\Lambda nn}} -$$

$$[J_0(\Delta\lambda_{RVF})]^{MC_{\Lambda nn}} - [J_0(\Delta\lambda_{MISC})]^{MC_{\Lambda nn}}\}_{kk}$$

As used in Eq. (68), the Bessel Function of the First Kind, Order Zero ($J_0$) has shown to have intrinsic advantage for rapid convergence in conjunction with the Annealing's global optimum procedures. Also, $MC_{\Lambda nn}$ is termed a Dilution Factor, here assigned individually by COPs resulting in greater, or less, sensitivity. Dilution Factors are established during pre-commissioning of the NCV Method, being adjusted from unity. In Eq. (68) the symbol $\Sigma_{kk \in K}$ indicates a summation on the index kk, where kk variables are contained in the set K defined as the elements of. For example, assume the user has chosen the following for a PWR:

$\Lambda_2$ is to be optimized to minimize the error in $\Delta\lambda_{GEN}$ & $\Delta\lambda_{FLX}$, $K_1=2$;

$\Lambda_4$ is to be optimized to minimize the error in $\Delta\lambda_{GEN}$, $K_2=1$;

$\Lambda_{11}$ is to be optimized to minimize the error in $\Delta\lambda_{EQ82}$, $K_3=1$; and $\Lambda_{14}$ is user defined as SG blow-down mass flow, to minimize the error in $\Delta\lambda_{GEN}$, $K_4=1$.

Therefore: $=(\Lambda_2, \Lambda_4, \lambda_{14}, \Lambda_{11})$, $K=\{\Lambda_2, \Lambda_4, \Lambda_{14}, \Lambda_{11}\}$; $\vec{x}=(x_1, x_2, x_3, x_4)$; $x_1=\Lambda_2$; $x_2=\Lambda_4$; $x_3=\Lambda_{14}$; $x_4=\Lambda_{11}$; and as found from pre-commissioning: $MC_{\Lambda 2}=MC_{\Lambda 4}=1.20$ & $MC_{\Lambda 14}=MC_{\Lambda 11}=0.90$. Thus:

$$F(\vec{x}) = \tag{69}$$

$$\{2 - [J_0(\Delta\lambda_{GEN})]^{MC_{\Lambda 2}} - [J_0(\Delta\lambda_{FLX})]^{MC_{\Lambda 2}}\} + \{1 - [J_0(\Delta\lambda_{GEN})]^{MC_{\Lambda 4}}\} +$$

$$\{1 - [J_0(\Delta\lambda_{GEN})]^{MC_{\Lambda 14}}\} + \{1 - [J_0(\Delta\lambda_{EQ82})]^{MC_{\Lambda 11}}\}$$

Upon optimization, correction factors, $C_{nn}$, are determined as: $C_{nn}=\Lambda_{nn-kk}/\Lambda_{nn-0}$, for the $kk^{th}$ iteration. The only output from the Verification Procedure are these corrections factors applied to the initial $\Lambda_{nn-0}$. However, given verification where $\Delta\lambda_{mm} \approx 0.0$, the entire solution becomes verified. Thus, after use of the Verification Procedure, parameters are then "verified parameters"; for example: verified RV coolant mass flow; verified Core Thermal Power; verified Thermal Performance Parameters including verified $G_{IN}$, $P_{GEN}$, $\Sigma I_k$, $FCI_{Power}$, $FCI_{Loss-k}$, etc.; and the like.

INDUSTRIAL APPLICABILITY

The above DETAILED DESCRIPTION describes how one skilled can embody its teachings when creating a viable NCV Method application. This section describes its industrial applicability. That is, how to physically enable the NCV Method at a nuclear power plant: how to configure its computer (the Calculational Engine); how to process plant data; how to configure its equations for pre-commissioning and, separately, for routine operations; and, most importantly, presents specific recommendations as to what the plant operator needs to monitor (i.e., to absorb NCV output information and to act upon that information). Such enablement is presented in four sections: Calculational Engine and Its Data Processing, Clarity of Terms, a summary Final Embodiments and Enablements, and Detailed Description of the Drawings all teaching a typical NCV installation.

Calculational Engine and its Data Processing

To correctly enable this invention the user must be mindful of three important aspects of NSSS on-line monitoring: a) how data is collected; b) how it is presented for analyses, that is reducing and averaging techniques employed; and c) the nature of the monitoring computer. All power plants process instrumentation signals using a variety of signal reduction devices; i.e., FIG. 1 & FIG. 2 Item 400. These devices depend on: the nature of the signal (analog, digital, pneumatic, on/off switches, potentiometers, etc.); the physical location of instruments; and the physical location of the signal reducing mechanisms (e.g., cable runs, local environment, security, etc.). Once processed by the reduction devices, the signal becomes data which carries a time-stamp (i.e., the time the signal was acquired). At issue is how to synchronize such data, originating from different sources, each source possibly having a different time-stamp. If data is not synchronized, the user will violate continuity. The preferred solution lies with '358, yielding a set of data with the same time stamp.

The second problem is how the set of synchronized data is reduced and averaged before it is presented for various analyses. Data reduction comprises units conversion, gauge pressure and head corrections, temperature conversions, and the like. The NCV Method, through its NUKE-EFF program provides options of using running averages of data over 5, 15, 20, 25 and 30 minutes. The data acquisition process, using the set of synchronized data, forms 1 minute averages of each data point, relying on, say, 1 signal input each 10 seconds (or faster for certain RV data), averaging this data over a minute, and then forming a running average (over, say, 15 minutes). The choice of running averages is left to the plant engineer knowing the fluid transport times through his/her NSSS. Typically a unit of fluid passes from the TC's throttle valve to its final feedwater connection in 10 to 20 minutes (the longest transport times are encountered in the Condenser hot well and other fluid storage vessels). From the final feedwater connection through the RV, and then back to the throttle valve requires 4 to 8 seconds. If the operator chooses a shorter time for averaging than the fluid transport time, he/she risks aliasing data when assuming steady state.

A PFP Model option, if run, processes reactor transient computations in parallel with routine monitoring. This is done through Alternative Embodiments, when used, involving no data averaging (or running averages over just seconds); thus a monitoring cycle every 1 to 3 seconds. The third aspect of power plant on-line monitoring is the nature and function of the computer (FIG. 1 & FIG. 2, Item 420) having a processing and memory means to implement the NCV Method. The Preferred Embodiment is to commit a dedicated, single-use computer to NCV tasks. This computer is termed a "Calculational Engine". The Calculational Engine is safeguarded from foreign mischief. Its inputs and outputs, by design, are under the control of plant engineers (i.e., in FIG. 1 & FIG. 2, Items 410 & 430). Also, by design, the Calculational Engine will not be exposed to any non-NCV Method computer program, or to internet communication, or to any non-plant information.

Clarity of Terms

To summarize, the NCV Method comprises three parts: a Neutronics Model [N]; a calorimetrics Model [C] and a Verification Procedure [V]. The "Neutronics Model" is herein defined as comprising a set of Off-Line Operating Parameters including static NFM data, equipment design data and the applicable Regulatory Limit. Meaning of Terms formally defines Off-Line Operating Parameters, and NFM static and dynamic details.

The expression "Calorimetrics Model" is herein defined as meaning the teachings and support analytics used to develop a plurality of First Law conservation of energy flows and Second Law exergy analyses. The NCV Method's Preferred Embodiment consists of two First Law conservations and two Second Law exergy analyses, as taught through development of governing Eqs. (2ND), (1ST), (3RD) & (PFP). These same equations lead to Alternative Embodiments A through H, applicable for either steady state or transient analyses.

The expression "Verification Procedure" is herein defined as generically meaning that results from a thermal system's analytical description, satisfy First Law conservation of energy flows and/or Second Law exergy analysis. The Verification Procedure's Preferred Embodiment requires a set of plant SEPs with a set of corresponding Reference SEPs, resulting in a set of paired SEPs ($\lambda\lambda_{mm}$); and a method of minimizing the $\Delta\lambda_{mm}$ set. Said minimization is achieved by varying a set of COPs ($\Lambda_{nn}$) such that $\Delta\lambda_{mm} \to 0.0$. The set of $\Delta\lambda_{mm}$ parameters consists of Eqs. (61) through (67) and $\Delta\lambda_{MISC}$. The Preferred Embodiment of such minimization employs multidimensional minimization analysis based on Simulated Annealing, summarized via Eq. (68), its Objective Function, and associated discussion.

The expressions "Nuclear Steam Supply System" (NSSS) and "nuclear power plant" mean the same and are herein defined as a thermal system comprising a Reactor Vessel and a Turbine Cycle. Generically, "Reactor Vessel" is herein defined as containing a fissioning material (e.g., $^{235}U$) and, given the inherent presence of an average neutron flux, producing a nuclear power. This power is transferred to a Turbine Cycle via a Reactor Vessel coolant mass flow. Generically, "Turbine Cycle" is herein defined as using nuclear power to produce a useful power output (e.g., the TC's electrical generation), commensurate with a Condenser heat rejection.

In detail, the expression "Turbine Cycle" (TC) is herein defined as both the physical and thermodynamic boundary of a Regenerative Rankine Cycle. A typical Turbine Cycle comprises all equipment bearing working fluid including, typically, a turbine-generator set producing electric power, a Condenser, pumps, MSR and Feedwater heaters. The "Condensate System" is herein defined as the low pressure portion of the TC containing all equipment and subsystems downstream from the Condenser outlet to the Deaerator bearing condensed working fluid; this, typically, before drains and miscellaneous flows are added to achieve a final Feedwater flow. Further details are provided in FIG. 1 & FIG. 2.

The word "instigating" is herein defined as: "to cause a deliberate action to occur, said action implemented using voice commands, a physical movement (e.g., turning a valve, pressing a control actuator), written instructions to subordinates and/or using a computer system."

The "set of Thermal Performance Parameters" (i.e., actionable indicators) is herein defined as comprising: First Law efficiencies, Eqs. (35) & (36); Second Law effectivenesses, Eq. (57); Core Thermal Power, defined via Eq. (3D); the total exergy flow supplied to the nuclear power plant (GI), used throughout, defined via Eq. (51A); the useful power output ($P_{GEN}$) used throughout, a declared unknown; the set of system irreversible losses, $\Sigma I_k$, Eqs. (53) detailed via Eq. (1), and as used in Eqs. (2ND) & (PFP); Fission Consumption Indices, see its section, defined in Eqs. (51A) thru (56); any combination of resolved unknowns ($\Phi_{TH}$, $P_{GEN}$, $Q_{REJ}$ and $m_{RV}$); individual First & Second Law loss terms computed for Eqs. (2ND), (1ST), (3RD) & (PFP), for example $Q_{Loss-SG}$, $Q_{Loss-TC}$ in Eq. (1ST); the converged SEPs $\Delta\lambda_{mm}$ (especially $\Delta\lambda_{GEN}$ & $\Delta\lambda_{EQ82}$) and resultant COPS $\Lambda_{nn}$; and, a set of temporal trends of these Thermal Performance Parameters as monitored by the operator.

Within the expression a "Calorimetrics Model of the nuclear power plant based only on a plurality of thermodynamic formulations" the words "based only on a plurality of thermodynamic formulations" is defined herein as meaning the reasonable number of thermodynamic formulations, taken from the governing equations, which are required to solve for the number of declared (specified) unknown parameters (e.g., one of common skill would use four governing equations to solve for four specified unknowns; three governing equations for three unknowns, and two governing equations for two unknowns). Further, said set of equations associated with a given Embodiment are mathematically independent (their Rank being 4, 3 or 2). However said words are also meant to restrict the use of any non-thermodynamic application (e.g, statistic and/or scholastic technique) which would replace a governing equation. Statistic and/or scholastic techniques could well add to a set of governing equations, but not replace. Further, these words also imply that the number of thermodynamic formulations employed is governed by the number of unknowns within the set of declared unknowns. In this context, "plurality" does not infer the number of unknowns to be solved, but rather taken from the group comprising the four governing equations. For example, if solving simultaneously for declared unknown parameters consisting of three, the solution matrix would process any three of the governing equations (each chosen set having a Rank of three); said resulting solution could be augmented by statistic and/or scholastic techniques.

Throughout this disclosure, the expressions "First Law", "First Law conservation" and like expressions mean the same; that is, an application of First Law of thermodynamic principles descriptive of the conservation of energy flows within a thermal system. An example of First Law is Eq. (11) in which the left-hand side presents energy flows added to the system; the right, a statement of their conservation (i.e., producing a useful power output and energy flow losses to the environment). Note that Neutron Transport Theory basically is conserving a neutron population (its total mass), and not energy flows per se, and thus has no applicability other than computing an independent $\Phi_{TH}$ (or related Alternative Embodiment F terms), which may then be used as a known input to all equations herein. Throughout this disclosure, the expressions "Second Law", "Second Law exergy analysis" and like expressions mean the same; that is, an application of Second Law of thermodynamic principles descriptive of an exergy analysis. Exergy analysis describes the destruction of a total exergy flow supplied to a thermal system ($G_{IN}$), and its concomitant creation of useful power output ($P_{GEN}$) and the set of system irreversible losses ($\Sigma I_k$). An example of Second Law is Eq. (2) in which the left-hand side presents the total exergy flow supplied to a nuclear system (a function of Temporal Fission Density) and shaft power supplied; the right, a statement of useful power output $P_{GEN}$ and the set of system irreversible losses, $\Sigma I_k$, computed based on Eqs. (1) & (53). The words "thermodynamic laws" is herein defined as meaning the First Law and/or the Second Law.

In the context of describing this invention, the words "acquiring" and "using" mean the same. The word "acquiring" is sometimes used for readability. They both mean: to take, hold, deploy or install as a means of accomplishing something, achieving something, or acquiring the benefit from something; in this context, the "something" is the NCV Method or its equivalence. Also, these words do not imply ownership of anything, or to any degree, concerning the NCV Method.

As used herein, the root words "obtain", "determine" and "establish", and their related derivatives (e.g., "obtaining", "determining" and "establishing") are all defined as taking a certain action. The certain action encompasses: to directly measure, to calculate by hand, to calculate using a programmed computer, to authorize calculations using a programmed computer at a facility controlled by the authorizer, to make an assumption, to make an estimate, and/or to gather a database.

As used herein, the words "monitoring" or "monitored" are meant to encompass both on-line monitoring (i.e., processing system data in essentially real time) and off-line monitoring (i.e., computations involving static data). A "Calculational Iteration" or "monitoring cycle" is meant to be one execution of the processes described in FIG. 5 comprising: acquiring data, exercising a mathematical model including matrix solution, minimization analysis, etc.

As used herein, the words "Secondary Containment" refer to a vessel used to reduce radiation release to the environment. Inside a PWR's Secondary Containment comprises the Reactor Vessel (RV), the Steam Generator(s) (SG), coolant pump(s), the pressurizer and miscellaneous safety equipment. Inside a BWR's Secondary Containment comprises the RV, coolant pump(s), and miscellaneous safety equipment. The Secondary Containment defines the physical boundary for all major nuclear equipment placed inside. Equipment outside the Secondary Containment, including Turbine Cycle equipment is considered "Balance-of-Plant" (BOP) equipment. Within the RV its equipment comprises the nuclear core (or "core"), control rods and supporting structures and reactor safety systems. The typical nuclear core comprises hundreds of fuel assemblies. Each fuel assembly comprises: fuel pins positioned axially by a number of "grid spacers"; flow nozzles are positioned at the top and bottom, the bottom supporting fuel pin's weight; hollow tubes and/or spaces designed for control rod insertion; and axial structures which mechanically connect the flow nozzles. PWR & BWR typical fuel pins comprise enriched uranium, as $UO_2$, placed in a metal tube (termed a fuel pin's "clad"), see FIG. 3.

As used herein, the word "indicated" when used in the context of data originating from the thermal system, is herein defined as the system's actual and uncorrected signals from a physical process (e.g., pressure, temperature or quality, mass flow, volumetric flow, density, and the like) whose accuracy or inaccuracy is not assumed. As examples, a system's "indicated Reactor Vessel coolant mass flow", or its "indicated Turbine Cycle feedwater mass flow" denotes system measurements, the accuracy of which is unknown (they are "as-is", with no judgement applied). Such indicated measurements are said to be either correctable or not. It may be that the corresponding computed value tracks the indicated value over time. For example, for the case of an indicated RV coolant mass flow, when used as a SEP, it may be shown that the NCV computed mass flow tracks the indicated flow.

As used herein, the words "programmed computer" or "operating the programmed computer" or "using a computer" are defined as an action encompassing either to directly operate a programmed computer, to cause the operation of a programmed computer, or to authorize the operation of a programmed computer at a facility controlled by the authorizer.

The meaning "quantifying" in the context of "quantifying the operation of a nuclear power plant" is herein defined in the usual dictionary sense, meaning "to determine or express the quantity of . . . "; for example, at a minimum, what is being "quantified" is a "complete thermodynamic understanding of the nuclear power plant" and/or "improving operations of the nuclear power plant" and/or "the ability to understand the nuclear power plant with improved confidence given use of verified results". The word "understanding", in context of the NCV Method, is herein defined as having gained sufficient comprehension of a nuclear power plant that instigated actions taken by the operator result in improved system control and/or improved safety. The word "temporal" means having time dependency.

Teachings leading to Eqs. (26) & (28), and then Eq. (PFP), present a new and unique thermodynamic description combining neutronic and coolant exergy flows and, given partial axial integration necessitated to achieve asymmetry, lead to an additional equation allowing useful power output ($P_{GEN}$) to be solved. Eqs. (9B) & (1ST) demonstrate how First Law conservation and Second Law exergy analyses can be coupled without compromising the computation of an absolute flux.

A common practice with reactor design is to separate gamma & beta heating of the reactor coolant from exergy liberated within the fuel pin (principally, exergy associated with dispersion of fission product kinetic energy within the fuel). The fraction of such heating relative to TABLE 3, column F13, is typically taken as 2.6%. One reason for such separation is to compute the fuel pin's centerline temperature with additional accuracy (producing a lower temperature). This is not correct. Centerline temperature should be computed based on Eq. (26) or (28). When evaluating losses it is important to understand that kinetic energies of fission fragments travel only 6 to 10 microns in $UO_2$ fuel. Beta & gamma radiation rarely escape coolant channels, thus losses from the RV annulus are due principally from inadequate vessel insulation. Given the objectives of the NCV Method, internal pin temperatures are not an immediate objective. However, if gamma & beta heating affects the RV outer annulus, this is completely accounted for via: $[g_{RCU}(T_{Ref})-g_{RCI}(T_{Ref})]$. The PFP Model is ideal for fuel pin studies, after system solution, given the average neutron flux (thus the Temporal Fission Density) and coolant flow would have been resolved and fully verified.

Although the present invention has been described in considerable detail with regard to certain Preferred Embodiments thereof, other embodiments within the scope and spirit of the present invention are possible without departing from the general industrial applicability of the invention. For example, general description of this invention assume that a nuclear reactor's coolant is light water; however, procedures of this invention may be applied to any type of coolant. Examples of other fluids are: molten chloride, molten salt, organic fluids, liquid metals, gas, etc. The descriptions of this invention assume that the nuclear fuel is enriched uranium, formed as $UO_2$; however, the general procedures of this invention apply to any fissioning material encapsulated in any configuration.

Final Embodiments and Enablements

Enablement of this invention is accomplished through a) implementation of the Calculational Engine and data processing, described above; b) manipulation of its four governing equations solving for a set declared unknowns; and c) verification of the system solution. These four equations are the Preferred Embodiment. The fundamentals of these equations, based solely on thermodynamic laws, is well taught. However, it becomes obvious that Alternative Embodiments, flowing directly from the Preferred, with no changes in fundamentals, offer viable steady state and transient tools for improved NSSS safety. Alternative Embodiments do not limit the invention. Indeed, all described Embodiments establish guideposts, structures, for one skilled in the art to install, to implement, to manipulate this invention and to use this invention in every way and to every extent possible. The following paragraphs present: Preferred and Alternative Embodiment's best mode practices; pre- and post-commissioning techniques; a set of Thermal Performance Parameters; and finally a general discussion of the NCV Method.

Preferred Embodiment equations are summarized below, but stylized for readability as Eqs. (XXX'). The constants $A_{iii}$, $B_{iii}$, etc. represent coefficients to the declared four unknowns. Nomenclature is referenced to Eq. (2ND), whose coefficients are designated $A_{iii}$; Eq. (1ST) as $B_{iii}$; Eq. (3RD) as $C_{iii}$; and Eq. (PEP) as $D_{iii}$. The augmented matrix comprises loss terms, the constants $L_{jjj}$; noting $L_D$=0.0. For example: $A_1=C_E V_{Fuel}\Sigma_F$; $A_2=-1.0$; $A_3=-(1.0-T_{Ref}/T_{CDS})(1-\varepsilon_{cond})$; refer to Eq. (2ND) for $A_4$; etc. Important terms: $\psi_{LRV}$, $\Xi$ and MeV/Fission values are presented separately for clarity. Unique to the NCV Method, by design, $m_{RV}$ coefficients and $L_{jjj}$ constants all carry unique values (especially useful for Alterative Embodiments). Flexibility is afforded throughout: at user option COPs might include the combination of $\Lambda_3=x_{TH}$ and $\Lambda_{11}=Q_{Loss-TC}$; $[\bar{v}_{REC}(t)+\bar{v}_{TNU}(t)]$ could be replaced with $\bar{v}_{TOT}$; purely thermal COPs include $\Lambda_2$, $\Lambda_3$ & $\Lambda_7$ thru $\Lambda_{13}$; COP $\Lambda_{14}$ has universal application; etc.

$$A_1[\bar{v}_{REC}(t) + \bar{v}_{TNU}(t)]\Phi_{TH} + A_2 P_{GEN} + A_3 Q_{REJ} + A_4 m_{RV} = \quad (2ND')$$
$$L_A + A_1 \psi_{LRV}$$

$$A_1 \bar{v}_{REC}(t) \Xi \Phi_{TH} + A_2 P_{GEN} + B_3 Q_{REJ} + B_4 m_{RV} = L_B \quad (1ST')$$

$$A_2 P_{GEN} + B_3 Q_{REJ} + C_4 m_{RV} = L_C \quad (3RD')$$

$$(2D_1/B_P)[\bar{v}_{REC}(t) + \bar{v}_{TNU}(t)]\Phi_{TH} + D_4 m_{RV} = (2D_1/B_P)\psi_{LRV} \quad (PFP')$$

Alternative Embodiments A through E are stylized equations Eqs. (XXX"), following Eqs. (XXX'). In these Embodiments, $P_{GEN}$ is supplied as a known constant based on Eq. (14B). Thus any three of the four Eq. (XXX") are solved for three unknowns $\Phi_{TH}$, $Q_{REJ}$ and $m_{RV}$, at the expense of $\Delta\lambda_{GEN}$.

$$A_1[\bar{v}_{REC}(t) + \bar{v}_{TNU}(t)]\Phi_{TH} + A_3 Q_{REJ} + A_4 m_{RV} = \quad (2ND'')$$
$$L_A - A_2 P_{GEN} + A_1 \psi_{LRV}$$

$$A_1 \bar{v}_{REC}(t) \Xi \Phi_{TH} + B_3 Q_{REJ} + B_4 m_{RV} = L_B - A_2 P_{GEN} \quad (1ST'') \quad$$

$$B_3 Q_{REJ} + C_4 m_{RV} = L_C - A_2 P_{GEN} \quad (3RD'')$$

$$(2D_1/B_P)[\bar{v}_{REC}(t) + \bar{v}_{TNU}(t)]\Phi_{TH} + D_4 m_{RV} = (2D_1/B_P)\psi_{LRV} \quad (PFP'')$$

Alternative F teaches to replace $\Phi_{TH}$ with a Neutronic Flux Term which typically becomes the declared unknown. This type of substitution is applicable for all Preferred and Alternative Embodiments; no change in their solution methodologies is required. For example, if $\Phi_{TH}$ is replaced by $[\Phi_{TH}\Sigma_F]$ then $A_1$ is replaced with $A_1'$ and $D_1$ with $D_1'$.

$$A_1' = C_E V_{Fuel} \quad (71)$$

$$D_1' = C_E C_{MAX-CL} \pi r_0^2 \sum_{m1=1}^{7} \left[ \frac{E_{m1}[\Omega(y)]^{m1}}{m1} \right]_{y1}^{\bar{y}} \quad (72)$$

Alternative Embodiments G and H are based on stylized equations Eqs. (XXX'''), following Eqs. (XXX'). These Embodiments assume that both neutron flux ($\Phi_{TH}$), or its substitution as a Neutronic Flux Term, and useful power output ($P_{GEN}$) are supplied as known constants. $\Phi_{TH}$ being determined by: a) user estimate based on experience or fission chamber $\Phi_{FC}$; b) relying on vendor data; and/or c) using a computed value, for example by engaging Neutron Transport Theory. $P_{GEN}$ is based on Eq. (14B). Alternative Embodiment G reduces appropriate combinations of the four Eqs. (XXX''') to two viable equations with two unknowns $Q_{REJ}$ and $m_{RV}$. Examples include: Eqs. (2ND''') and (PFP'''); or Eq. (2ND''') less Eq. (1ST''') and (3RD'''). Alternative Embodiment H reduces appropriate combinations of the four Eqs. (XXX''') to a single equation and unknown, having single variate or bivariate functionality. As examples: $m_{RV}$ may be trended with a single variate functionality $[m_{RV}=f(\Phi_{TH})]$ as found in: Eq. (PFP'''); or Eq. (1ST''') less Eq. (3RD'''). Bivariate functionality $[m_{RV}=f(\Phi_{TH}, P_{GEN})]$ as found in: Eqs. (2ND'''); or Eq. (1ST'''); or combinations. Note that Eq. (3RD'''), cannot be used as a stand-alone equation for any Embodiment: a) it is very old art; and b) is independent of the Second Law.

It is obvious that Alternative Embodiments G and H offer little for the complete thermodynamic understanding of the nuclear power plant. However, viability is afforded if a complete Preferred Embodiment produces a verified $\Phi_{TH}$, optimizing on $\Delta\lambda_{GEN}$, say, every 15 minutes. The verified $\Phi_{TH}$ and $P_{GEN}$ are then used to normalize real time fission chamber $\Phi_{FC}$ and $P_{UT}$ signals (producing $\Phi_{TH}$ & $P_{GEN}$ in real time); thus allowing Embodiments G and H to be computed every second.

$$A_3 Q_{REJ} + A_4 m_{RV} = L_A - A_1 \bar{v}_{REC}(t)\Phi_{TH} - A_2 P_{GEN} \quad (2ND''')$$

$$B_3 Q_{REJ} + B_4 m_{RV} = L_B - A_1 \bar{v}_{REC}(t)\Xi\Phi_{TH} - A_2 P_{GEN} \quad (1ST''')$$

$$B_3 Q_{REJ} + C_4 m_{RV} = L_C - A_2 P_{GEN} \quad (3RD''')$$

$$D_4 m_{RV} = -(2D_1/B_P)\bar{v}_{REC}(t)\Phi_{TH} \quad (PFP''')$$

The following is best mode practice for pre-commissioning, as with any large computer system, one is advised to step through the simplest of exercises, ending with the best mode after commissioning, unique to a specific NSSS. The following Steps are suggested for pre-commissioning:

Ia) Using Alternative Embodiment B, Eqs. (2ND''), (3RD'') & (PFP''): elect no active COPs setting all $\Lambda_{nn}$ to constants; set minor losses to zero; and assume $P_{GEN}$ is a known input. Use NSSS design data for intensive properties and mass flows. Note that specific enthalpies, specific entropies and $T_{Ref}$ must be generated to produce specific exergies. Equipment vendors typically assume zero vessel losses; and errors in TC Thermal Kits are legendary. Neutronics data should represent a virgin core using unirradiated fissile material. With such data, set-up a spreadsheet program to demonstrate the simplest simulation. This will greatly ease preparation of TC irreversible losses. Process the computed Eq. (XXX'') coefficients through an acquired 3×3 matrix solution. Compare the computed $Q_{REJ}$ and $m_{RV}$ to vendor data. Vendor methods used for their reported $\Phi_{TH}$ must always be questioned.

Ib) After corrections, given $Q_{REJ}$ and $m_{RV}$ agreement with vendor data, transfer all inputs to the Calculational Engine's NCV software. Confirm the previous findings. This process forces the user to understand details of inputs, and to check the NCV software for programming errors. Throughout pre-commissioning, a simple method for debug is to temporally use COP $\Lambda_9$, $\Lambda_{10}$ and $\Lambda_{11}$ to optimize SEP $\Delta\lambda_{EQ82}$ in order to discover which subsystem, RV, SG or TC, is the most sensitive for correcting. Basically one is replacing an unknown discrepancy with a theoretical subsystem loss.

Ic) Next add $P_{GEN}$ as an unknown using the Preferred Embodiment's four equations Eq. (XXX') Once operational, begin to add losses to the system, noting that the sum of losses plus useful power output must equal $G_{IN}$ (the spreadsheet from Step Ia will assist). Also one must confirm that all intensive properties and related parameters (pressures, pressure heads, ambient pressure, temperatures and/or quality) are processed correctly by the Calculational Engine; including review of instrumentation tag-lists.

II) Use the Step I results, but now employ the set of four Eq. (XXX') and the Verification Procedure by optimizing $\Delta\lambda_{GEN}$ and $\Delta\lambda_{EQ82}$ using COP $\Lambda_8$ and others. The important SEP Power Trip Limit, applied individually to $\Delta\lambda_{GEN}$ and $\Delta\lambda_{EQ82}$, must be established using sensitivity studies. Other COPs to be used for initial debug, especially if the turbines are aged, are $\Lambda_{12}$ and $\Lambda_{13}$ per Eq. (1E). Adjust the $MC_{\Lambda nn}$ parameters to improve computer execution times.

III) Use the equations from Step II, but freeze the selected $\Lambda_{nn}$ to the values found; add COP $\Lambda_6$, again optimizing on SEP $\Delta\lambda_{GEN}$ and/or $\Delta\lambda_{EQ82}$ for the purpose of adjusting $MC_{\Lambda 6}$ to improve computer execution times. If $v_{REC}$ is questioned, uncertainties likely are associated with Non-Fission Capture (TABLE 3, Col. F6).

IV) Repeat the above process, proceeding with more complexity by adding thermal COPs to establish additional sensitivities and benchmarks. It is also important to add a mix of nuclear irreversible terms; e.g., using COP $\Lambda_4$ & $\Lambda_5$ versus constants. Optimizing on Operating Parameters other than $P_{GEN}$ must proceed with great caution, as taught. If the plant operator has established a long history of consistently monitoring feedwater flow over the load range, and it matches the computed (perhaps with a constant off-set) then consideration of using $\Delta\lambda_{FWF}$ can be made; this will speed convergence. NCV Method allows for corrections to the indicated TC and RV flows.

V) An important final pre-commissioning step is to evaluate all system irreversible loss terms; i.e., conventional, radiation, pump and turbine, etc. In addition to these losses, a design review of all resolved COP $\Lambda_{nn}$ parameters is required, especially the nuclear. Questions must arise as to the appropriateness of $\overline{\upsilon}_{PNU}$ and $\overline{\upsilon}_{DNU}$ values of TABLE 3. Given the NCV approach and its treatment of the inertial process, the lack of direct flux measurement, and without direct neutrino measurements . . . this Step must rely on engineering judgement.

The above Steps are designed for enablement before commissioning. To enable the NCV Method in achieving the best mode post-commissioning, computer installation, data management and pre-commissioning all have obvious import. The following Steps VI & VII, as routine practice, offer suggested practice for on-line application of the NCV Method.

VI) Select Eqs. (2ND), (1ST), (3RD) & (PFP), adding the resolved appropriate COP $\Lambda_{nn}$ values as constants. It is good practice to optimize COP $\Lambda_{11}$, and/or other loss terms by minimizing the errors in SEP $\Delta\lambda_{GEN}$ and $\Delta\lambda_{EQ82}$, and then compare to changes in the Turbine Cycle's set of identified degraded $FCI_{Loss-k}$ terms (especially $FCI_{Misc-TC}$).

VII) At every monitoring cycle of the Calculational Engine, the NCV Method normally proceeds with its Verification Procedure; producing a "set of verified Thermal Performance Parameters" which must be examined for both absolute values and their trends over time. Through successful Verification Procedure computations, the NSSS operator will become satisfied that the system is well understood. Thus changes in the set of verified Thermal Performance Parameters will be credible. They simply allow the operator, for the first time, to make informed decisions, having an established record of verification (e.g., $\Delta\lambda_{GEN} \approx \Delta\lambda_{EQ82} \approx 0.0$ over time).

A set of Thermal Performance Parameters comprise the following list. Note that if a Verification Procedure is employed, both SEPs and their associated Reference SEPs are presented with suggested observations. The parameters described in Eqs. (35), (36) & (57) are a portion of the set of verified Thermal Performance Parameters. The user of the NCV Method is advised to plot all Thermal Performance Parameters over time, reviewing for temporal trends and operator instigated changes. Examples are obvious to any skilled NSSS operator; for example if $FCI_{Power}$ decreases, the operator will observe higher losses within the NSSS, located by reviewing changes in the set of identified degraded $FCI_{Loss-k}$. For example, investigating a decrease in final Feedwater temperature would involve trending $FCI_{Power}$ and a set of identified degraded $FCI_{Loss-k}$ comprising: $FCI_{FWH-k6}$, $FCI_{Misc-TC}$ and $FCI_{Cond}$. $FCI_{Power}$ to be maximized, the set of identified degraded $FCI_{Loss-k}$ must be minimized. The following are important parameters for best mode monitoring, critically important parameters are marked with *.

Combined SEP $\Delta\lambda_{GEN}$ and $\Delta\lambda_{EQ82}$ which provides extreme sensitivity to upset conditions;
$FCI_{Power}$ as a function of time;
The set of identified degraded $FCI_{Loss-k}$;
$FCI_{Loss-RV}$ as a function of time;
$FCI_{Misc-TC}$ as a function of time;
a set of irreversible losses ($FCI_{Loss-k}$) relevant to the perceived degradation;
$P_{GEN}$ and $P_{GEN-REF}$ must match as a function of time;
Core Thermal Power given it must always be less than the applicable Regulatory Limit;
$\eta_{TC}$ as a function of time;
$\varepsilon_{SYS}$ as a function of time;
$\varepsilon_{TC}$ as a function of time;
$\Phi_{TH}$ and $[C_{FLX}\Phi_{FC}]$ as a function of time, trending with constant slope over load changes;
Temporal Fission Density $[\Phi_{TH}\Sigma_F]$ as a function of time;
$m_{FW}$ and $[C_{FWF}m_{FW-REF}]$ as a function of time, tracking over each other;
$m_{RV}$ and $[C_{RVF}m_{RV-REF}]$ as a function of time, tracking over each other;
a scaled $P_{GEN}$ and $Q_{REJ}$ as a function of time, will track each other with variable off-set; and
$\upsilon_{LRV}$ as a function of time will yield a slightly changing slope with burn-up.

The operator must be aware that the NCV Method produces consistent absolutes: an absolute flux and power generated will always be consistent with computed reactor coolant flow, the resultant feedwater flow, etc. Thus if computed power agrees with the measured power, and feedwater flow trends downward, then recent operational changes have improved effectiveness. Such examples are endless given a complex NSS System, the above parameters offer an initial outline.

The NCV Method results in adjusting operating parameters by the plant operator instigating certain actions, these actions comprise: MCRF which directly affect the system's ability to legally operate; corrective measures taken given identification of thermally degraded equipment and processes; and to TRIP the nuclear power plant based on early warnings of dangerous conditions. In particular, NCV, before on-line operation, establishes a Neutronics Model (comprising of Off-Line Operating Parameters which includes instrumentation lists), then formulates a calorimetrics Model (the uses of its equations are described above) such that a set of declared unknown parameters can be solved, identifying MCRF unique to the plant, and, if optioned, formulating a Verification Procedure. Following this, while operating on-line, the NCV Method acquires On-line Operating Parameters comprising extensive properties necessary to execute the calorimetric Model required by the set of declared unknown parameters. It then uses the calorimetric Model to solve simultaneously for the set of declared unknown parameters, resulting in a set of Thermal Performance Parameters. These steps are further detailed in the descriptions of FIG. 5 and FIG. 6. The set of Thermal Performance Parameters contains all the data required by the plant operator to instigated actions (a computed Core Thermal Power, FCIs, safety warnings by monitoring SEP $\Delta\lambda_{GEN}$ and $\Delta\lambda_{EQ82}$, and others obvious to one skilled. As suggested, one action is instigating Mechanisms for Controlling the Rate of Fission such that the computed Core Thermal Power does not exceed the applicable Regulatory Limit. Another action is instigating operational changes such that the $FCI_{Power}$ is maximized and a set of identified degraded $FCI_{Loss-k}$ is minimized, thus improving the plant's system effectiveness ($\varepsilon_{SYS}$). Another action is to TRIP the NSSS using Safety Mechanisms if either $\Delta\lambda_{GEN}$ or $\Delta\lambda_{EQ82}$ values exceed the SEP Power Trip Limit.

DETAILED DESCRIPTION OF THE DRAWINGS

The descriptions and implied teachings presented in the following sections related to the appended drawings are considered examples of the principles of the invention and are not intended to limit the invention. Rather, said descriptions and implied teachings establish guideposts, a structure, for one skilled in the art to install, to implement, to manipulate, and to use the invention in every way and to every extent possible, limited only by the CLAIMS herein.

FIG. 1 is submitted as a generic representation of a PWR. The Reactor Vessel (RV) 100 contains the nuclear core 104, and the steam separator 102. For a PWR control rods enter the nuclear core from the top of 104, through 100 and 102. Coolant flow enters via pipe 154, flows down the outer annulus of the RV 155, then flows upwards through the core, through a separator if used, exiting to pipe 150. The pressurizer is Item 120 used for volume control. Pipe 150 enters the Steam Generator (SG) 140, flowing through a tube-in-shell heat exchanger 151. Note that two types of SG designs are commonly employed: a U-tube design producing a saturated working fluid exiting via pipe 160 (as shown), or a straight-thru design which produces a superheated working fluid at 160. After heating the working fluid, the RV coolant is returned 153 to the main coolant pump 130 and to the RV via pipe 154.

Figure 2:
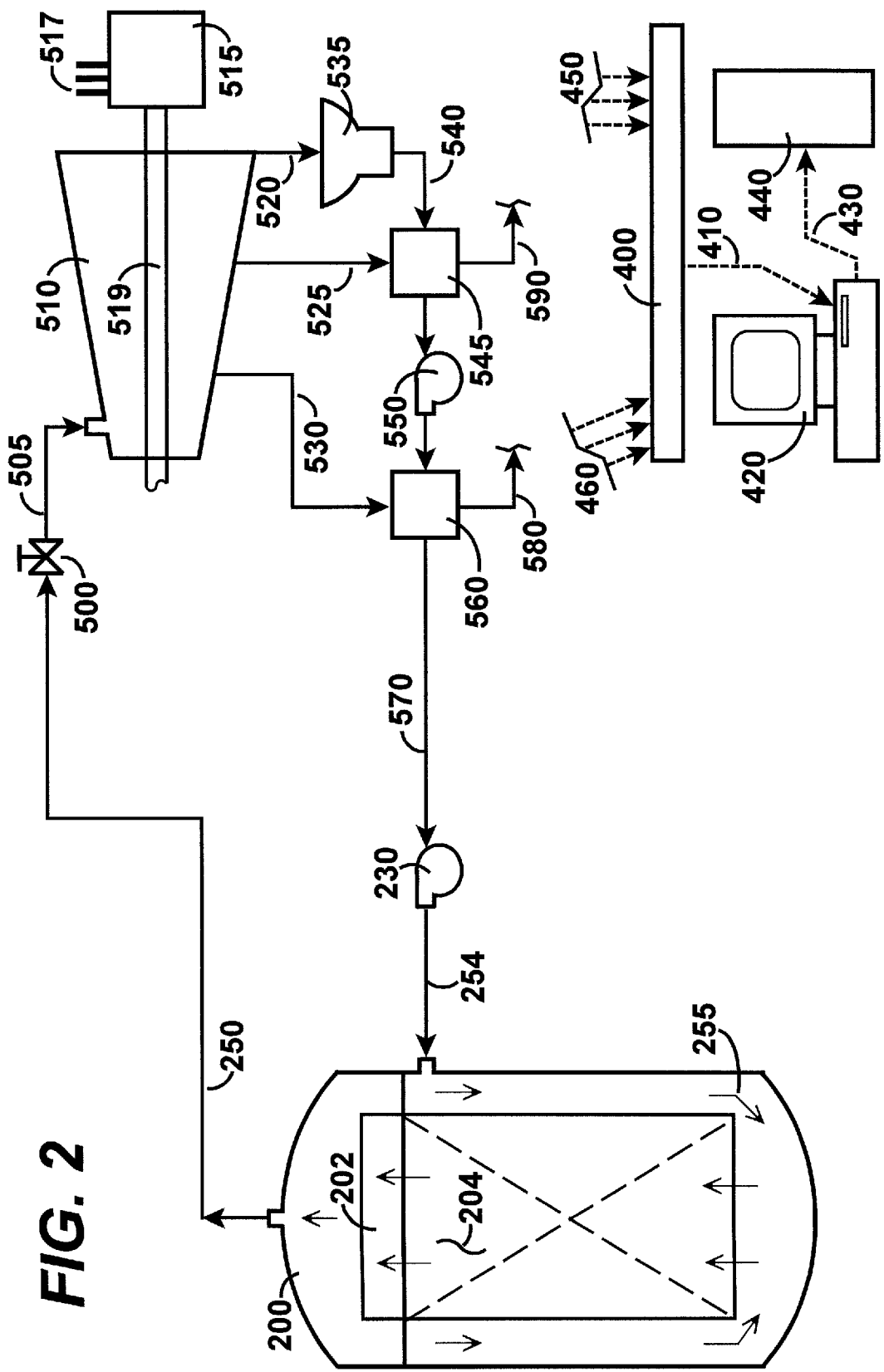
FIG. 2 is a representation of a BWR. Included in FIG. 2 is a representation of the data acquisition system required to implement the NCV Method.

FIG. 1 and FIG. 2 contain the same representations of the Turbine Cycle (TC), presented generically by Items 500 through 590. The presented TC is greatly stylized, typically a nuclear TC is: a) more complex than the reactor per se; and b) more complex than a typical fossil-fired system (e.g., the use of additional turbine extractions and thus feedwater heaters, the use of a Moisture Separator Reheater (MSR) between the High Pressure (HP) and Low Pressure (LP) turbines, etc.). Working fluid flow enters the throttle valve 500 and then the turbine 510 via 505. The nuclear turbine typically comprises a HP and many double-flow LP turbines. The generator is Item 515, whose gross output, $P_{UT}$, is measured at terminals 517; its useful power output, symbolically designated 519, is $P_{GEN}$. The LP turbine exhausts via 520 to the Condenser 535. Extractions are generically described by 530 and 525, heating a plurality of HP feedwater heaters 560, and a plurality of LP heaters 545. The condensate flow 540, to a FW pump (or pumps) 550, being returned to the SG, or RV, via 570. The shell-side drains of the Feedwater heaters, 580 & 590 flow to the Condensate System or pumped forward with MSR drains.

FIG. 1 and FIG. 2 contain the same representations of the apparatus of this invention showing a computer receiving acquired system data, such as On-Line Operating Parameters, from a data acquisition system and producing output reports via a programmed computer. Specifically the represented power plant in FIG. 1 and in FIG. 2 is instrumented such that On-Line Operating Parameters (450 and 460) are collected in a data acquisition device 400. Within the data acquisition device 400 said data is typically converted to engineering units, averaged and/or archived, resulting in a set of acquired system data 410. Examples of said data acquisition device 400 comprise a data acquisition system, a Distributed Control System, an analog to digital signal conversion device, a pneumatic signal to digital signal conversion device, an auxiliary computer collecting data, or an electronic device with data collection and/or conversion features. After processing, the data acquisition device 400 transfers the set of acquired system data 410 to a programmed computer 420, termed a "Calculational Engine", with a processing means and a memory means. The processing vehicle for transfer of the set of acquired system data 410 may be either by wire or by wireless transmission. The Calculational Engine 420, operates with a set of programmed procedures descriptive of the NCV Method of this invention, comprising, at least, complete neutronic and thermodynamic analyses of the Reactor Vessel (RV) and its components, and a thermodynamic analyses of the Turbine Cycle (TC); generically diagramed in FIG. 5. Specifically, the set of programmed procedures using the NCV Method, determines a neutron flux, a useful power output (electrical generation is indicated in FIG. 1 & FIG. 2), a RV coolant mass flow (and thus a TC feedwater mass flow), and a Condenser heat rejection. As taught in Final Embodiments and Enablements, these unknowns are contained in the chosen set of equations and solved simultaneously by matrix solution (see 645 in FIG. 5). The computer 420, operating with the programmed procedures descriptive of this invention, also may determine any one or all of the following as taught herein: First Law thermal efficiencies of the system and the Turbine Cycle; Second Law effectivenesses of the system and the Turbine Cycle; nuclear bucking; neutrino and/or antineutrino radiation; Fission Consumption Indices; and other neutronic and calorimetric data. The determination of the steam enthalpy and exergy from pressure and temperature or quality data, and determination of feedwater enthalpy and exergy from pressure and temperature data may occur within 400 or may occur within the Calculational Engine 420. Note that all specific exergy values are determined as: $g = f(P, h, T_{Ref})$, in compliance with $T_{Ref}$ defined by Eq. (10), or its assumed value. The Calculational Engine 420 contains in its memory device a set of Off-Line Operating Parameters. Computer output Item 430, produced from 420, comprises any portion of information presented in this disclosure, processed and distributed via 440. Output 430 may be made available to the system operator, engineer and/or regulatory authorities as paper reports printed on a printer, or may be made available in electronic or visual forms via 440 or using the Calculational Engine 420, or its clone. In summary, this invention teaches to operate the Calculational Engine 420 to obtain a complete thermodynamic understanding of the nuclear power plant, and to then provide information 440 which lead to instigating operational improvements.

FIG. 2 is submitted as a generic representation of a BWR. The Reactor Vessel (RV) 200 contains the nuclear core 204, and the steam separator 202. For a BWR, control rods enter the core from the bottom of 204. Coolant flow enters via pipe 254, flows down the outer annulus of the RV 255, then flows upwards through core, through the separator 202, exiting to pipe 250. Pipe 250 enters the TC at 500. After passing through the TC, the working fluid is returned to the RV via items 570, 230 & 254.

FIG. 3 and FIG. 4 illustrate an important portion of this invention, that is, the Pseudo Fuel Pin Model (PFP). As described, the PFP thermodynamically models an average fuel pin. In FIG. 3 its radial cross section is presented as 350 to 390, and axially by 320; no scale is used. The pin is composed of axially stacked fuel pellets 390, typically consisting of enriched $UO_2$ with an outside radius ($r_o$) at 380. The stacked fuel pellets are placed in a tube, termed "cladding" or "clad" which is typically a zirconium or stainless steel alloy with an ID at 370, OD at 360. The average hydraulic area bearing coolant flowing axially, is an annulus with an ID at 360, OD at 352. The area of the annulus 350 is established by taking the total area of the nuclear core, less the fuel pin area given its OD at 360, less the core's structural area, resulting in 350. The PFP's height (2Z) is the active nuclear core's height at temperature, from entrance 342 to exit 346.

FIG. 3 also clarifies the nomenclature used in Pseudo Fuel Pin Model's neutronics treatment. The (z) axial origination 334 is used for cosine integration and is positive upwards from the centerline 328 to 346, negative from 328 to 342. The (y) axial origination 332 is used for Clausen Function integration and is positive upwards from 342 to the top of the core 346. In summary, the nuclear core's entrance 342 is at: z=–Z and y=0.0, while the centerline 328 is at: z=0.0 and y=Z. The outlet 346 is at: z=+Z and y=2Z. The average neutron flux cosine profile is symmetric about 328. Flux buckling effects are noted by the distance 321, zero flux is assumed at 343 and 347. Further, as taught, the Differential Transit Length (DTL) is item 331, a distance 330 from the nuclear core's entrance.

FIG. 4 is a detailed plot produced by PFP Model computations simulating a 1270 MWe PWR's nuclear power plant. A cosine-generated exergy rise produces a classic sine-squared shape; its $\Delta g_{Core}/2$ is found at y≈72 inches for a 144 inch active core. The Clausen Function, PFP's Preferred Embodiment, was produced from Eq. (28) assuming y=y$_2$. Its peak was found at 47.134 inches for the 144 inch active core. Half the core's exergy rise, $\Delta g_{Core}/2$, was found at y=80.5536 inches. Its peak's position from the core's entrance (FIG. 3 Item 330), is independent of neutron flux and reactor type. This peak location is also the assumed DTL position and slightly greater than unity. TABLE 1 lists peak to average flux corrections. Note that the Clausen Function, as employed for the PFP Model, produces a zero flux at: y=–M$_T$ (FIG. 3 Item 343) and at: y=2Z+M$_T$ (FIG. 3 Item 347). These zero flux locations, for the PWR studied given M$_T$=6.6 cm, are indicated by the axial distance 321 beyond the active core.

Figure 5:
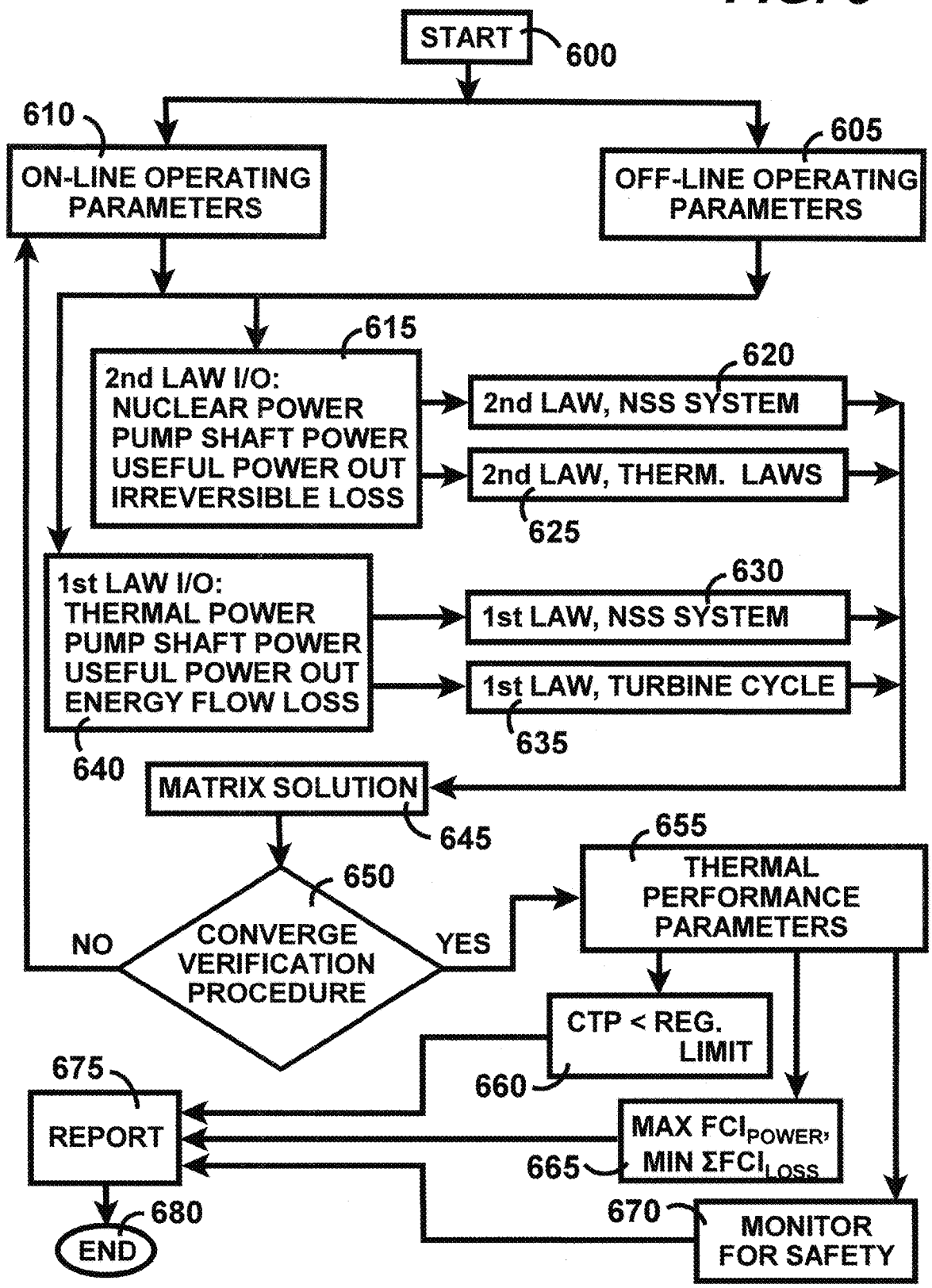
FIG. 5 is a block diagram of the NCV Method showing the flow of its computational logic, including use of extensive properties.

FIG. 5 is a block diagram of the NCV Method's computational process. The computer program NUKE-EFF is the principal program used to implement the NCV Method. NUKE-EFF and its supporting sub-programs represent the processing means and a memory means described as Item 420, the Calculational Engine, in FIG. 1 and FIG. 2. A major NUKE-EFF sub-routine is NUKE-MAX which performs the matrix solution of the chosen Preferred or Alternative Embodiments set of equations; checks return values; and miscellaneous computations. The NCV Methods begins with Item 600; however 600 is generic in nature, meaning the start of both off-line and on-line computations. A defined monitoring cycle, operating on-line, runs from Items 610 through Item 680, then repeats if directed. Item 605, broadly describes the "set of Off-Line Operating Parameters" as defined above in the Meaning of Terms. Item 610, broadly describes the "set of On-Line Operating Parameters" as defined above in the Meaning of Terms. Item 610 includes signal conversions as required [e.g., pressures from lbf in$^{-2}$ (gauge) to lbf in$^{-2}$ (absolute), pressure head corrections, temperatures from relative to absolute, and the like]. Also defined above, is Nuclear Fuel Management data which consists of both static (off-line) data and, possibly, dynamic (on-line) data. Note that On-Line Operating Parameters comprise extensive fluid properties which allow individual terms in the governing equations to be evaluated. Item 615 acquires off- and on-line data, and with 620 determines all terms associated with Eq. (2) leading Eq. (2ND); and with 625 determines all terms associated with Eq. (PFP). As further discussed regard FIG. 6, all inputs to Second Law formulations reduce to nuclear power plus shaft power supplied, G$_{IN}$. All 615 outputs consist of useful power output and irreversibilities, P$_{GEN}$ and $\Sigma I_k$. And the similar treatment for Item 640.

FIG. 5's Items 615 and 620 are viewed as the same process, that is the determination of all terms associated with Eq. (2), reduced to Eq. (2ND). The first line in Eq. (2) is G$_{IN}$. The right-hand side of Eq. (2) contains P$_{GEN}$ and individual irreversible loss terms (I$_k$). Items 615 and 625 are viewed as the same process. Item 625 represents the Preferred Embodiment of a "fourth independent equation based on thermodynamic laws" is the PFP Model. G$_{IN}$ is the first term in Eq. (PFP); P$_{GEN}$ is the second term a $\dot{m}\Delta g$. The only irreversible loss is antineutrino production as described in Eq. (PFP).

FIG. 5's Items 640 and 630 are viewed as the same process, that is the determination of all terms associated with Eq. (11), reduced to Eq. (1ST). Items 640 and 635 are viewed as the same process, that is the determination of all terms associated with Eq. (13), reduced to Eq. (3RD). First Law conservation of energy flows, Eqs. (11) & (13), are considered routine with the serious exception of converting recoverable nuclear power to an energy flow, $\dot{m}\Delta h$, required to satisfy conservation of NSSS energy flows for Eq. (11). Individual energy flow terms employed in Eq. (13), as elsewhere, are defined by subscripts. Turbine Cycle losses, summarized by Q$_{Loss-TC}$, are individually defined in Eq. (15).

FIG. 5's Item 645 solves simultaneously by matrix solution the chosen Preferred or Alternative Embodiments set of equations; checks return values; and performs miscellaneous computations. As noted, the four governing equations, solving for four unknowns, has a computed Rank of four; Alternative Embodiments A thru E all have a Rank of three. Alternative Embodiments G and H, if using two unknowns have a Rank of two. 645 also represents computations required for the Verification Procedure, if optioned. 650 tests for convergence of SEPs, if optioned. If not optioned, or converged, the process proceeds to the computations of Thermal Performance Parameters 655. Said Parameters comprise: Fission Consumption Indices (FCI), First Law efficiencies, Second Law effectivenesses, Core Thermal Power (CTP), system mass flows, resolved SEPs and COPs, and any related parameter associated with the equations employed. The principal use of the NCV Method is denoted as Items 660, 665 and 670. These actionable events: a process to keep CTP less than the applicable Regulatory Limit; an ability to minimized a set of identified degraded FCI$_{Loss-k}$ thus maximizing FCI$_{Power}$; and monitoring for safety concerns of the nuclear power plant. Reports are produced 675 and the process is either repeated or ends with 680.

Figure 6:
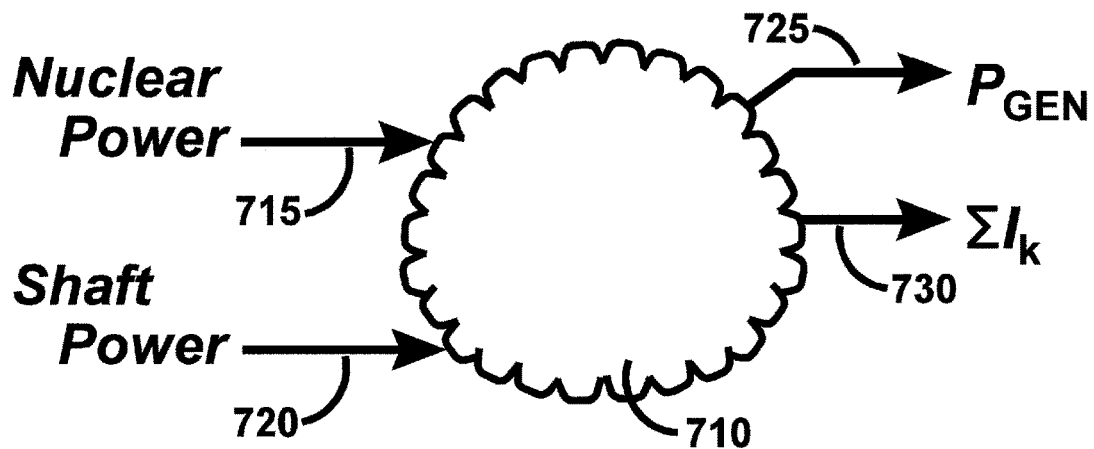
FIG. 6 is a representation of the thermodynamic laws employed by the NCV Method.
Figure 6:
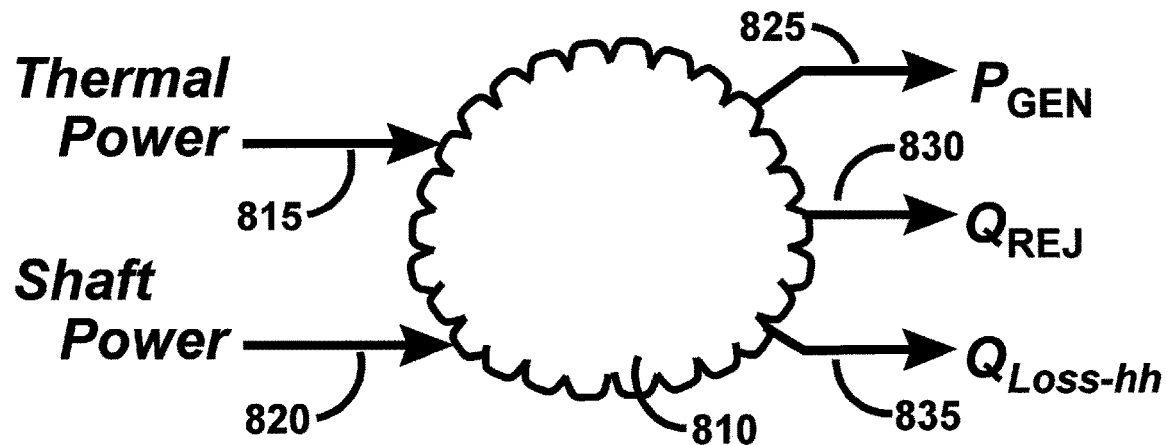

FIG. 6 is a representation of thermodynamic laws employed by the NCV Method. Items 710 and 810 represent a generic nuclear power system, the same system, either fission or fusion. System 710 is analyzed using Second Law exergy analysis. This same system 810 is also analyzed using First Law conservation of energy flows. This system is either a complete NSS System, or an isolated Turbine Cycle, or a single Pseudo Fuel Pin. Items 720 and 820 are the same, descriptive of shaft powers entering the system; for example, these are the $\Sigma P_{RVP-k1}$ & $\Sigma P_{CDP-k3}$ terms seen in the first line of Eqs. (2) & (11). Said terms reduce to the enthalpic [m$_{RV}\Delta\bar{h}_{FWP}$] and [m$_{FW}\Sigma C_{CDP-k3}\Delta h_{CDP-k3}$] terms used in Eq. (1ST); further reduced, for example, to [m$_{FW}$T$_{Ref}\Delta\bar{s}_{FWP}$] type loss quantities used in Eq. (2ND). Evaluation of shaft powers 720 & 820, require extensive properties at suction & discharge and mass flows. Note that Eqs. (2ND), (1ST) & (3RD) assume, by example, that Feedwater pumps are driven by an Auxiliary Turbine; thus its $\Sigma P_{FWP-k2}$ shaft power does not cross the system boundary and, for clarity, the expression [P$_{TUR-Aux}$–m$_{FW}\Delta\bar{h}_{FWP}$] is explicitly carried in Eq. (11) describing a net loss. Items 725 and 825 are the same, descriptive of the same useful power output, P$_{GEN}$. For the PWR & BWR, P$_{GEN}$ is an energy flow delivered to a turbine-generator shaft resulting in electric power; or $P_{GEN}$ could describe an energy flow used for space heating. Resolution of $P_{GEN}$ is made by matrix solution, or by direct measurement of the electric generation, accounting for generator losses; or a measured $\dot{m}\Delta h$ steam flow. If 710 is an isolated Turbine Cycle, its $G_{IN}$ is $\dot{m}\Delta g$ supplied at the boundary; for 810 a $\dot{m}\Delta h$ supplied; system output being $P_{GEN}$. Input quantities required to evaluate nuclear power 715, are supplied by the Neutronics Model and identified instrumentation needed to produce intensive properties. When monitoring in real time, On-Line Operating Parameters are required comprising extensive properties. The driving force behind fission power is neutron flux, $\Phi_{TH}$, which is a declared unknown for the Preferred Embodiment and Alternative Embodiments A thru E. $\Sigma I_k$ 730 is described by Eq. (53). Individual $I_k$ terms are taught through Eq. (1) requiring component $\Delta g$ and $\Delta s$ extensive properties and mass flows. Critical to the NCV Method is an established nexus between Items 715 & 815. The nuclear system 710 is supplied a total nuclear power 715, a $f[\Phi_{TH}\Sigma_F(\bar{\upsilon}_{REC}+\bar{\upsilon}_{TNU})]$, this same system 810 is also supplied a thermal power 815 formed by converting the recoverable portion of 715, $f[\Phi_{TH}\Sigma_F\bar{\upsilon}_{REC}]$, using an Inertial Conversion Factor described by Eqs. (9) & (10).

FIG. 6 suggests a simultaneous evaluation of available and thermal powers' differing losses. Second Law description of the nuclear system 710, states that the $G_{IN}$ input consists of the total nuclear power supplied 715 [the first right-hand term in Eq. (3A)], plus any shaft power additions 720 [Eq. (3A)'s latter terms]. $G_{IN}$ is the total exergy flow supplied to the system; it is the system's maximum "available power". $G_{IN}$ is destroyed as the system creates $P_{GEN}$ 725 and irreversible losses $\Sigma I_k$ 830. First Law description of the nuclear system 810 states that the total energy flow input consists of thermal plus shaft powers supplied; herein defined as $\Sigma \dot{m}\Delta h_{IN}$ [Items 815 plus 820]. $\Sigma \dot{m}\Delta h_{IN}$ is converted to $P_{GEN}$ 825 and energy flows losses, heating the environment; said losses are herein defined as $\Sigma Q_{Loss}$ [Items 830 plus 835]. For Eq. (11), $\Sigma Q_{Loss}$ describes all First Law losses associated with an NSS System. The difference between Second and First Law treatments of exergy and energy flows supplied, and their associated losses, implies Second Law $G_{IN}$ supplied less $\Sigma I_k$, must equal First Law $\Sigma \dot{m}\Delta h_{IN}$ supplied less $\Sigma Q_{Loss}$:

$$G_{IN} - \sum I_k \stackrel{?}{=} \sum \dot{m}\Delta h_{IN} - \sum Q_{Loss} \qquad (81)$$

When testing Eq. (81) in a Verification Procedure involving $\Delta\lambda_{EQ82}$, the following definitions apply:

$$P_{Avail} \equiv G_{IN} - \sum I_k \qquad (82A)$$

$$P_{Therm} \equiv \sum \dot{m}\Delta h_{IN} - \sum Q_{Loss} \qquad (82B)$$

The right-hand terms composing Eq. (82) describe the same system: differences in terms composing $P_{Avail}$, must be identical to differences in terms composing $P_{Therm}$. Thus the complexity of computing Carnot Engine losses [requiring uncertain surface temperatures, e.g, Eq. (1) and the conglomerate of Eq. (15)], consideration of vague antineutrino losses, etc., becomes non-trivial versus common First Law energy flow losses. Thus, although balancing Eq. (81) does not afford direct verification of a measured generation $P_{UT}$, it does afford, more importantly, verification of computed Second and First Law loss terms . . . critical in understanding a nuclear power plant. In summary, if exergy analyses and conservation of energy flows are supplied viable extensive properties and properly computed—as found in Eqs. (2) & (11)—Eq. (81) will balance. Using SEP $\Delta\times_{EQ82}$, defined as $[|P_{Avail}-P_{Therm}|/P_{GEN-REF}]$ per Eq. (62), will produce ultimate verification of system losses. As observed through FIG. 6, Eqs. (82A) & (82B), are simply back-calculated useful power outputs based on different thermodynamic laws. Thus afforded is an excellent mechanism for both debugging when enabling the NCV Method during pre-commissioning, and for routine on-line monitoring. Using the Verification Procedure, minimizing both SEP $\Delta\lambda_{GEN}$ and $\lambda\lambda_{EQ82}$ by varying a set of selected COP $\Lambda_{nn}$ appropriate to the particular nuclear power plant, post-commission, will produce a universal: $P_{GEN}=P_{GEN-REF}=P_{Avail}=P_{Therm}$ When $\Delta\lambda_{GEN}\approx\Delta\times_{EQ82}\approx0.0$. The practicality of these methods means that monitoring with SEP $\Delta\lambda_{GEN}$ and $\Delta\lambda_{EQ82}$ provides a nuclear safety diner bell; if either value exceeds the SEP Power Trip Limit a TRIP of the NSSS must be instigated. The NCV Method is indicating the system is not understood. A SEP Power Trip Limit of 0.1% has been found reasonable for the typical 800 MWe PWR; however, it must be evaluated uniquely for the NSSS being monitored during pre-commissioning.

The invention claimed is:

1. A method for instigating operator action to prevent a Core Thermal Power generated by a nuclear power plant from exceeding regulatory limits, the nuclear power plant comprising a Reactor Vessel (RV) containing a fissioning material when operating on-line and a Turbine Cycle (TC), comprising the steps of:

before on-line operation:
acquiring a Neutronics Model comprising a set of Off-Line Operating Parameters which includes an applicable Regulatory Limit to the Core Thermal Power;

identifying a set of neutron flux dependent terms comprising an average neutron flux [$\Phi_{TH}$], a Temporal Fission Density [$\Phi_{TH}\Sigma_F$], a temporal fission rate [$\Phi_{TH}\Sigma_F V_{Fuel}$], a recoverable nuclear power [$\Phi_{TH}\Sigma_F V_{Fuel}\bar{\upsilon}_{REC}$], a total nuclear power [$\Phi_{TH}\Sigma_F V_{Fuel}(\bar{\upsilon}_{REC}+\bar{\upsilon}_{REC})$] and another term provided it is a function of the average neutron flux [$\Phi_{TH}$];

identifying a set of declared unknown parameters which include a RV coolant mass flow, a Condenser heat rejection, a useful power output and one parameter selected from the set of neutron flux dependent terms;

formulating a calorimetrics Model of the nuclear power plant based only on a plurality of thermodynamic formulations which solve simultaneously for the set of declared unknown parameters, the plurality of thermodynamic formulations comprising:
formulating a Second Law exergy analysis of the nuclear power plant,
formulating a First Law conservation of the nuclear power plant,
formulating a First Law conservation of the TC, and
formulating a fourth independent equation based on thermodynamic laws; and identifying Mechanisms for Controlling the Rate of Fission in the fissioning material;

while operating on-line:
acquiring a set of On-Line Operating Parameters, including a set of thermodynamic extensive properties of the RV's coolant, the TC's working fluid, an independently computed term selected from the set of neutron flux dependent terms if required, and a measured useful power output if required;

using the calorimetrics Model to solve simultaneously for the set of declared unknown parameters resulting in a set of Thermal Performance Parameters which includes a computed RV coolant mass flow as based on the Neutronics Model, the plurality of thermodynamic formulations and the set of On-Line Operating Parameters;

determining a computed Core Thermal Power based on the computed RV coolant mass flow and the set of On-Line Operating Parameters;

instigating operator action by adjusting the Mechanisms for Controlling the Rate of Fission such that the computed Core Thermal Power does not exceed the applicable Regulatory Limit.

2. The method of claim 1 after the step of formulating the fourth independent equation, includes the additional steps of:

formulating a Verification Procedure, comprising:

identifying a set of System Effect Parameter differences ($\Delta\lambda_{mm}$), selected from the group consisting of $\Delta\lambda_{GEN}$, $\Delta\lambda_{EQ82}$, $\Delta\lambda_{FLX}$, $\Delta\lambda_{RVU}$, $\Delta\lambda_{FCS}$, $\Delta\lambda_{FWF}$, $\Delta\lambda_{RVF}$ and $\Delta\lambda_{MISC}$, resulting in a set of selected $\Delta\lambda_{mm}$;

identifying a set of Choice Operating Parameters ($\Lambda_{nn}$) selected from the group consisting of $\Lambda_1$ through $\Lambda_{14}$, resulting in a set of selected $\Lambda_{nn}$, formulating a multidimensional minimization analysis which minimizes the set of selected $\Delta\lambda_{mm}$ by varying the set of selected $\Lambda_{nn}$; and wherein the step of acquiring the set of On-Line Operating Parameters, includes acquiring a set of data required for the sets of selected $\Delta\lambda_{mm}$ and $\Lambda_{nn}$; and after the step of using the calorimetrics Model, includes the additional step of:

using the Verification Procedure to determine a verified RV coolant mass flow based on the computed RV coolant mass flow, the sets of selected $\Delta\lambda_{mm}$ and $\Delta\lambda_{nn}$, and the set of On-Line Operating Parameters; and wherein the step of determining the computed Core Thermal Power, includes determining a verified Core Thermal Power based on the verified RV coolant mass flow and the set of On-Line Operating Parameters; and wherein the step of instigating operator action includes adjusting the Mechanisms for Controlling the Rate of Fission such that the verified Core Thermal Power does not exceed the applicable Regulatory Limit.

3. The method of claim 1 wherein the step of identifying the set of declared unknown parameters includes only three parameters from the set of declared unknown parameters.

4. The method of claim 1 wherein the step of identifying the set of declared unknown parameters includes only two parameters of the set of declared unknown parameters.

5. The method of claim 1 wherein the step of formulating the Second Law exergy analysis of the nuclear power plant, includes formulating the Second Law exergy analysis of the nuclear power plant wherein the fissioning material is described as an inertial process comprising the total nuclear power term.

6. The method of claim 5 wherein the Second Law exergy analysis is based on an explicit, non-iterative computation of system reference temperature ($T_{Ref}$).

7. The method of claim 1 wherein the step of formulating the First Law conservation of the nuclear power plant, includes formulating the First Law conservation of the nuclear power plant wherein the fissioning material is described as an inertial process comprising energy flows requiring a conversion of the recoverable nuclear power based on an Inertial Conversion Factor.

8. The method of claim 7 wherein the Inertial Conversion Factor is based on an explicit, non-iterative computation.

9. The method of claim 1 wherein the step of formulating the fourth independent equation based on thermodynamic laws, includes formulating a Second Law exergy analysis of a Pseudo Fuel Pin (PFP) wherein the fissioning material is described as an inertial process comprising the total nuclear power term, the PFP descriptive of an average fuel pin in the RV comprising a theoretical, asymmetric, neutron flux profile which is partially integrated to a Differential Transfer Length (DTL).

10. The method of claim 7 wherein the Inertial Conversion Factor is based on a ratio of the fissioning material antineutrino and possible neutrino release ($\overline{\upsilon}_{TNU}$) to its total release ($\overline{\upsilon}_{TOT}$).

11. The method of claim 1 wherein the step of identifying the set of declared unknown parameters, includes four parameters from the set of declared unknown parameters.

12. A method for instigating operator action to minimize thermodynamic losses in a nuclear power plant, the nuclear power plant comprising a Reactor Vessel (RV) containing a fissioning material when operating on-line and a Turbine Cycle (TC), comprising the steps of:

before on-line operation:

acquiring a Neutronics Model comprising a set of Off-Line Operating Parameters;

identifying a set of neutron flux dependent terms comprising an average neutron flux [$\Phi_{TH}$], a Temporal Fission Density [$\Phi_{TH}\Sigma_F$], a temporal fission rate [$\Phi_{TH}\Sigma_F V_{Fuel}$], a recoverable nuclear power [$\Phi_{TH}\Sigma_F V_{Fuel}\overline{\upsilon}_{REC}$], a total nuclear power [$\Phi_{TH}\Sigma_F V_{Fuel}(\overline{\upsilon}_{REC}+\overline{\upsilon}_{TNU})$] and another term provided it is a function of the average neutron flux [$\Phi_{TH}$];

identifying a set of declared unknown parameters which include a RV coolant mass flow, a Condenser heat rejection, a useful power output and one parameter selected from the set of neutron flux dependent terms;

formulating a calorimetrics Model of the nuclear power plant based only on a plurality of thermodynamic formulations which solve simultaneously for the set of declared unknown parameters, the plurality of thermodynamic formulations comprising:

formulating a Second Law, exergy analysis of the nuclear power plant, formulating a First Law, conservation of the nuclear power plant, formulating a First Law conservation of the TC, and formulating a fourth independent equation based on thermodynamic laws; and while operating on-line:

acquiring a set of On-Line Operating Parameters, including a set of thermodynamic extensive properties of the RV's coolant, the TC's working fluid, an independently computed term selected from the set of neutron flux dependent terms if required, and a measured useful power output if required;

using the calorimetrics Model to solve simultaneously for the set of declared unknown parameters resulting in a set of Thermal Performance Parameters including a total exergy flow supplied to the nuclear power plant, a useful power output and a set of system irreversible losses, based on the Neutronics Model and the set of On-Line Operating Parameters;

computing a set of Fission Consumption Indices (FCIs) based on the set of Thermal Performance Parameters, resulting in a $FCI_{Power}$ and a set of system $FCI_{Loss-k}$;

monitoring the system for increases in the set of system $FCI_{Loss-k}$, resulting in a set of identified degraded $FCI_{Loss-k}$;

instigating operator action such that the set of identified degraded $FCI_{Loss-k}$ is minimized thereby maximizing $FCI_{Power}$ resulting in an increase in the nuclear power plant's system effectiveness ($\varepsilon_{Sys}$).

13. The method of claim 12 After the step of formulating the fourth independent equation, includes the additional steps of:

formulating a Verification Procedure, comprising:

identifying a set of System Effect Parameter differences ($\Delta\lambda_{mm}$), selected from the group consisting of $\Delta\lambda_{GEN}$, $\Delta\lambda_{EQ82}\Delta\lambda_{FLX}$, $\Delta\lambda_{RVU}$, $\Delta\lambda_{FCS}$, $\Delta\lambda_{FWF}$, $\Delta\lambda_{RVF}$ and $\Delta\lambda_{MISC}$, resulting in a set of selected $\Delta\lambda_{mm}$;

identifying a set of Choice Operating Parameters ($\Lambda_{nn}$), selected from the group consisting of $\Lambda_1$ through $\Lambda_{14}$, resulting in a set of selected $\Lambda_{nn}$;

formulating a multidimensional minimization analysis which minimizes the set of selected $\Delta\lambda_{mm}$ by varying the set of selected $\Lambda_{nn}$; and wherein the step of acquiring the set of On-Line Operating Parameters, includes acquiring a set of data required for the sets of selected $\Delta\lambda_{mm}$ and $\Lambda_{nn}$; and after the step of using the calorimetrics Model, includes the additional step of using the Verification Procedure to compute a set of verified Thermal Performance Parameters comprising a verified total exergy flow supplied, a verified useful power output and a set of verified system irreversible losses based on the sets of selected $\Delta\lambda_{mm}$ and $\Lambda_{nn}$; and wherein the step of computing the set of FCIs, includes computing a set of verified FCIs based on the set of verified Thermal Performance Parameters, resulting in a verified $FCI_{power}$ and a set of verified system $FCI_{Loss-k}$; and wherein the step of monitoring the system includes monitoring the set of verified FCIs for increases in the set of verified system $FCI_{Loss-k}$, resulting in a set of verified and identified degraded $FCI_{Loss-k}$;

wherein the step of instigating operator action includes, instigaiting operator action such that the set of verified and identified degraded $FCI_{Loss-k}$ is minimized thereby maximizing the verified $FCI_{Power}$ resulting in an increase in the nuclear power plant's system effectiveness ($\varepsilon_{Sys}$).

14. The method of claim 12 wherein the step of identifying the set of declared unknown parameters includes only three parameters from the set of declared unknown parameters.

15. The method of claim 12 wherein the step of identifying the set of declared unknown parameters includes only two parameters of the set of declared unknown parameters.

16. The method of claim 12 wherein the step of formulating the Second Law exergy analysis of the nuclear power plant, includes formulating the Second Law exergy analysis of the nuclear power plant wherein the fissioning material is described as an inertial process comprising the total nuclear power term.

17. The method of claim 16 wherein the Second Law exergy analysis is based on an explicit, non-iterative computation of system reference temperature ($T_{Ref}$).

18. The method of claim 12 wherein the step of formulating the First Law conservation of the nuclear power plant, includes formulating the First Law conservation of the nuclear power plant wherein the fissioning material is described as an inertial process comprising energy flows requiring a conversion of the recoverable nuclear power based on an Inertial Conversion Factor.

19. The method of claim 18 wherein the Inertial Conversion Factor is based on an explicit, non-iterative computation.

20. The method of claim 12 wherein the step of formulating the fourth independent equation based on thermodynamic laws, includes formulating a Second Law exergy analysis of a Pseudo Fuel Pin (PFP) wherein the fissioning material is described as an inertial process comprising the total nuclear power term, the PFP descriptive of an average fuel pin in the RV comprising a theoretical, asymmetric, neutron flux profile which is partially integrated to a Differential Transfer Length (DTL).

21. The method of claim 12 wherein the step of identifying the set of declared unknown parameters includes four parameters from the set of declared unknown parameters.

22. The method of claim 18 wherein the Inertial Conversion Factor is based on a ratio of the fissioning material antineutrino and possible neutrino release ($\overline{\upsilon}_{TNU}$) to its total release ($\overline{\upsilon}_{TOT}$).

23. A method for instigating operator action such that a nuclear power plant is operated in a safe manner, the nuclear power plant comprising a Reactor Vessel (RV) containing a fissioning material when operating on-line and a Turbine Cycle (TC), comprising the steps of:

before on-line operation:

acquiring a Neutronics Model comprising a set of Off-Line Operating Parameters including a SEP Power Trip Limit and an applicable Regulatory Limit;

identifying a set of neutron flux dependent terms comprising an average neutron flux [$\Phi_{TH}$], a Temporal Fission Density [$\Phi_{TH}\Sigma_F$], a temporal fission rate [$\Phi_{TH}\Sigma_F V_{Fuel}$], a recoverable nuclear power [$\Phi_{TH}\Sigma_F V_{Fuel}\overline{\upsilon}_{REC}$], a total nuclear power [$\Phi_{TH}\Sigma_F V_{Fuel}(\overline{\upsilon}_{REC}+\overline{\upsilon}_{REC})$] and another term provided it is a function of yje average neutron flux [$\Phi_{TH}$];

identifying a set of declared unknown parameters which include a RV coolant mass flow, a Condenser heat rejection, a useful power output and one parameter selected from the set of neutron flux dependent terms;

formulating a calorimetrics Model of the nuclear power plant based only on a plurality of thermodynamic formulations which solve simultaneously for the set of declared unknown parameters, the plurality of thermodynamic formulations comprising:

formulating a Second Law exergy analysis of the nuclear power plant, formulating a First Law conservation of the nuclear power plant, formulating a First Law conservation of the TC, and formulating a fourth independent equation based on thermodynamic laws;

formulating a Verification Procedure, comprising:

identifying a set of System Effect Parameter differences ($\Delta\lambda_{mm}$), selected from the group consisting of $\Delta\lambda_{GEN}$, $\Delta\lambda_{EQ82}$, $\Delta\lambda_{FLX}$, $\Delta\lambda_{RVU}$, $\Delta\lambda_{FCS}$, $\Delta\lambda_{FWF}$, $\Delta\lambda_{RVF}$ and $\Delta\lambda_{MISC}$, resulting in a set of selected $\Delta\lambda_{mm}$;

identifying a set of Choice Operating Parameters ($\Lambda_{nn}$), selected from the group consisting of $\Lambda_1$ through $\Lambda_{14}$, resulting in a set of selected $\Lambda_{nn}$;

formulating a multidimensional minimization analysis which minimizes the set of selected $\Delta\lambda_{mm}$ by varying the set of selected $\Lambda_{nn}$; and identifying Mechanisms for Controlling the Rate of Fission in the fissioning material including Safety Mechanisms;

while operating on-line:

acquiring a set of On-Line Operating Parameters, including a set of thermodynamic extensive properties of the RV's coolant, the TC's working fluid, an independently computed term selected from the set of neutron flux dependent terms if required, and a measured useful power output if required and a set of data required for the sets of selected $\Delta\lambda_{mm}$ and $\Lambda_{nn}$;

using the calorimetrics Model to solve simultaneously for declared unknown parameters resulting in a set of Thermal Performance Parameters which includes the resolved declared unknown parameters, First Law efficiencies, Second Law effectivenesses and Fission Consumption Indices;

using the Verification Procedure based on the sets of selected $\Delta\lambda_{mm}$ and $\Lambda_{nn}$, resulting in a set of verified Thermal Performance Parameters including a converged set of selected $\Delta\lambda_{mm}$;

monitoring temporal trends in the set of verified Thermal Performance, resulting in a set of monitored & verified Thermal Performance Parameters;

monitoring temporal trends in the converged set of selected $\Delta\lambda_{mm}$, resulting in a set of monitored & converged selected $\Delta\lambda_{mm}$; and instigating operator action by activating the Mechanisms for Controlling the Rate of Fission including a TRIP of the nuclear power plant when any one of the set of monitored & verified Thermal Performance Parameters exceed the applicable Regulatory Limit, or when any one of the set of monitored & converged selected $\Delta\lambda_{mm}$ exceed the SEP Power Trip Limit based on monitoring temporal trends.

24. The method of claim 23 wherein the step of identifying the set of declared unknown parameters includes only three parameters from the set of declared unknown parameters.

25. The method of claim 23 wherein the step of identifying the set of declared unknown parameters includes only two parameters of the set of declared unknown parameters.

26. The method of claim 23 wherein the step of formulating the Second Law exergy analysis of the nuclear power plant, includes formulating the Second Law exergy analysis of the nuclear power plant wherein the fissioning material is described as an inertial process comprising the total nuclear power term.

27. The method of claim 26 wherein the Second Law exergy analysis is based on an explicit, non-iterative computation of system reference temperature ($T_{Ref}$).

28. The method of claim 23 wherein the step of formulating the First Law conservation of the nuclear power plant, includes formulating the First Law conservation of the nuclear power plant wherein the fissioning material is described as an inertial process comprising energy flows requiring a conversion of the recoverable nuclear power based on an Inertial Conversion Factor.

29. The method of claim 28 wherein the Inertial Conversion Factor is based on an explicit, non-iterative computation.

30. The method of claim 23 wherein the step of formulating the fourth independent equation based on thermodynamic laws, includes formulating a Second Law exergy analysis of a Pseudo Fuel Pin (PFP) wherein the fissioning material is described as an inertial process comprising the total nuclear power term, the PFP descriptive of an average fuel pin in the RV comprising a theoretical, asymmetric, neutron flux profile which is partially integrated to a Differential Transfer Length (DTL).

31. The method of claim 23 wherein the step of identifying the set of declared unknown parameters includes four parameters from the set of declared unknown parameters.

32. The method of claim 23 wherein identifying the set of System Effect Parameter differences includes $\Delta\lambda_{GEN}$ within the set of selected $\Delta\lambda_{mm}$.

33. The method of claim 23 wherein identifying the set of System Effect Parameter differences includes $\Delta\lambda_{EQ82}$ within the set of selected $\Delta\lambda_{mm}$.

34. The method of claim 28 wherein the Inertial Conversion Factor is based on a ratio of the fissioning material antineutrino and possible neutrino release ($\overline{\upsilon}_{TNU}$) to its total release ($\overline{\upsilon}_{TOT}$).

* * * * *

UNITED STATES PATENT AND TRADEMARK OFFICE
CERTIFICATE OF CORRECTION

| | |
|---|---|
| PATENT NO. | : 12,198,822 B2 |
| APPLICATION NO. | : 18/444473 |
| DATED | : January 14, 2025 |
| INVENTOR(S) | : Fred D. Lang |

It is certified that error appears in the above-identified patent and that said Letters Patent is hereby corrected as shown below:

In the Specification

Column 1, Lines 54-55 should read:
-- analyzed results. The method uses a Neutronics/Calorimetrics/Verification (NCV) Method. It applies to any nuclear --

Column 2, Line 5 should read:
-- $\Delta E = c^2 \Delta m$, certain nuclear parameters are now computed --

Column 2, Lines 7-8 should read:
-- Examples comprise: MeV/Fission values by nuclide; antineutrino creation given $\beta^-$ radiation after neutron decay; --

Column 4, Lines 28-29 should read:
-- simultaneously there is no method - other than thermodynamically based - which would then achieve system-wide --

Column 5, Line 30 should read:
-- where irreversible losses, $\sum I_k$ were computed by the following: --

Column 6, Line 2 should read:
-- Conventionally, said Engine operates an idea Carnot cycle --

Column 9, Line 47 should read:
-- defense for not recognizing analytics between $\Phi_{TH}$ and his --

Column 10, Line 37 should read:
-- computational method - based on a computed RV coolant mass --

Signed and Sealed this
Twenty-fifth Day of March, 2025

Coke Morgan Stewart
*Acting Director of the United States Patent and Trademark Office*

CERTIFICATE OF CORRECTION (continued)
U.S. Pat. No. 12,198,822 B2

Column 11, Line 3:
Column 11, Line 5; Column 13, Line 3; Column 15, Line 52; Column 16, Lines 44-45; Column 16, Line 57; Column 17, Line 35; Column 17, Line 44; Column 32, Line 11; Column 38, Line 21; Column 38, Lines 31-32, Column 41, Line 29; Column 44, Line 11; Column 52, Lines 37-38; Column 52, Line 44; Column 52, Line 46; [[calorimetrics Model]] should read -- Calorimetrics Model --

Column 11, Line 4 should read:
-- thermodynamic equations having declared unknowns and --

Column 11, Lines 10-11 should read:
-- Parameters which are used by the operator for improved control and safety. --

Column 11, Line 31-33 should read:
-- system solution - involving neutron flux, RV coolant mass flow, useful power output and TC heat rejection - true understanding of the of system, with verification, is not --

Column 12, Lines 66-67 should read:
-- $V_{Fuel}$ = Volume of nuclear fuel consistent with the total macroscopic fission cross section; $cm^3$. --

Column 13, Line 16-17 should read:
-- $\psi_{LRV} \equiv \Phi_{TH} \bar{v}_{LRV}(t)$, flux times irreversible antineutrino & neutrino loss; $cm^{-2} sec^{-1} MeV/Fission^{-1}$. --

Column 13, Line 30-31 should read:
-- $g \equiv (h - h_{Ref}) - T_{Ref}(s - s_{Ref})$, fluid specific exergy ... --

Column 13, Line 54 should read:
-- $P_{X-ii}$ = Motive power delivered to the $ii^{th}$ individual $X$ subsystem pump; Btu/hr. --

Column 14, Line 6-7 should read:
-- $Q_{TCQ}$ = Net energy flow delivered to the Turbine Cycle including RV pump power; Btu/hr. --

Column 14, Line 9-10 should read:
-- $r_0$ = Outside radius of the fuel pellet, for the PFP Model; cm. --

Column 14, Line 35 should read:
-- m1, n, nn => Denotes indices: 1, 2, 3, ... --

Column 15, Lines 1-4 should read:
-- $X$ = Indication of a NSSS pump [RVP, FWP or CDP], or a steam turbine [TUR].
$XX$ = Indication of a fission release defined in TABLE 3 and associated discussion;
[e.g., $XX$ = REC]. --

Column 17, Line 55:
[[$\Delta\lambda_{GEN}$ = | $P_{GEN} - P_{GEN-REF}$ / $P_{GEN-REF} \rightarrow 0.0.$]]
Should read:
-- $\Delta\lambda_{GEN}$ = | $P_{GEN} - P_{GEN-REF}$ | / $P_{GEN-REF} \rightarrow 0.0.$ --

CERTIFICATE OF CORRECTION (continued)
U.S. Pat. No. 12,198,822 B2

Column 17, Line 66 to Column 18, Line 2 should read:
-- meaning. Further, the release's recoverable portion - an entropy increase at constant temperature, initiated spontaneously - results in an exergy dispersal (typically in the fluid, or melting $UO_2$). However, in a generic sense, the total --

Column 18, Line 11 should read:
-- ($\Delta$Exergy), an incremental concept. In summary, these --

Column 18, Line 50 to Column 19, Line 6:
Delete and Replace with:

$$\sum I_k = \sum_{hh}(1 - T_{Ref}/T_{hh})Q_{Loss-hh} + \sum_x \sum_{ii}(P_{X-ii} - m_{X-ii}\Delta g_{X-i}) + Q_{NEU-Loss} - \int d(mg)_{jj} \quad (53)$$

--

For the Condenser, it is assumed its effectiveness, $\varepsilon_{Cond} \equiv -m\Delta g_{Tube}/\sum_{Shell} mg$, can be estimated based on design, verified testing, or use of COP $\Lambda_8$. However, when monitoring on-line, individual exergy flows are simply not knowable with any reasonable accuracy, and especially $m\Delta g_{Tube}$. To eliminate $m\Delta g_{Tube}$, and recognizing that the system boundary is the surface of the working fluid (the Condenser's shell), Carnot Engine's irreversibility suggests: $I_{Cond} = [1 - T_{Ref}/T_{CDS}]Q_{REJ}(1 - \varepsilon_{Cond})$. However, a given $\varepsilon_{Cond}$ must conserve both: $Q_{REJ}$ [$= m\Delta h_{Tube} = -\sum_{Shell} mh$]; and that a computed $I_{Cond}$ must satisfy Eq.(1B) for any assumed $m\Delta g_{Tube}$. Such restraints require correcting the Condenser's absolute saturation temperature via a $\Delta T_{Corr}$, computed as: $[T_{Ref}Q_{REJ}/(Q_{REJ} - \sum_{Shell} mg) - T_{CDS}]$; where $\sum_{Shell} mg$ and $\sum_{Shell} mh$ terms are established from Thermal Kit data. For the PWR studied, $\Delta T_{Corr} = 0.7490\ °\Delta F$, and found essentially constant through 40% load. In summary, $I_{Cond}$ is dependent on NCV system solution of $Q_{REJ}$, and on $\Delta T_{Corr}$ & $\varepsilon_{Cond}$:

$$I_k = [1 - T_{Ref}/(T_{CDS} + \Delta T_{Corr})](1 - \varepsilon_{Cond})Q_{REJ} \quad (1A)$$

Eqs.(1A) & (1B), using the PWR data, produced an identical $I_{Cond} = 10.06\%$ of $G_{IN}$, thus $FCI_{Cond} = 100.6$. Note that if: $\Delta T_{Corr} = 0.0$, then $FCI_{Cond} = 98.1$; an $\Delta FCI$ of 2.5 out of 1000 (a 0.25% error). --

Column 19, Lines 42-53:
[[For best mode, $I_k$ is computed as:

$$I_k = \Lambda_{12}\sum[m_{TUR-k4}T_{Ref}\Delta s_{TUR-k4}]_{HP-Design} + \Lambda_{13}\sum[m_{TUR-k5}T_{Ref}\Delta s_{TUR-k5}]_{LP-Design} \quad (1E)$$

where: $\Lambda^{12} \equiv (\eta_{Test}/\eta_{Design})_{HP}$ and $\Lambda^{13} \equiv (\eta_{Test}/\eta_{Design})_{LP}$ which are evaluated based on testing, operator's judgement, or using Verification Procedure using COP $\Lambda^{12}$ and/or $\Lambda_{13}$.]]
Should read:
-- For best mode, $I_k$ is computed as:

$$I_k = \Lambda_{12}\sum[m_{TUR-k4}T_{Ref}\Delta s_{TUR-k4}]_{HP-Design} + \Lambda_{13}\sum[m_{TUR-k5}T_{Ref}\Delta s_{TUR-k5}]_{LP-Design} \quad (1E)$$

where: $\Lambda_{12} \equiv (\eta_{Test}/\eta_{Design})_{HP}$ and $\Lambda_{13} \equiv (\eta_{Test}/\eta_{Design})_{LP}$ which are evaluated based on testing, operator's judgement, or using Verification Procedure using COP $\Lambda_{12}$ and/or $\Lambda_{13}$. --

Column 20, Lines 11 to 16:
[[the fuel's fissile volume. The term $[\sum_{j=1,4}\lambda_{F-j}(v_{REC-j} + v_{TNU-j})]$ is replaced with resultant averaged values $[\sum_F(\overline{v}_{REC} + \overline{v}_{TNU})]$ to improve readability; this is taught via Eqs.(43)-(45).

The $G_{pure}$ term, $[C_E V_{Fuel} \Sigma_F (\overline{\upsilon}_{REC} + \overline{\upsilon}_{TNU})\Phi_{TH}]$, is computed as: $[C_E V_{Fuel} \Sigma_F \overline{\upsilon}_{TOT} \Phi_{TH}]$ via Eq.(46), or individual terms are used. ...]]
Should read:
-- the fuel's fissile volume. The term $[\sum_{j=1,4} \Sigma_{F-j}(\upsilon_{REC-j} + \upsilon_{TNU-j})]$ is replaced with resultant averaged values $[\Sigma_F(\overline{\upsilon}_{REC} + \overline{\upsilon}_{TNU})]$ to improve readability; this is taught via Eqs.(43)-(45). The $G_{pure}$ term, $[C_E V_{Fuel} \Sigma_F (\overline{\upsilon}_{REC} + \overline{\upsilon}_{TNU})\Phi_{TH}]$, is computed as: $[C_E V_{Fuel} \Sigma_F \overline{\upsilon}_{TOT} \Phi_{TH}]$ via Eq.(46), or individual terms are used. ... --

Column 20, Eq.(2):
Delete:
$$C_E V_{Fuel} \Sigma_F (\overline{\upsilon}_{REC} + \overline{\upsilon}_{TNU})\Phi_{TH} + \sum P_{RVP-k1} + \sum P_{CDP-k3}$$
$$= P_{GEN} + C_E V_{Fuel} \Sigma_F \overline{\upsilon}_{LRV} \Phi_{TH} + (1.0 - T_{Ref}/T_{CDS})(1.0 - \varepsilon_{Cond}) - \int d(mg)_{SG}$$
$$- \int d(mg)_{TC} + \sum P_{RVP-k1} - m_{RV}\Delta\overline{g}_{RVP} + \sum P_{FWP-k2} - m_{FW}\Delta\overline{g}_{FWP}$$
$$+ \sum P_{CDP-k3} - m_{FW}\sum C_{CDP-k3}\Delta g_{CDP-k3} + (P_{TUR-Aux} - m_{TUR-Aux}\Delta g_{TUR-Aux})$$
$$+ [\sum m_{TUR-k4} T_{Ref} \Delta s_{TUR-k4}]_{HP} + [\sum m_{TUR-k5} T_{Ref} \Delta s_{TUR-k5}]_{LP}$$
$$+ (1.0 - T_{Ref}/T_{RVI})Q_{Loss-RV} + (1.0 - T_{Ref}/T_{STI})Q_{Loss-SG} + (1.0 - T_{Ref}/T_{TC})Q_{Loss-TC} \quad (2),,$$

Replace with:
$$C_E V_{Fuel} \Sigma_F (\overline{\upsilon}_{REC} + \overline{\upsilon}_{TNU})\Phi_{TH} + \sum P_{RVP-k1} + \sum P_{CDP-k3}$$
$$= P_{GEN} + C_E V_{Fuel} \Sigma_F \overline{\upsilon}_{LRV}\Phi_{TH} - \int d(mg)_{SG} - \int d(mg)_{TC} - \int d(mg)_{Cond}$$
$$+ \sum P_{RVP-k1} - m_{RV}\Delta\overline{g}_{RVP} + \sum P_{FWP-k2} - m_{FW}\Delta\overline{g}_{FWP}$$
$$+ \sum P_{CDP-k3} - m_{FW}\sum C_{CDP-k3}\Delta g_{CDP-k3} + (P_{TUR-Aux} - m_{TUR-Aux}\Delta g_{TUR-Aux})$$
$$+ [\sum m_{TUR-k4}T_{Ref}\Delta s_{TUR-k4}]_{HP} + [\sum m_{TUR-k5}T_{Ref}\Delta s_{TUR-k5}]_{LP}$$
$$+ (1 - T_{Ref}/T_{RVI})Q_{Loss-RV} + (1 - T_{Ref}/T_{STI})Q_{Loss-SG} + (1 - T_{Ref}/T_{TC})Q_{Loss-TC} \quad (2)$$
--

Column 20, Eq.(2ND):
Delete:
$$C_E V_{Fuel} \Sigma_F (\overline{\upsilon}_{REC} + \overline{\upsilon}_{TNU})\Phi_{TH} - P_{GEN} - (1.0 - T_{Ref}/T_{CDS})(1.0 - \varepsilon_{Cond})Q_{REJ}$$
$$- m_{RV}\{\Delta g_{SGQ} - \Delta\overline{g}_{RVP}$$
$$+ (\Delta h_{SGQ}/\Delta h_{STX})[T_{Ref}\Delta\overline{s}_{FWP} - \Delta g_{STX} - \sum C_{CDP-k3}\Delta g_{CDP-k3} + C_{TUR-Aux}T_{Ref}\Delta s_{TUR-Aux}]\}$$
$$= -(Q_{Loss-SG}/\Delta h_{STX})[T_{Ref}\Delta\overline{s}_{FWP} - \Delta g_{STX} - \sum C_{CDP-k3}\Delta g_{CDP-k3} + C_{TUR-Aux}T_{Ref}\Delta s_{TUR-Aux}]$$
$$+ C_E V_{Fuel}\Sigma_F \overline{\upsilon}_{LRV}\Phi_{TH} + [\sum m_{TUR-k4}T_{Ref}\Delta s_{TUR-k4}]_{HP} + [\sum m_{TUR-k5}T_{Ref}\Delta s_{TUR-k5}]_{LP} - \int d(mg)_{TC}$$
$$+ (1.0 - T_{Ref}/T_{RVI})Q_{Loss-RV} + (1.0 - T_{Ref}/T_{STI})Q_{Loss-SG} + (1.0 - T_{Ref}/T_{TC})Q_{Loss-TC} \quad (2ND),,$$

Replace with:

$C_E V_{Fuel} \Sigma_F (\bar{\upsilon}_{REC} + \bar{\upsilon}_{TNU})\Phi_{TH} - P_{GEN} - [1 - T_{Ref}/(T_{CDS} + \Delta T_{Corr})](1 - \varepsilon_{Cond})Q_{REJ}$ $- m_{RV}\{\Delta g_{SGQ} - \Delta \bar{g}_{RVP}$ $\quad\quad + (\Delta h_{SGQ}/\Delta h_{STX})[T_{Ref}\Delta \bar{s}_{FWP} - \Delta g_{STX} - \sum C_{CDP-k3}\Delta g_{CDP-k3} + C_{TUR-Aux}T_{Ref}\Delta s_{TUR-Aux}]\}$ $= - (Q_{Loss-SG}/\Delta h_{STX})[T_{Ref}\Delta \bar{s}_{FWP} - \Delta g_{STX} - \sum C_{CDP-k3}\Delta g_{CDP-k3} + C_{TUR-Aux}T_{Ref}\Delta s_{TUR-Aux}]$ $+ C_E V_{Fuel} \Sigma_F \upsilon_{LRV} \Phi_{TH} + [\sum m_{TUR-k4}T_{Ref}\Delta s_{TUR-k4}]_{HP} + [\sum m_{TUR-k5}T_{Ref}\Delta s_{TUR-k5}]_{LP} - \int d(mg)_{TC}$ $+ (1 - T_{Ref}/T_{RVI})Q_{Loss-RV} + (1 - T_{Ref}/T_{STI})Q_{Loss-SG} + (1 - T_{Ref}/T_{TC})Q_{Loss-TC}$ (2ND)

Column 20, Eq.(3A):
Delete:

"$G_{IN} \equiv C_V \Phi_{TH} \sum_{j=1,4} \Sigma_{F-j} (\upsilon_{REC-j} + \upsilon_{TNU-j}) + \sum P_{RVP-k1} + \sum P_{CDP-k3}$ (3A),, Replace with:
-- $G_{IN} \equiv C_V \Phi_{TH} \sum_{j=1,4} \Sigma_{F-j} (\upsilon_{REC-j} + \upsilon_{TNU-j}) + \sum P_{RVP-k1} + \sum P_{CDP-k3}$ (3A) --

Column 21, Eq.(5):
Delete:

"$(1.0 + C_{\varphi\upsilon}) \bar{\upsilon}_{TNU-A}(t) < [\psi_{LRV}(t)/\Phi_{TH}] < \bar{\upsilon}_{TNU-A}(t)$ (5),, Replace with:
-- $\bar{\upsilon}_{TNU-A}(t) \leq [\psi_{LRV}(t)/\Phi_{TH}] \leq (1 + C_{\varphi\upsilon}) \bar{\upsilon}_{TNU-A}(t)$ (5) --

Column 22, Lines 17-38:
Delete:
"Use Eq.(3B) to compute coolant's available power, then calculate correct & consistent $\Phi_{TH}$:

$Q_{REC} = m_{RV}(g_{RCU} - g_{RCI}) = 0.64813392 \times 10^{10}$ Btu/hr  [01899 MW-available]

$\Phi_{TH} = m_{RV}(g_{RCU} - g_{RCI})/[C_E V_{Fuel} \Sigma_{F-35} \upsilon_{REC-35}] = 1.003621 \times 10^{13}$ $^1 n_0$ cm$^{-2}$ sec$^{-1}$ Use Eq.(3D) to compute a correct CTP, then back-calculate an incorrect $\Phi_{TH}$:

$Q_{CTP} = m_{RV}(h_{RVU} - h_{RVI}) = 1.2425663 \times 10^{10}$ Btu/hr  [3642 MW-thermal]

$\Phi_{TH} \stackrel{?}{=} m_{RV}(h_{RVU} - h_{RVI})/[C_E V_{Fuel} \Sigma_{F-35} \upsilon_{REC-35}] \stackrel{?}{=} 1.924086 \times 10^{13}$ $^1 n_0$ cm$^{-2}$sec$^{-1}$,, Replace with:
-- Use Eq.(3B) to compute coolant's available power, then calculate a correct & consistent $\Phi_{TH}$:

$Q_{REC} = m_{RV}(g_{RCU} - g_{RCI}) = 0.64813392 \times 10^{10}$ Btu/hr $= $ 1899.493 MWa

$\Phi_{TH} = m_{RV}(g_{RCU} - g_{RCI})/[C_E V_{Fuel} \Sigma_{F-35} \upsilon_{REC-35}] = $ 1.003621x10$^{13}$ $^1 n_0$ cm$^{-2}$ sec$^{-1}$

Use Eq.(3D) to compute a correct CTP, then back-calculate an incorrect $\Phi_{TH}$:

$$Q_{CTP} = m_{RV}(h_{RVU} - h_{RVI}) = 1.2425663 \times 10^{10} \text{ Btu/hr} = \mathbf{3641.602 \text{ MWt}}$$

$$\Phi_{TH} \neq m_{RV}(h_{RVU} - h_{RVI})/[C_E V_{Fuel} \Sigma_{F-35} \bar{\upsilon}_{REC-35}] = \mathbf{1.924086 \times 10^{13}} \, ^1n_0 \, \text{cm}^{-2}\text{sec}^{-1}$$

Column 23, Eq.(8) to Column 24, Eq.(10A):
Delete:

$$\Xi(t) = \qquad (8)$$

$$m_{RV} \partial h_{REC}/G_{Pure} = [G_{Pure} - f[\Phi_{TH}\Sigma_F \bar{\upsilon}_{TNU}] + f[\Phi_{TH}\Sigma_F \bar{\upsilon}_{REC}]] / G_{Pure}$$

where $\Xi(t)$ is averaged across the nuclear core and becomes, given: $\bar{\upsilon}_{REC} = \bar{\upsilon}_{TOT} - \bar{\upsilon}_{TNU}$,
via Eq.(46):

$$\Xi(t) = m_{RV} \partial h_{REC}/G_{Pure} = \Delta h_{RCX}/\Delta g_{RCX} = \qquad (9A)$$
$$1.0 - \bar{\upsilon}_{TNU}/\bar{\upsilon}_{TOT} + \bar{\upsilon}_{REC}/\bar{\upsilon}_{TOT}$$

" $\qquad \Xi(t) \equiv 2.0 - 2 \bar{\upsilon}_{TNU}/\bar{\upsilon}_{TOT} \qquad (9B)$ and where $T_{Ref}$ as used to define fluid exergy, a $f(Ag_{RCX})$, is then reduced from Eq.(9):

$$T_{Ref}(t) = \{[1.0 - 2 \bar{\upsilon}_{TNU}/\bar{\upsilon}_{TOT}] / [2.0 - 2 \bar{\upsilon}_{TNU}/\bar{\upsilon}_{TOT}]\} \Delta h_{RCX}/\Delta s_{RCX}) \qquad (10A),,$$

Replace with:

$$\Xi(t) = m_{RV} \partial h_{REC}/G_{Pure} = [G_{Pure} - f[\Phi_{TH} \Sigma_F \bar{\upsilon}_{TNU}] + f[\Phi_{TH} \Sigma_F \bar{\upsilon}_{REC}]] / G_{Pure} \qquad (8)$$

where $\Xi(t)$ is averaged across the nuclear core and becomes, given: $\bar{\upsilon}_{REC} = \bar{\upsilon}_{TOT} - \bar{\upsilon}_{TNU}$,
via Eq.(46):

$$\Xi(t) = m_{RV} \partial h_{REC}/G_{Pure} = \Delta h_{RCX}/\Delta g_{RCX} = 1 - \bar{\upsilon}_{TNU}/\bar{\upsilon}_{TOT} + \bar{\upsilon}_{REC}/\bar{\upsilon}_{TOT} \qquad (9A)$$

$$\Xi(t) \equiv 2 - 2 \bar{\upsilon}_{TNU}/\bar{\upsilon}_{TOT} \qquad (9B)$$

and where $T_{Ref}$, as used to define fluid exergy, a $f(Ag_{RCX})$, is then reduced from Eq.(9A):

$$T_{Ref}(t) = \{[1 - 2 \bar{\upsilon}_{TNU}/\bar{\upsilon}_{TOT}] / [2 - 2 \bar{\upsilon}_{TNU}/\bar{\upsilon}_{TOT}]\} (\Delta h_{RCX}/\Delta s_{RCX}) \qquad (10A)$$

Column 24, Lines 15-20 should read:
-- ... Eq.(10A) provides an explicit, non-iterative determination of the absolute and average reference temperature ($T_{Ref}$). Although independent of $\Phi_{TH}$, $T_{Ref}$ is temporally dependent on U depletion & Pu buildup via $\bar{\upsilon}_{TOT}(t)$. Obviously, Eq.(9B)'s computed $\Xi$ is independent of its environment, and thus suggests the prospect of direct determination --

Column 24, Eq.(11):
Delete:

$$C_E \Sigma_F V_{Fuel} \bar{\upsilon}_{REC} \Phi_{TH} \Xi + \sum P_{RVP-k1} + \sum P_{CDP-k3} = P_{GEN} +$$

" $\qquad Q_{REJ} + (P_{TUR-Aux} - m_{FW}\Delta\bar{h}_{FWP}) + Q_{Loss-RV} + Q_{Loss-SG} + Q_{Loss-TC} \qquad (11),,$ Replace with:

$$C_E \Sigma_F V_{Fuel} \bar{\upsilon}_{REC} \Phi_{TH} \Xi + \sum P_{RVP-k1} + \sum P_{CDP-k3}$$
$$= P_{GEN} + Q_{REJ} + (P_{TUR-Aux} - m_{FW}\Delta\bar{h}_{FWP}) + Q_{Loss-RV} + Q_{Loss-SG} + Q_{Loss-TC} \qquad (11)$$

Column 24, Eq.(1ST):
Delete:

$C_E \Sigma_F V_{Fuel} \bar{v}_{REC} \Phi_{TH} \Xi - P_{GEN} - Q_{REJ} + m_{RV}\{\Delta\bar{h}_{RVP} + \Delta h_{SGQ}/\Delta$
$\qquad h_{STX}(\Delta\bar{h}_{FWP} - C_{TUR-Aux}\Delta h_{TUR-Aux} + \Sigma C_{CDP-k3}\Delta h_{CDP-k3})\} =$
$\qquad Q_{Loss-RV} + Q_{Loss-SG} + Q_{Loss-TC} + Q_{Loss-SG}/\Delta$
" $\qquad h_{STX}(\Delta\bar{h}_{FWP} - C_{TUR-Aux}\Delta h_{TUR-Aux} + \Sigma C_{CDP-k3}\Delta h_{CDP-k3}) \qquad (1ST),$"

Replace with:

$C_E \Sigma_F V_{Fuel} \bar{v}_{REC} \Phi_{TH} \Xi - P_{GEN} - Q_{REJ}$
$\qquad + m_{RV}\{\Delta\bar{h}_{RVP} + (\Delta h_{SGQ}/\Delta h_{STX})(\Delta\bar{h}_{FWP} - C_{TUR-Aux}\Delta h_{TUR-Aux} + \Sigma C_{CDP-k3}\Delta h_{CDP-k3})\}$
$\qquad = Q_{Loss-TC} + (Q_{Loss-SG}/\Delta h_{STX})(\Delta\bar{h}_{FWP} - C_{TUR-Aux}\Delta h_{TUR-Aux} + \Sigma C_{CDP-k3}\Delta h_{CDP-k3})$
-- $\qquad + Q_{Loss-RV} + Q_{Loss-SG} \qquad (1ST)$ --

Column 25, Eq.(3RD):
Delete:

$- P_{GEN} - Q_{REJ} +$
$m_{RV}\{\Delta h_{SGQ}/\Delta h_{STX}(\Delta h_{TCQ} + \Delta\bar{h}_{FWP} - C_{TUR-Aux}\Delta h_{TUR-Aux} + \Sigma C_{CDP-k3}\Delta h_{CDP-k3})\}$
" $= Q_{Loss-TC} + Q_{Loss-SG}/\Delta h_{STX}(\Delta h_{TCQ} + \Delta\bar{h}_{FWP} - C_{TUR-Aux}\Delta h_{TUR-Aux} + \Sigma C_{CDP-k3}\Delta h_{CDP}) \quad (3RD),$"

Replace with:

$- P_{GEN} - Q_{REJ} + m_{RV}\{(\Delta h_{SGQ}/\Delta h_{STX})(\Delta h_{TCQ} + \Delta\bar{h}_{FWP} - C_{TUR-Aux}\Delta h_{TUR-Aux} + \Sigma C_{CDP-k3}\Delta h_{CDP-k3})\}$
$= Q_{Loss-TC} + (Q_{Loss-SG}/\Delta h_{STX})(\Delta h_{TCQ} + \Delta\bar{h}_{FWP} - C_{TUR-Aux}\Delta h_{TUR-Aux} + \Sigma C_{CDP-k3}\Delta h_{CDP-k3}) \quad (3RD)$
-- --

Column 27, Line 4 should read:
-- no parameter, with one exception, having *a priori* high --

Column 27, Lines 6-7 should read:
-- ... Measured electrical power, $P_{UT}$, is this one exception. If using Verification Eq.(61) or (62), --

Column 27, Line 67 should read:
-- the pin's radial flux profile is constant, $\partial\Phi(r)/\partial r = 0.0$; --

Column 28, Lines 52-55 should read:
-- will see an $\Delta$Exergy increase proportional to the local Temporal Fission_Density times $\bar{v}_{REC}$. In summary, the --

Column 28, Eq.(24A), (24B) & (25):
Delete:

$q_{n-Flux} \equiv C_E \pi r_0^2 \{\Sigma_{j=1,4} \Sigma_{F-j} v_{REC-j}\} \cdot \Phi_{MAX-CO}[cos(B_P z_n)]\Delta z \qquad (24A)$
" $q_{n-2nd} \equiv (m_{RV}/M_{FPin})(g_n - g_{n-1}) \qquad (24B)$
$Q_{RVX} = \Sigma_{n=1,N}[q_{n-Flux}] = \Sigma_{n=1,N}[q_{n-2nd}] = m_{RV}[g_{Core}(y) - g_{RCI}] \qquad (25),$"

Replace with:
$$q_{n-Flux} \equiv C_E \pi r_0^2 \{\sum_{j=1,4} \Sigma_{F-j} \upsilon_{REC-j}\} \cdot \Phi_{MAX-CO} [cos(B_P z_n)] \Delta z \qquad (24A)$$
$$q_{n-2nd} \equiv (m_{RV}/M_{FPin})(g_n - g_{n-1}) \qquad (24B)$$

$$Q_{RVX} = \sum_{n=1,N} [q_{n-Flux}] = \sum_{n=1,N} [q_{n-2nd}] = m_{RV}[g_{RCU} - g_{RCI}] \qquad (25)$$

Column 29, Line 3 and Eq.(26):
Delete:
"less, measured from its entrance (at –Z or yl).
$$\int_{-Z}^{z} C_E \pi r_0^2 \Sigma_F [\bar{\upsilon}_{REC} + \bar{\upsilon}_{TNU}] \Phi_{MAX-CO}[cos(B_P z)] dz$$
$$= \int_{y1}^{y} (m_{RV}/M_{FPin})[g_{Core}(y) - g_{RCI}] dy + \int_{-Z}^{z} C_E \pi r_0^2 \Sigma_F \bar{\upsilon}_{LRV} \Phi_{MAX-CO}[cos(B_P z)] dz \qquad (26)$$
"
Replace with:
-- less, measured from its entrance (at $z = -Z$ or $y = y_1$).
$$\int_{-Z}^{z} C_E \pi r_0^2 \bar{\Sigma}_F (\bar{\upsilon}_{REC} + \bar{\upsilon}_{TNU}) \Phi_{MAX-CO}[cos(B_P z)] dz$$
$$= \int_{y1}^{y} (m_{RV}/M_{FPin})[g_{Core}(y) - g_{RCI}] dy + \int_{-Z}^{z} C_E \pi r_0^2 \bar{\Sigma}_F \bar{\upsilon}_{LRV} \Phi_{MAX-CO}[cos(B_P z)] dz \qquad (26)$$
--

Column 29, Line 37 should read:
-- a function of both axial position (shifted by $M_T$) and $B_P$. --

Column 29, Lines 53-54 should read:
-- zero flux at the profile's boundaries:
at $Q(y_0 = -M_T) = 0.0$; and at $\Omega(y_3 = 2(Z + M_T)) = 2(Z + M_T)B_P = \pi$. ... --

Columns 29-30, Eq.(28):
Delete:
$$\int_{-Z}^{z} C_E \pi r_0^2 \Sigma_F [\bar{\upsilon}_{REC} + \bar{\upsilon}_{TNU}] \Phi_{MAX-CL} \sum_{m1=1}^{7} E_{m1}[\Omega(y)]^{m1-1} d\Omega$$
$$= \int_{y1}^{y} (m_{RV}/M_{FPin})[g_{Core}(y) - g_{RCI}] dy$$
$$+ \int_{y1}^{y} C_E \pi r_0^2 \Sigma_F \bar{\upsilon}_{LRV} \Phi_{MAX-CL} \sum_{m1=1}^{7} E_{m1}[\Omega(y)]^{m1-1} d\Omega \qquad (28)$$
"

Replace with:

$$\int_{y1}^{y} C_E \pi r_0^2 \bar{\Sigma}_F [\bar{v}_{REC} + \bar{v}_{TNU}] \Phi_{MAX-CL} \sum_{m1=1}^{7} E_{m1}[\Omega(y)]^{m1-1} d\Omega$$

$$= \int_{y1}^{y} (m_{RV}/M_{FPin}) [g_{Core}(y) - g_{RCI}] dy$$

$$+ \int_{y1}^{y} C_E \pi r_0^2 \bar{\Sigma}_F \bar{v}_{LRV} \Phi_{MAX-CL} \sum_{m1=1}^{7} E_{m1}[\Omega(y)]^{m1-1} d\Omega \quad (28)$$

--                                                                                                          --

Column 30, Line 10 should read:
-- length of the PFP (i.e., –Z to +Z, or $y_1$ to $y_2$). In Eq.(30A), the ($2/B_P$) factor reflects the --

Column 31, Line 27 should read:
-- After matrix resolution, the resolved $\Phi_{TH}$ and $m_{RV}$ may --

Column 31, Eq.(PFP), (31) & (32):
Delete:

$$(2D_1/B_P)[\bar{v}_{REC} + \bar{v}_{TNU}]\Phi_{TH} + D_4 m_{RV} = (2D_1/B_P)\psi_{LRV} \quad (PFP)$$

$$\text{where:} \quad D_4 = -[g_{Core}(y) - g_{RCI}]/M_{FPin} \quad (31)$$

$$D_1 = C_E C_{MAX-CL} \pi r_0^2 \bar{\Sigma}_F(t) \sum_{m1=1}^{7} \left[\frac{E_{m1}[\Omega(y)]^{m1}}{m1}\right]_{y1}^{y} \quad (32)$$

" "

Replace with:

$$(2D_1/B_P)[\bar{v}_{REC} + \bar{v}_{TNU}]\Phi_{TH} + D_4 m_{RV} = (2D_1/B_P)\psi_{LRV} \quad (PFP)$$

$$\text{where:} \quad D_4 = -[g_{Core}(\bar{y}) - g_{RCI}]/M_{FPin} \quad (31)$$

$$D_1 = C_E C_{MAX-CL} \pi r_0^2 \bar{\Sigma}_F(t) \sum_{m1=1}^{7} \left[\frac{E_{m1}[\Omega(y)]^{m1}}{m1}\right]_{y1}^{\bar{y}} \quad (32)$$

--                                                                                                          --

Column 31, Lines 33-34 should read:
-- For nuclear engines with positive Void Coefficients of Reactivity, it has been found that a Clausen Function if taken in mirror image matches the average flux --

CERTIFICATE OF CORRECTION (continued)
U.S. Pat. No. 12,198,822 B2

Column 33, Eqs.(41) thru (45):
Delete:

$$\Phi_{TH} \equiv \bar{\Phi}(t) = \int_S^E \Phi(t,e)de / (E - S) \qquad (41)$$

$$\Sigma_{F-j}(t) = \sum_j^S \int_S^E \Phi(t,e) N_j(t) \sigma_{F-j}(t,e)de/\bar{\Phi}(t) \qquad (42)$$

$$\Sigma_{F-j}(t) = [\text{unreadable}] \qquad (43)$$

$$\bar{\upsilon}_{REC}(t) = [\text{unreadable}] \qquad (44)$$

$$\bar{\upsilon}_{TNU}(t) = [\text{unreadable}] \qquad (45)$$

"                                                                                                                              "

Replace with:

$$\Phi_{TH} \equiv \bar{\Phi}(t) = \int_S^E \Phi(t,e)de / (E - S) \qquad (41)$$

$$\Sigma_{F\text{-}j}(t) = \sum_j^S \int_S^E \Phi(t,e) N_j(t) \sigma_{F\text{-}j}(t,e)de/\bar{\Phi}(t) \qquad (42)$$

$$\Sigma_F(t) = \Sigma_{F\text{-}35}(t) + \Sigma_{F\text{-}38}(t) + \Sigma_{F\text{-}39}(t) + \Sigma_{F\text{-}41}(t) \qquad (43)$$

$$\bar{\upsilon}_{REC}(t) = \left[ \Sigma_{F\text{-}35}(t)\upsilon_{REC\text{-}35} + \Sigma_{F\text{-}38}(t)\upsilon_{REC\text{-}38} + \Sigma_{F\text{-}39}(t)\upsilon_{REC\text{-}39} + \Sigma_{F\text{-}41}(t)\upsilon_{REC\text{-}41} \right] / \Sigma_F(t) \qquad (44)$$

$$\bar{\upsilon}_{TNU}(t) = \{ [\Sigma_{F\text{-}35}(t)[\upsilon_{PNU\text{-}35} + \upsilon_{DNU\text{-}35}(t)] + \Sigma_{F\text{-}38}(t)[\upsilon_{PNU\text{-}38} + \upsilon_{DNU\text{-}38}(t)]$$
$$+ \Sigma_{F\text{-}39}(t)[\upsilon_{PNU\text{-}9} + \upsilon_{DNU\text{-}39}(t)] + \Sigma_{F\text{-}41}(t)[\upsilon_{PNU\text{-}41} + \upsilon_{DNU\text{-}41}(t)] \} / \Sigma_F(t) \qquad (45)$$

Column 34, Line 16 should read:
-- $\bar{\upsilon}_{LRV}(0)= 0.0$, and thus $I_{Core} = 0.0$ and $\Xi = 2.0$. There is no --

Column 35, Line 8 should read:
-- a number of operational years, noting $\upsilon_{LRV}$ and $\psi_{LRV}$ are COP --

Column 35, Line 49 should read:
-- losses. --

Column 36, Lines 7-9 should read:
-- observing increased $FCI_{Loss\text{-}k}$ values, and herein defines "a set of identified degraded $FCI_{Loss\text{-}k}$" --

Column 36, Lines 19-22 should read:
-- Turbine Cycle's $FCI_{Cond}$ increases from 100 to 110 (i.e., higher irreversible losses) which is just offset by a decrease of 10 points in $FCI_{Power}$, with no other changes, the operator has absolute assurance that a 1.0% higher portion of the --

Column 36, Lines 33-34 should read:
-- ... Specifically, the NSSS operator - for the first time - has a nexus. --

Column 36, Lines 42-47 should read:
-- For example, this is equivalent to exergy analysis of a refrigeration system in which the lowest sink temperature could be well below $T_{Ref}$, producing $I_k < 0.0$ for its chiller component. Engineering judgement of components must apply. --

Column 37, Eq.(54):
Delete:
"$I_{RV} = (1.0 - T_{Ref}/T_{RVI})Q_{Loss-RV} + m_{RV}T_{Ref}\Delta_{RVP} + Q_{NEU-Loss}$ (54),,
Replace with:
-- $I_{RV} = (1 - T_{Ref}/T_{RVI})Q_{Loss-RV} + m_{RV}T_{Ref}\Delta s_{RVP} + Q_{NEU-Loss}$ (54) --

Column 38, Lines 64-65 should read:
-- Alternative Embodiment E: is an iterative computation of two equation sets, resolving Ξ; --

Column 40, Line 5 should read:
-- $\Lambda_1 = B_P$ ... --

Column 40, Line 16 should read:
-- $\Lambda_6 = \psi_{LRV}$ ... --

Column 42, Line 45:
[[Therefore: = (Λ2, Λ4, Λ14, Λ11), K = {Λ2, Λ4, Λ14, Λ11};]]
Should read:
-- Therefore: $\vec{\Lambda}$ = (Λ2, Λ4, Λ14, Λ11), K = {Λ2, Λ4, Λ14, Λ11}; --

Column 42, Line 61 should read:
-- applied to the initial $\Lambda_{nn-0}$; SEPs are never updated. However, given verification --

Column 44, Line 35 should read:
-- SEPs, resulting in a set of paired SEPs ($\Delta\lambda_{mm}$); and a method --

Column 48, Lines 40-41:
Delete:
"$A_3 = -(1.0 - T_{Ref}/T_{CDS})(1 - \varepsilon_{Cond})$;,,
Replace with:
-- $A_3 = -[1 - T_{Ref}/(T_{CDS} + \Delta T_{Corr})](1 - \varepsilon_{Cond})$; --

Column 48, Lines 47-48 should read:
-- ... [$\bar{v}_{REC}(t) + \bar{v}_{TNU}(t)$] could be replaced with $\bar{v}_{TOT}$; ... --

Column 48, Eqs. (2ND′), (1ST′), (3RD′), (PFP′):
Delete:
$$A_1[\bar{v}_{REC}(t) + \bar{v}_{TNU}(t)]\Phi_{TH} + A_2 P_{GEN} + A_3 Q_{REJ} + A_4 m_{RV} = L_A + A_1\psi_{LRV} \quad (2ND')$$
$$A_1 \bar{v}_{REC}(t) \Xi \Phi_{TH} + A_2 P_{GEN} + B_3 Q_{REJ} + B_4 m_{RV} = L_B \quad (1ST')$$
$$A_2 P_{GEN} + B_3 Q_{REJ} + C_4 m_{RV} = L_C \quad (3RD')$$
$$(2D_1/B_P)[\bar{v}_{REC}(t) + \bar{v}_{TNU}(t)]\Phi_{TH} + D_4 m_{RV} = (2D_1/B_P)\psi_{LRV} \quad (PFP')$$,,

CERTIFICATE OF CORRECTION (continued)
U.S. Pat. No. 12,198,822 B2

Replace with:

$$A_1 [\bar{\upsilon}_{REC}(t) + \bar{\upsilon}_{TNU}(t)] \Phi_{TH} + A_2 P_{GEN} + A_3 Q_{REJ} + A_4 m_{RV} = L_A + A_1 \psi_{LRV} \quad (2ND')$$
$$A_1 \bar{\upsilon}_{REC}(t) \Xi \Phi_{TH} + A_2 P_{GEN} + B_3 Q_{REJ} + B_4 m_{RV} = L_B \quad (1ST')$$
$$A_2 P_{GEN} + B_3 Q_{REJ} + C_4 m_{RV} = L_C \quad (3RD')$$
$$(2D_1/B_P)[\bar{\upsilon}_{REC}(t) + \bar{\upsilon}_{TNU}(t)] \Phi_{TH} + D_4 m_{RV} = (2D_1/B_P)\psi_{LRV} \quad (PFP')$$

Column 49, Line 39 should read:
-- Eqs.(XXX''') to a single equation and an unknown, having --

Column 51, Line 29 should read:
-- VII) After every monitoring cycle of the Calculational --

Column 51, Line 62 to Column 52, Line 18 should read:
-- * Combined SEP $\Delta\lambda_{GEN}$ and $\Delta\lambda_{EQ82}$ which provides extreme sensitivity to upset conditions;
* $FCI_{Power}$ as a function of time;
* The set of identified degraded $FCI_{Loss-k}$;
* $FCI_{Loss-RV}$ as a function of time;
* $FCI_{Misc-TC}$ as a function of time;
   a set of irreversible losses ($FCI_{Loss-k}$) relevant to the perceived degradation;
* $P_{GEN}$ and $P_{GEN-REF}$ must match as a function of time;
* Core Thermal Power given it must always be less than the applicable Regulatory Limit;
   $\eta_{TC}$ as a function of time;
* $\varepsilon_{SYS}$ as a function of time;
* $\varepsilon_{TC}$ as a function of time;
   $\Phi_{TH}$ and $[C_{FLX} \Phi_{FC}]$ as a function of time, trending with constant slope over load changes;
* Temporal Fission Density $[\Phi_{TH} \Sigma_F]$ as a function of time;
* $m_{FW}$ and $[C_{FWF} m_{FW-REF}]$ as a function of time, tracking over each other;
* $m_{RV}$ and $[C_{RVF} m_{RV-REF}]$ as a function of time, tracking over each other;
   a scaled $P_{GEN}$ and $Q_{REJ}$ as a function of time, will track each other with variable off-set; and
* $\upsilon_{LRV}$ as a function of time will yield a slightly changing slope with burn-up. --

Column 54, Line 23 should read:
-- may occur within 400 or may occur within the Calculational Engi --

Column 54, Line 55 should read:
-- consisting of enriched $UO_2$ with an outside radius ($r_0$) at --

Column 55, Line 4 should read:
-- integration and is positive upwards from 342 to the top of the --

Column 55, Lines 63-64 should read:
-- and irreversibilities, $P_{GEN}$ and $\sum I_k$. --

CERTIFICATE OF CORRECTION (continued)
U.S. Pat. No. 12,198,822 B2

Column 56, Lines 2-4 should read:
-- irreversible loss terms ($I_k$).
Item 625 represents the Preferred Embodiment ... --

Column 56, Lines 38-42 should read:
-- as Items 660, 665 and 670. These actionable events include: a process to keep CTP less than the applicable Regulatory Limit; an ability to minimized a set of identified degraded $FCI_{Loss-k}$ thus maximizing $FCI_{Power}$; and monitoring for safety concerns of the nuclear power plant causing the NSSS to TRIP if the SEP Power Variance is exceeded. Reports are --

Column 57, Line 25 should read:
-- described by Eq.(9B). --

Column 57, Line 34 should read:
-- 725 and irreversible losses $\sum I_k$ 730. First Law description of --

Column 58, Line 5-6 should read:
-- properly computed - as found in Eqs.(2) & (11) - Eq.(81) will balance. Using SEP $\Delta\lambda_{EQ82}$, defined as --

Column 58, Line 14-18 should read:
-- Procedure, minimizing both SEP $\Delta\lambda_{GEN}$ and $\Delta\lambda_{EQ82}$ by varying a set of selected COP $\Lambda_{nn}$ appropriate to the particular nuclear power plant, post-commission, will produce a universal: $P_{GEN} = P_{GEN-REF} = P_{Avail} = P_{Therm}$ when $\Delta\lambda_{GEN} \approx \Delta\lambda_{EQ82} \approx 0.0$. The practicality of these methods --

In the Claims

Column 58, Line 51:
Column 59, Line 5; Column 59, Line 38; Column 60, Line 46; Column 60, Line 65; Column 61, Line 35; Column 62, Line 56; Column 63, Line 25 [[calorimetrics Model]] should read -- Calorimetrics Model --